(12) United States Patent
Van Os et al.

(10) Patent No.: US 10,915,224 B2
(45) Date of Patent: *Feb. 9, 2021

(54) PORTABLE ELECTRONIC DEVICE WITH INTERFACE RECONFIGURATION MODE

(71) Applicant: Apple Inc., Cupertino, CA (US)

(72) Inventors: Marcel Van Os, San Francisco, CA (US); Freddy Allen Anzures, San Francisco, CA (US); Scott Forstall, Los Altos, CA (US); Greg Christie, San Jose, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,801

(22) Filed: Feb. 8, 2019

(65) Prior Publication Data

US 2019/0171349 A1  Jun. 6, 2019

Related U.S. Application Data

(63) Continuation of application No. 14/710,125, filed on May 12, 2015, now Pat. No. 10,359,907, which is a
(Continued)

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC .... G06F 3/04817; G06F 3/016; G06F 3/0416; G06F 1/1626; G06F 9/4443; H04M 1/27455

See application file for complete search history.

(56) References Cited

U.S. PATENT DOCUMENTS 4,899,136 A  2/1990 Beard et al.
5,051,736 A  9/1991 Bennett et al.
(Continued)

FOREIGN PATENT DOCUMENTS

AU  2006338183 A1  8/2007
AU  2012202140 A1  5/2012
(Continued)

OTHER PUBLICATIONS

Notice of Acceptance received for Australian Patent Application No. 2018203512, dated Jul. 26, 2019, 3 pages.
(Continued)

*Primary Examiner* — Rashawn N Tillery
(74) *Attorney, Agent, or Firm* — Dentons US LLP

(57) ABSTRACT

A portable electronic device displays a plurality of icons (e.g., graphical objects) in a region in a touch-sensitive display; detects a predefined user action, with respect to the touch-sensitive display, for initiating a predefined user interface reconfiguration process; and varies positions of one or more icons in the plurality of icons in response to detecting the predefined user action. The varying includes varying the positions of the one or more icons about respective average positions.

21 Claims, 9 Drawing Sheets

Related U.S. Application Data continuation of application No. 12/364,470, filed on Feb. 2, 2009, now Pat. No. 9,933,913, which is a continuation of application No. 11/459,602, filed on Jul. 24, 2006, now Pat. No. 7,509,588.

(60) Provisional application No. 60/755,368, filed on Dec. 30, 2005.

(51) Int. Cl.
*G06F 3/0488* (2013.01)
*G06F 3/0482* (2013.01)
*G06F 3/0484* (2013.01)
*G06F 9/445* (2018.01)
*H04M 1/725* (2021.01)
*G06F 9/451* (2018.01)

(52) U.S. Cl.
CPC ...... *G06F 3/04886* (2013.01); *G06F 9/44505* (2013.01); *G06F 9/451* (2018.02); *G06F 2203/04803* (2013.01); *H04M 1/72563* (2013.01); *H04M 2250/22* (2013.01)

(56) References Cited

U.S. PATENT DOCUMENTS

| | | |
|---|---|---|
| 5,124,959 A | 6/1992 | Yamazaki et al. |
| 5,146,556 A | 9/1992 | Hullot et al. |
| 5,196,838 A | 3/1993 | Meier et al. |
| 5,237,679 A | 8/1993 | Wang et al. |
| 5,312,478 A | 5/1994 | Reed et al. |
| 5,452,414 A | 9/1995 | Rosendahl et al. |
| 5,491,778 A | 2/1996 | Gordon et al. |
| 5,497,454 A | 3/1996 | Bates et al. |
| 5,515,486 A | 5/1996 | Amro et al. |
| 5,544,295 A | 8/1996 | Capps |
| 5,546,529 A | 8/1996 | Bowers et al. |
| 5,598,524 A | 1/1997 | Johnston, Jr. et al. |
| 5,610,653 A | 3/1997 | Abecassis |
| 5,612,719 A | 3/1997 | Beernink et al. |
| 5,621,878 A | 4/1997 | Owens et al. |
| 5,625,818 A | 4/1997 | Zarmer et al. |
| 5,642,490 A | 6/1997 | Morgan et al. |
| 5,644,739 A | 7/1997 | Moursund |
| 5,657,049 A | 8/1997 | Ludolph et al. |
| 5,671,381 A | 9/1997 | Strasnick et al. |
| 5,678,015 A | 10/1997 | Goh |
| 5,726,687 A | 3/1998 | Belfiore et al. |
| 5,736,974 A | 4/1998 | Selker |
| 5,745,096 A | 4/1998 | Ludolph et al. |
| 5,745,116 A | 4/1998 | Pisutha-Arnond |
| 5,745,910 A | 4/1998 | Piersol et al. |
| 5,754,179 A | 5/1998 | Hocker et al. |
| 5,754,809 A | 5/1998 | Gandre |
| 5,757,371 A | 5/1998 | Oran et al. |
| 5,760,773 A | 6/1998 | Berman et al. |
| 5,774,119 A | 6/1998 | Alimpich et al. |
| 5,796,401 A | 8/1998 | Winer |
| 5,801,699 A | 9/1998 | Hooker et al. |
| 5,801,704 A | 9/1998 | Oohara et al. |
| 5,812,862 A | 9/1998 | Smith et al. |
| 5,825,349 A | 10/1998 | Meier et al. |
| 5,825,352 A | 10/1998 | Bisset et al. |
| 5,825,357 A | 10/1998 | Malamud et al. |
| 5,835,079 A | 11/1998 | Shieh |
| 5,835,094 A | 11/1998 | Ermel et al. |
| 5,838,326 A | 11/1998 | Card et al. |
| 5,861,885 A | 1/1999 | Strasnick et al. |
| 5,870,683 A | 2/1999 | Wells et al. |
| 5,870,734 A | 2/1999 | Kao |
| 5,877,765 A | 3/1999 | Dickman et al. |
| 5,877,775 A | 3/1999 | Theisen et al. |
| 5,880,733 A | 3/1999 | Horvitz et al. |
| 5,900,876 A | 5/1999 | Yagita et al. |
| 5,914,716 A | 6/1999 | Rubin et al. |
| 5,914,717 A | 6/1999 | Kleewein et al. |
| 5,923,327 A | 7/1999 | Smith et al. |
| 5,923,908 A | 7/1999 | Schrock et al. |
| 5,934,707 A | 8/1999 | Johnson |
| 5,943,679 A | 8/1999 | Niles et al. |
| 5,956,025 A | 9/1999 | Goulden et al. |
| 5,963,204 A | 10/1999 | Ikeda et al. |
| 5,995,106 A | 11/1999 | Naughton et al. |
| 6,005,579 A | 12/1999 | Sugiyama et al. |
| 6,012,072 A | 1/2000 | Lucas et al. |
| 6,025,842 A | 2/2000 | Filetto et al. |
| 6,043,818 A | 3/2000 | Nakano et al. |
| 6,049,336 A | 4/2000 | Liu et al. |
| 6,054,989 A | 4/2000 | Robertson et al. |
| 6,069,626 A | 5/2000 | Cline et al. |
| 6,072,486 A | 6/2000 | Sheldon et al. |
| 6,073,036 A | 6/2000 | Heikkinen et al. |
| 6,088,032 A | 7/2000 | Mackinlay |
| 6,111,573 A | 8/2000 | McComb et al. |
| 6,121,969 A | 9/2000 | Jain et al. |
| 6,133,914 A | 10/2000 | Rogers et al. |
| 6,144,863 A | 11/2000 | Charron |
| 6,145,083 A | 11/2000 | Shaffer et al. |
| 6,166,738 A | 12/2000 | Robertson et al. |
| 6,177,936 B1 | 1/2001 | Cragun |
| 6,188,407 B1 | 2/2001 | Smith et al. |
| 6,195,094 B1 | 2/2001 | Celebiler |
| 6,199,082 B1 | 3/2001 | Ferrel et al. |
| 6,211,858 B1 | 4/2001 | Moon et al. |
| 6,222,465 B1 | 4/2001 | Kumar et al. |
| 6,229,542 B1 | 5/2001 | Miller |
| 6,243,080 B1 | 6/2001 | Molne |
| 6,253,218 B1 | 6/2001 | Aoki et al. |
| 6,256,008 B1 | 7/2001 | Sparks et al. |
| 6,262,732 B1 | 7/2001 | Coleman et al. |
| 6,262,735 B1 | 7/2001 | Etelapera |
| 6,271,841 B1 | 8/2001 | Tsujimoto |
| 6,275,935 B1 | 8/2001 | Barlow et al. |
| 6,278,454 B1 | 8/2001 | Krishnan |
| 6,297,795 B1 | 10/2001 | Kato et al. |
| 6,313,853 B1 | 11/2001 | Lamontagne et al. |
| 6,313,855 B1 | 11/2001 | Shuping et al. |
| 6,317,140 B1 | 11/2001 | Livingston |
| 6,323,846 B1 | 11/2001 | Westerman et al. |
| 6,326,970 B1 | 12/2001 | Mott et al. |
| 6,349,410 B1 | 2/2002 | Lortz |
| 6,353,451 B1 | 3/2002 | Teibel et al. |
| 6,359,615 B1 | 3/2002 | Singh |
| 6,377,698 B1 | 4/2002 | Cumoli et al. |
| 6,396,520 B1 | 5/2002 | Ording |
| 6,407,757 B1 | 6/2002 | Ho |
| 6,411,283 B1 | 6/2002 | Murphy |
| 6,433,801 B1 | 8/2002 | Moon et al. |
| 6,466,198 B1 | 10/2002 | Feinstein |
| 6,466,203 B2 | 10/2002 | Van Ee |
| 6,477,117 B1 | 11/2002 | Narayanaswami et al. |
| 6,486,895 B1 | 11/2002 | Robertson et al. |
| 6,489,975 B1 | 12/2002 | Patil et al. |
| 6,496,182 B1 | 12/2002 | Wong et al. |
| 6,496,206 B1 | 12/2002 | Mernyk et al. |
| 6,496,209 B2 | 12/2002 | Horii |
| 6,525,997 B1 | 2/2003 | Narayanaswami et al. |
| 6,545,669 B1 | 4/2003 | Kinawi et al. |
| 6,549,218 B1 | 4/2003 | Gershony et al. |
| 6,570,557 B1 | 5/2003 | Westerman et al. |
| 6,570,583 B1 | 5/2003 | Kung et al. |
| 6,571,245 B2 | 5/2003 | Huang et al. |
| 6,590,568 B1 | 7/2003 | Astala et al. |
| 6,597,378 B1 | 7/2003 | Shiraishi et al. |
| 6,597,391 B2 | 7/2003 | Hudson |
| 6,613,100 B2 | 9/2003 | Miller |
| 6,621,509 B1 | 9/2003 | Eiref et al. |
| 6,621,768 B1 | 9/2003 | Keller et al. |
| 6,628,309 B1 | 9/2003 | Dodson et al. |
| 6,628,310 B1 | 9/2003 | Hiura et al. |
| 6,629,793 B1 | 10/2003 | Miller |
| 6,639,584 B1 | 10/2003 | Li |
| 6,647,534 B1 | 11/2003 | Graham |

(56) References Cited

U.S. PATENT DOCUMENTS

| | | |
|---|---|---|
| 6,677,932 B1 | 1/2004 | Westerman |
| 6,683,628 B1 | 1/2004 | Nakagawa et al. |
| 6,690,623 B1 | 2/2004 | Maano |
| 6,700,612 B1 | 3/2004 | Anderson et al. |
| 6,710,788 B1 | 3/2004 | Freach et al. |
| 6,714,222 B1 | 3/2004 | Bjorn et al. |
| 6,727,916 B1 | 4/2004 | Ballard |
| 6,763,388 B1 | 7/2004 | Tsimelzon |
| 6,771,250 B1 | 8/2004 | Oh |
| 6,774,914 B1 | 8/2004 | Benayoun |
| 6,781,575 B1 * | 8/2004 | Hawkins ............ H04M 1/27475 345/173 |
| 6,798,429 B2 | 9/2004 | Bradski |
| 6,809,724 B1 | 10/2004 | Shiraishi et al. |
| 6,816,175 B1 | 11/2004 | Hamp et al. |
| 6,820,111 B1 | 11/2004 | Rubin et al. |
| 6,822,638 B2 | 11/2004 | Dobies et al. |
| 6,847,387 B2 | 1/2005 | Roth |
| 6,874,128 B1 | 3/2005 | Moore et al. |
| 6,880,132 B2 | 4/2005 | Uemura |
| 6,915,294 B1 | 7/2005 | Singh et al. |
| 6,915,490 B1 | 7/2005 | Ewing |
| 6,928,461 B2 | 8/2005 | Tuli |
| 6,931,601 B2 | 8/2005 | Vronay et al. |
| 6,934,911 B2 | 8/2005 | Salmimaa et al. |
| 6,940,494 B2 | 9/2005 | Hoshino et al. |
| 6,950,949 B1 | 9/2005 | Gilchrist |
| 6,956,564 B1 | 10/2005 | Williams |
| 6,963,349 B1 | 11/2005 | Nagasaki |
| 6,970,749 B1 | 11/2005 | Chinn et al. |
| 6,976,210 B1 | 12/2005 | Silva et al. |
| 6,976,228 B2 | 12/2005 | Bernhardson |
| 6,978,127 B1 | 12/2005 | Bulthuis et al. |
| 6,987,991 B2 | 1/2006 | Nelson |
| 6,990,452 B1 | 1/2006 | Ostermann et al. |
| 7,003,495 B1 | 2/2006 | Burger et al. |
| 7,007,239 B1 | 2/2006 | Hawkins et al. |
| 7,010,755 B2 | 3/2006 | Anderson et al. |
| 7,017,118 B1 | 3/2006 | Carroll |
| 7,030,861 B1 | 4/2006 | Westerman et al. |
| 7,043,701 B2 | 5/2006 | Gordon |
| 7,054,965 B2 | 5/2006 | Bell et al. |
| 7,071,943 B2 | 7/2006 | Adler |
| 7,075,512 B1 | 7/2006 | Fabre et al. |
| 7,080,326 B2 | 7/2006 | Molander et al. |
| 7,085,590 B2 | 8/2006 | Kennedy et al. |
| 7,093,201 B2 | 8/2006 | Duarte |
| 7,107,549 B2 | 9/2006 | Deaton et al. |
| 7,117,453 B2 | 10/2006 | Drucker et al. |
| 7,119,819 B1 | 10/2006 | Robertson et al. |
| 7,126,579 B2 | 10/2006 | Ritter |
| 7,133,859 B1 | 11/2006 | Wong |
| 7,134,092 B2 | 11/2006 | Fung et al. |
| 7,134,095 B1 | 11/2006 | Smith et al. |
| 7,142,210 B2 | 11/2006 | Schwuttke et al. |
| 7,146,576 B2 | 12/2006 | Chang et al. |
| 7,149,549 B1 | 12/2006 | Ortiz et al. |
| 7,155,667 B1 | 12/2006 | Kotler et al. |
| 7,166,791 B2 | 1/2007 | Robbin et al. |
| 7,167,731 B2 | 1/2007 | Nelson |
| 7,171,625 B1 | 1/2007 | Sacchi |
| 7,173,604 B2 | 2/2007 | Marvit et al. |
| 7,178,111 B2 | 2/2007 | Glein et al. |
| 7,194,527 B2 | 3/2007 | Drucker et al. |
| 7,194,698 B2 | 3/2007 | Gottfurcht et al. |
| 7,215,323 B2 | 5/2007 | Gombert et al. |
| 7,216,305 B1 | 5/2007 | Jaeger |
| 7,221,933 B2 | 5/2007 | Sauer et al. |
| 7,231,229 B1 | 6/2007 | Hawkins et al. |
| 7,242,406 B2 | 7/2007 | Robotham et al. |
| 7,249,327 B2 | 7/2007 | Nelson et al. |
| 7,278,115 B1 | 10/2007 | Conway et al. |
| 7,283,845 B2 | 10/2007 | De Bast |
| 7,287,232 B2 | 10/2007 | Tsuchimura et al. |
| 7,292,243 B1 | 11/2007 | Burke |
| 7,310,636 B2 | 12/2007 | Bodin et al. |
| 7,340,678 B2 | 3/2008 | Chiu et al. |
| 7,346,855 B2 | 3/2008 | Hellyar et al. |
| 7,355,593 B2 | 4/2008 | Hill et al. |
| 7,360,166 B1 | 4/2008 | Krzanowski |
| 7,362,331 B2 | 4/2008 | Ording |
| 7,383,497 B2 | 6/2008 | Glenner et al. |
| 7,392,488 B2 | 6/2008 | Card et al. |
| 7,403,211 B2 | 7/2008 | Sheasby et al. |
| 7,403,910 B1 | 7/2008 | Hastings et al. |
| 7,404,151 B2 | 7/2008 | Borchardt et al. |
| 7,406,666 B2 | 7/2008 | Davis et al. |
| 7,412,650 B2 | 8/2008 | Gallo |
| 7,415,677 B2 | 8/2008 | Arend et al. |
| 7,417,680 B2 | 8/2008 | Aoki et al. |
| 7,432,928 B2 | 10/2008 | Shaw et al. |
| 7,433,179 B2 | 10/2008 | Hisano et al. |
| 7,434,177 B1 | 10/2008 | Ording et al. |
| 7,437,005 B2 | 10/2008 | Drucker et al. |
| 7,456,823 B2 | 11/2008 | Poupyrev et al. |
| 7,461,353 B2 | 12/2008 | Rohrabaugh et al. |
| 7,468,742 B2 | 12/2008 | Ahn et al. |
| 7,478,437 B2 | 1/2009 | Hatanaka et al. |
| 7,479,948 B2 | 1/2009 | Kim et al. |
| 7,480,870 B2 | 1/2009 | Anzures et al. |
| 7,480,872 B1 | 1/2009 | Ubillos |
| 7,480,873 B2 | 1/2009 | Kawahara |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,496,595 B2 | 2/2009 | Accapadi et al. |
| 7,506,268 B2 | 3/2009 | Jennings et al. |
| 7,509,321 B2 | 3/2009 | Wong et al. |
| 7,509,588 B2 | 3/2009 | Van Os et al. |
| 7,511,710 B2 | 3/2009 | Barrett |
| 7,512,898 B2 | 3/2009 | Jennings et al. |
| 7,523,414 B2 | 4/2009 | Schmidt et al. |
| 7,526,738 B2 | 4/2009 | Ording et al. |
| 7,546,548 B2 | 6/2009 | Chew et al. |
| 7,546,554 B2 | 6/2009 | Chiu et al. |
| 7,552,402 B2 | 6/2009 | Bilow |
| 7,557,804 B1 | 7/2009 | McDaniel |
| 7,561,874 B2 | 7/2009 | Wang et al. |
| 7,584,278 B2 | 9/2009 | Rajarajan et al. |
| 7,587,671 B2 | 9/2009 | Saft et al. |
| 7,587,683 B2 | 9/2009 | Ito et al. |
| 7,594,185 B2 | 9/2009 | Anderson et al. |
| 7,603,105 B2 | 10/2009 | Booking et al. |
| 7,606,819 B2 | 10/2009 | Audet et al. |
| 7,607,150 B1 | 10/2009 | Kobayashi et al. |
| 7,614,008 B2 | 11/2009 | Ording |
| 7,620,894 B1 | 11/2009 | Kahn |
| 7,624,357 B2 | 11/2009 | De Bast |
| 7,633,076 B2 | 12/2009 | Huppi et al. |
| 7,642,934 B2 | 1/2010 | Scott |
| 7,650,137 B2 | 1/2010 | Jobs et al. |
| 7,650,575 B2 | 1/2010 | Cummins et al. |
| 7,653,883 B2 | 1/2010 | Hotelling et al. |
| 7,657,252 B2 | 2/2010 | Futami |
| 7,657,842 B2 | 2/2010 | Matthews et al. |
| 7,657,845 B2 | 2/2010 | Drucker et al. |
| 7,657,849 B2 | 2/2010 | Chaudhri et al. |
| 7,663,607 B2 | 2/2010 | Hotelling et al. |
| 7,663,620 B2 | 2/2010 | Robertson et al. |
| 7,665,033 B2 | 2/2010 | Byrne et al. |
| 7,667,703 B2 | 2/2010 | Hong et al. |
| 7,669,135 B2 | 2/2010 | Cunningham et al. |
| 7,680,817 B2 | 3/2010 | Audet et al. |
| 7,683,883 B2 | 3/2010 | Touma et al. |
| 7,683,889 B2 | 3/2010 | Rimas Ribikauskas et al. |
| 7,694,231 B2 | 4/2010 | Kocienda et al. |
| 7,698,658 B2 | 4/2010 | Ohwa et al. |
| 7,710,423 B2 | 5/2010 | Drucker et al. |
| 7,716,604 B2 | 5/2010 | Kataoka et al. |
| 7,719,523 B2 | 5/2010 | Hillis |
| 7,719,542 B1 | 5/2010 | Gough et al. |
| 7,720,893 B2 | 5/2010 | Boudreau et al. |
| 7,724,242 B2 | 5/2010 | Hillis et al. |
| 7,725,839 B2 | 5/2010 | Michaels |

(56) References Cited

U.S. PATENT DOCUMENTS

| | | |
|---|---|---|
| 7,728,821 B2 | 6/2010 | Hillis et al. |
| 7,730,401 B2 | 6/2010 | Gillespie et al. |
| 7,730,423 B2 | 6/2010 | Graham |
| 7,735,021 B2 | 6/2010 | Padawer et al. |
| 7,739,271 B2 | 6/2010 | Cook et al. |
| 7,739,604 B1 | 6/2010 | Lyons et al. |
| 7,747,289 B2 | 6/2010 | Wang et al. |
| 7,761,813 B2 | 7/2010 | Kim et al. |
| 7,765,266 B2 | 7/2010 | Kropivny |
| 7,770,125 B1 | 8/2010 | Young et al. |
| 7,783,583 B2 | 8/2010 | Sendhoff et al. |
| 7,783,990 B2 | 8/2010 | Amadio et al. |
| 7,788,583 B1 | 8/2010 | Amzallag et al. |
| 7,797,637 B2 | 9/2010 | Marcjan |
| 7,805,684 B2 | 9/2010 | Arvilommi |
| 7,810,038 B2 | 10/2010 | Matsa et al. |
| 7,831,926 B2 | 11/2010 | Rohrabaugh et al. |
| 7,835,729 B2 | 11/2010 | Hyon |
| 7,840,901 B2 | 11/2010 | Lacey et al. |
| 7,840,907 B2 | 11/2010 | Kikuchi et al. |
| 7,840,912 B2 | 11/2010 | Elias et al. |
| 7,844,889 B2 | 11/2010 | Rohrabaugh et al. |
| 7,844,914 B2 | 11/2010 | Andre et al. |
| 7,853,972 B2 | 12/2010 | Brodersen et al. |
| 7,856,602 B2 | 12/2010 | Armstrong |
| 7,873,916 B1 | 1/2011 | Chaudhri |
| 7,880,726 B2 | 2/2011 | Nakadaira et al. |
| 7,904,832 B2 | 3/2011 | Ubillos |
| 7,907,124 B2 | 3/2011 | Hillis et al. |
| 7,907,476 B2 | 3/2011 | Lee |
| 7,917,846 B2 | 3/2011 | Decker et al. |
| 7,917,869 B2 | 3/2011 | Anderson |
| 7,924,444 B2 | 4/2011 | Takahashi |
| 7,934,152 B2 | 4/2011 | Krishnamurthy et al. |
| 7,940,250 B2 | 5/2011 | Forstall |
| 7,956,869 B1 | 6/2011 | Gilra |
| 7,957,762 B2 | 6/2011 | Herz et al. |
| 7,958,457 B1 | 6/2011 | Brandenberg et al. |
| 7,979,879 B2 | 7/2011 | Kazama et al. |
| 7,986,324 B2 | 7/2011 | Funaki et al. |
| 7,995,078 B2 | 8/2011 | Baar |
| 7,996,789 B2 | 8/2011 | Louch et al. |
| 8,006,002 B2 | 8/2011 | Kalayjian et al. |
| 8,020,110 B2 | 9/2011 | Hurst |
| 8,024,671 B2 | 9/2011 | Lee et al. |
| 8,046,714 B2 | 10/2011 | Yahiro et al. |
| 8,059,101 B2 | 11/2011 | Westerman et al. |
| 8,064,704 B2 | 11/2011 | Kim et al. |
| 8,065,618 B2 | 11/2011 | Kumar et al. |
| 8,069,404 B2 | 11/2011 | Audet |
| 8,072,439 B2 | 12/2011 | Hillis et al. |
| 8,078,966 B2 | 12/2011 | Audet |
| 8,099,441 B2 | 1/2012 | Surasinghe |
| 8,103,963 B2 | 1/2012 | Ikeda et al. |
| 8,111,255 B2 | 2/2012 | Park |
| 8,125,481 B2 | 2/2012 | Gossweiler et al. |
| 8,130,211 B2 | 3/2012 | Abernathy |
| 8,139,043 B2 | 3/2012 | Hillis |
| 8,151,185 B2 | 4/2012 | Audet |
| 8,156,175 B2 | 4/2012 | Hopkins |
| 8,161,419 B2 | 4/2012 | Palahnuk et al. |
| 8,185,842 B2 | 5/2012 | Chang et al. |
| 8,188,985 B2 | 5/2012 | Hillis et al. |
| 8,205,172 B2 | 6/2012 | Wong et al. |
| 8,209,628 B1 | 6/2012 | Davidson |
| 8,214,793 B1 | 7/2012 | Muthuswamy |
| 8,230,358 B1 | 7/2012 | Chaudhri |
| 8,232,990 B2 | 7/2012 | King et al. |
| 8,239,784 B2 | 8/2012 | Hotelling et al. |
| 8,255,808 B2 | 8/2012 | Lindgren et al. |
| 8,259,163 B2 | 9/2012 | Bell |
| 8,266,550 B1 | 9/2012 | Cleron et al. |
| 8,269,729 B2 | 9/2012 | Han et al. |
| 8,269,739 B2 | 9/2012 | Hillis et al. |
| 8,279,180 B2 | 10/2012 | Hotelling et al. |
| 8,306,515 B2 | 11/2012 | Ryu et al. |
| 8,335,784 B2 | 12/2012 | Gutt et al. |
| 8,365,084 B1 | 1/2013 | Lin et al. |
| 8,381,135 B2 | 2/2013 | Hotelling et al. |
| 8,423,911 B2 | 4/2013 | Chaudhri |
| 8,434,027 B2 | 4/2013 | Jones |
| 8,446,371 B2 | 5/2013 | Fyke et al. |
| 8,458,615 B2 | 6/2013 | Chaudhri |
| 8,479,122 B2 | 7/2013 | Hotelling et al. |
| 8,519,964 B2 | 8/2013 | Platzer et al. |
| 8,519,972 B2 | 8/2013 | Forstall et al. |
| 8,525,839 B2 | 9/2013 | Chaudhri |
| 8,558,808 B2 | 10/2013 | Forstall et al. |
| 8,564,544 B2 | 10/2013 | Jobs et al. |
| 8,601,370 B2 | 12/2013 | Chiang et al. |
| 8,619,038 B2 | 12/2013 | Chaudhri et al. |
| 8,626,762 B2 | 1/2014 | Seung et al. |
| 8,672,885 B2 | 3/2014 | Kriesel et al. |
| 8,683,349 B2 | 3/2014 | Roberts et al. |
| 8,713,011 B2 | 4/2014 | Asai et al. |
| 8,730,188 B2 | 5/2014 | Pasquero et al. |
| 8,788,954 B2 | 7/2014 | Lemay et al. |
| 8,799,777 B1 | 8/2014 | Lee et al. |
| 8,799,821 B1 | 8/2014 | De Rose et al. |
| 8,826,170 B1 | 9/2014 | Weber et al. |
| 8,839,128 B2 | 9/2014 | Krishnaraj et al. |
| 8,881,060 B2 | 11/2014 | Chaudhri et al. |
| 8,881,061 B2 | 11/2014 | Chaudhri et al. |
| 8,957,866 B2 | 2/2015 | Barnett et al. |
| 8,972,898 B2 | 3/2015 | Carter |
| 9,026,508 B2 | 5/2015 | Nagai |
| 9,032,438 B2 | 5/2015 | Ito et al. |
| 9,053,462 B2 | 6/2015 | Cadiz et al. |
| 9,082,314 B2 | 7/2015 | Tsai |
| 9,152,312 B1 | 10/2015 | Terleski et al. |
| 9,170,708 B2 | 10/2015 | Chaudhri et al. |
| 9,239,673 B2 | 1/2016 | Shaffer et al. |
| 9,256,627 B2 | 2/2016 | Surasinghe |
| 9,367,232 B2 | 6/2016 | Platzer et al. |
| 9,386,432 B2 | 7/2016 | Chu et al. |
| 9,417,787 B2 | 8/2016 | Fong |
| 9,448,691 B2 | 9/2016 | Suda |
| 9,619,143 B2 | 4/2017 | Herz et al. |
| 9,794,397 B2 | 10/2017 | Min et al. |
| 10,250,735 B2 | 4/2019 | Butcher et al. |
| 2001/0024195 A1 | 9/2001 | Hayakawa |
| 2001/0024212 A1 | 9/2001 | Ohnishi |
| 2001/0038394 A1 | 11/2001 | Tsuchimura et al. |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | McCarthy |
| 2002/0038299 A1 | 3/2002 | Zernik et al. |
| 2002/0054090 A1 | 5/2002 | Silva et al. |
| 2002/0057287 A1 | 5/2002 | Crow et al. |
| 2002/0067376 A1 | 6/2002 | Martin et al. |
| 2002/0078037 A1 | 6/2002 | Hatanaka et al. |
| 2002/0085037 A1 | 7/2002 | Leavitt et al. |
| 2002/0091697 A1 | 7/2002 | Huang et al. |
| 2002/0093531 A1 | 7/2002 | Barile |
| 2002/0097261 A1 | 7/2002 | Gottfurcht et al. |
| 2002/0104096 A1 | 8/2002 | Cramer et al. |
| 2002/0109721 A1 | 8/2002 | Konaka et al. |
| 2002/0140698 A1 | 10/2002 | Robertson et al. |
| 2002/0140736 A1 | 10/2002 | Chen |
| 2002/0143949 A1 | 10/2002 | Rajarajan et al. |
| 2002/0149561 A1 | 10/2002 | Fukumoto et al. |
| 2002/0152222 A1 | 10/2002 | Holbrook |
| 2002/0152283 A1 | 10/2002 | Dutta et al. |
| 2002/0167683 A1 | 11/2002 | Hanamoto et al. |
| 2002/0188948 A1 | 12/2002 | Florence |
| 2002/0191029 A1 | 12/2002 | Gillespie et al. |
| 2002/0196238 A1 | 12/2002 | Tsukada et al. |
| 2003/0001898 A1 | 1/2003 | Bernhardson |
| 2003/0007012 A1 | 1/2003 | Bate |
| 2003/0013483 A1 | 1/2003 | Ausems et al. |
| 2003/0014415 A1 | 1/2003 | Weiss et al. |

(56) References Cited

U.S. PATENT DOCUMENTS

| | | |
|---|---|---|
| 2003/0016241 A1 | 1/2003 | Burke |
| 2003/0025676 A1 | 2/2003 | Cappendijk |
| 2003/0030664 A1 | 2/2003 | Parry |
| 2003/0033331 A1 | 2/2003 | Sena et al. |
| 2003/0048295 A1 | 3/2003 | Lilleness et al. |
| 2003/0063072 A1 | 4/2003 | Brandenberg et al. |
| 2003/0063125 A1 | 4/2003 | Miyajima et al. |
| 2003/0080991 A1 | 5/2003 | Crow et al. |
| 2003/0081135 A1 | 5/2003 | Boll |
| 2003/0085931 A1 | 5/2003 | Card et al. |
| 2003/0090572 A1 | 5/2003 | Belz et al. |
| 2003/0095135 A1 | 5/2003 | Kaasila et al. |
| 2003/0095155 A1 | 5/2003 | Johnson |
| 2003/0098894 A1 | 5/2003 | Sheldon et al. |
| 2003/0117427 A1 | 6/2003 | Haughawout et al. |
| 2003/0117440 A1 | 6/2003 | Hellyar et al. |
| 2003/0122787 A1 | 7/2003 | Zimmerman et al. |
| 2003/0128242 A1 | 7/2003 | Gordon |
| 2003/0132938 A1 | 7/2003 | Shibao |
| 2003/0142136 A1 | 7/2003 | Carter et al. |
| 2003/0156119 A1 | 8/2003 | Bonadio |
| 2003/0156140 A1 | 8/2003 | Watanabe |
| 2003/0156756 A1 | 8/2003 | Gokturk et al. |
| 2003/0160825 A1 | 8/2003 | Weber |
| 2003/0164827 A1 | 9/2003 | Gottesman et al. |
| 2003/0164861 A1 | 9/2003 | Barbanson et al. |
| 2003/0169298 A1 | 9/2003 | Ording |
| 2003/0169302 A1 | 9/2003 | Davidsson et al. |
| 2003/0174170 A1 | 9/2003 | Jung et al. |
| 2003/0174172 A1 | 9/2003 | Conrad et al. |
| 2003/0179240 A1 | 9/2003 | Gest |
| 2003/0184552 A1 | 10/2003 | Chadha |
| 2003/0184587 A1 | 10/2003 | Ording et al. |
| 2003/0189597 A1 | 10/2003 | Anderson et al. |
| 2003/0193524 A1 | 10/2003 | Bates et al. |
| 2003/0195950 A1 | 10/2003 | Huang et al. |
| 2003/0200289 A1 | 10/2003 | Kemp et al. |
| 2003/0206195 A1 | 11/2003 | Matsa et al. |
| 2003/0206197 A1 | 11/2003 | Mcinerney |
| 2003/0210278 A1 | 11/2003 | Kyoya et al. |
| 2003/0210280 A1 | 11/2003 | Baker et al. |
| 2003/0225811 A1 | 12/2003 | Ali et al. |
| 2004/0008224 A1 | 1/2004 | Molander et al. |
| 2004/0021643 A1 | 2/2004 | Hoshino et al. |
| 2004/0027330 A1 | 2/2004 | Bradski |
| 2004/0041849 A1 | 3/2004 | Mock et al. |
| 2004/0056839 A1 | 3/2004 | Yoshihara |
| 2004/0070608 A1 | 4/2004 | Saka |
| 2004/0093582 A1 | 5/2004 | Segura |
| 2004/0103156 A1 | 5/2004 | Quillen et al. |
| 2004/0103371 A1 | 5/2004 | Chen et al. |
| 2004/0109013 A1 | 6/2004 | Goertz |
| 2004/0109025 A1 | 6/2004 | Hullot et al. |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141011 A1 | 7/2004 | Smethers et al. |
| 2004/0143598 A1 | 7/2004 | Drucker et al. |
| 2004/0143796 A1 | 7/2004 | Lerner et al. |
| 2004/0155909 A1 | 8/2004 | Wagner |
| 2004/0160462 A1 | 8/2004 | Sheasby et al. |
| 2004/0169674 A1 | 9/2004 | Linjama |
| 2004/0177148 A1 | 9/2004 | Tsimelzon, Jr. |
| 2004/0196267 A1 | 10/2004 | Kawai et al. |
| 2004/0201595 A1 | 10/2004 | Manchester |
| 2004/0205492 A1 | 10/2004 | Newsome |
| 2004/0205496 A1 | 10/2004 | Dutta et al. |
| 2004/0215719 A1 | 10/2004 | Altshuler |
| 2004/0221006 A1 | 11/2004 | Gopalan et al. |
| 2004/0222975 A1 | 11/2004 | Nakano et al. |
| 2004/0236769 A1 | 11/2004 | Smith et al. |
| 2004/0257375 A1 | 12/2004 | Cowperthwaite |
| 2004/0268400 A1 | 12/2004 | Barde et al. |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0012862 A1 | 1/2005 | Lee |
| 2005/0020317 A1 | 1/2005 | Koyama |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0043987 A1 | 2/2005 | Kumar et al. |
| 2005/0044509 A1 | 2/2005 | Hunleth et al. |
| 2005/0052471 A1 | 3/2005 | Nagasaki |
| 2005/0057524 A1 | 3/2005 | Hill et al. |
| 2005/0057530 A1 | 3/2005 | Hinckley et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0078804 A1 | 4/2005 | Yomoda |
| 2005/0079896 A1 | 4/2005 | Kokko et al. |
| 2005/0088423 A1 | 4/2005 | Keely et al. |
| 2005/0091596 A1 | 4/2005 | Anthony et al. |
| 2005/0091609 A1 | 4/2005 | Matthews et al. |
| 2005/0093826 A1 | 5/2005 | Huh |
| 2005/0097089 A1 | 5/2005 | Nielsen et al. |
| 2005/0108657 A1 | 5/2005 | Han |
| 2005/0114788 A1 | 5/2005 | Fabritius |
| 2005/0116026 A1 | 6/2005 | Burger et al. |
| 2005/0120142 A1 | 6/2005 | Hall |
| 2005/0131924 A1 | 6/2005 | Jones |
| 2005/0134578 A1 | 6/2005 | Chambers et al. |
| 2005/0138570 A1 | 6/2005 | Good et al. |
| 2005/0151742 A1 | 7/2005 | Hong et al. |
| 2005/0154798 A1 | 7/2005 | Nurmi |
| 2005/0156873 A1 | 7/2005 | Walter et al. |
| 2005/0166232 A1 | 7/2005 | Lamkin et al. |
| 2005/0169527 A1 | 8/2005 | Longe et al. |
| 2005/0177783 A1 | 8/2005 | Agrawala et al. |
| 2005/0177796 A1 | 8/2005 | Takahashi |
| 2005/0183017 A1 | 8/2005 | Cain |
| 2005/0190059 A1 | 9/2005 | Wehrenberg |
| 2005/0192924 A1 | 9/2005 | Drucker et al. |
| 2005/0204385 A1 | 9/2005 | Sull et al. |
| 2005/0210018 A1 | 9/2005 | Singh et al. |
| 2005/0210369 A1 | 9/2005 | Damm, Jr. |
| 2005/0210403 A1 | 9/2005 | Satanek |
| 2005/0210410 A1 | 9/2005 | Ohwa et al. |
| 2005/0216913 A1 | 9/2005 | Gemmell et al. |
| 2005/0229102 A1 | 10/2005 | Watson et al. |
| 2005/0229118 A1 | 10/2005 | Chiu et al. |
| 2005/0246331 A1 | 11/2005 | De vorchik et al. |
| 2005/0250438 A1 | 11/2005 | Makipaa et al. |
| 2005/0251755 A1 | 11/2005 | Mullins et al. |
| 2005/0253817 A1 | 11/2005 | Rytivaara et al. |
| 2005/0259087 A1 | 11/2005 | Hoshino et al. |
| 2005/0262448 A1 | 11/2005 | Vronay et al. |
| 2005/0267869 A1 | 12/2005 | Horvitz et al. |
| 2005/0275636 A1 | 12/2005 | Dehlin et al. |
| 2005/0278757 A1 | 12/2005 | Grossman et al. |
| 2005/0283734 A1 | 12/2005 | Santoro et al. |
| 2005/0285880 A1 | 12/2005 | Lai et al. |
| 2005/0289458 A1 | 12/2005 | Kylmanen |
| 2005/0289476 A1 | 12/2005 | Tokkonen |
| 2005/0289482 A1 | 12/2005 | Anthony et al. |
| 2006/0004685 A1 | 1/2006 | Pyhalammi et al. |
| 2006/0005207 A1 | 1/2006 | Louch et al. |
| 2006/0007182 A1* | 1/2006 | Sato ............ G06F 3/0416 345/173 |
| 2006/0017692 A1 | 1/2006 | Wehrenberg et al. |
| 2006/0020903 A1 | 1/2006 | Wang et al. |
| 2006/0022955 A1 | 2/2006 | Kennedy |
| 2006/0025110 A1 | 2/2006 | Liu |
| 2006/0026170 A1 | 2/2006 | Kreitler et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031874 A1 | 2/2006 | Ok et al. |
| 2006/0033724 A1 | 2/2006 | Chaudhri et al. |

(56) References Cited

U.S. PATENT DOCUMENTS

| | | |
|---|---|---|
| 2006/0033751 A1* | 2/2006 | Keely .................. G06F 1/1626 345/619 |
| 2006/0033761 A1 | 2/2006 | Suen et al. |
| 2006/0035628 A1 | 2/2006 | Miller et al. |
| 2006/0036568 A1 | 2/2006 | Moore et al. |
| 2006/0036944 A1 | 2/2006 | Wilson |
| 2006/0048069 A1 | 3/2006 | Igeta |
| 2006/0051073 A1 | 3/2006 | Jung et al. |
| 2006/0053386 A1 | 3/2006 | Kuhl et al. |
| 2006/0053387 A1 | 3/2006 | Ording |
| 2006/0053392 A1 | 3/2006 | Salmimaa et al. |
| 2006/0055662 A1 | 3/2006 | Rimas-ribikauskas et al. |
| 2006/0055700 A1 | 3/2006 | Niles et al. |
| 2006/0064647 A1 | 3/2006 | Tapuska et al. |
| 2006/0070007 A1 | 3/2006 | Cummins et al. |
| 2006/0075355 A1 | 4/2006 | Shiono et al. |
| 2006/0075396 A1 | 4/2006 | Surasinghe |
| 2006/0080386 A1 | 4/2006 | Roykkee et al. |
| 2006/0080616 A1 | 4/2006 | Vogel et al. |
| 2006/0080617 A1 | 4/2006 | Anderson et al. |
| 2006/0085743 A1 | 4/2006 | Baudisch et al. |
| 2006/0085763 A1 | 4/2006 | Leavitt et al. |
| 2006/0090022 A1 | 4/2006 | Flynn et al. |
| 2006/0092133 A1 | 5/2006 | Touma et al. |
| 2006/0092770 A1 | 5/2006 | Demas |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0107231 A1 | 5/2006 | Matthews et al. |
| 2006/0112335 A1 | 5/2006 | Hofmeister et al. |
| 2006/0112347 A1 | 5/2006 | Baudisch |
| 2006/0116578 A1 | 6/2006 | Grunwald et al. |
| 2006/0117197 A1 | 6/2006 | Nurmi |
| 2006/0117372 A1 | 6/2006 | Hopkins |
| 2006/0119619 A1 | 6/2006 | Fagans et al. |
| 2006/0123359 A1 | 6/2006 | Schatzberger |
| 2006/0123360 A1 | 6/2006 | Anwar et al. |
| 2006/0125799 A1 | 6/2006 | Hillis et al. |
| 2006/0129586 A1 | 6/2006 | Arrouye et al. |
| 2006/0129647 A1 | 6/2006 | Kaghazian |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161863 A1 | 7/2006 | Gallo |
| 2006/0161871 A1 | 7/2006 | Hotelling et al. |
| 2006/0164418 A1 | 7/2006 | Hao et al. |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0187212 A1 | 8/2006 | Park et al. |
| 2006/0190833 A1 | 8/2006 | Sangiovanni et al. |
| 2006/0197752 A1 | 9/2006 | Hurst et al. |
| 2006/0197753 A1 | 9/2006 | Hotelling |
| 2006/0209035 A1 | 9/2006 | Jenkins et al. |
| 2006/0210958 A1 | 9/2006 | Rimas-ribikauskas et al. |
| 2006/0212828 A1 | 9/2006 | Yahiro et al. |
| 2006/0212833 A1 | 9/2006 | Gallagher et al. |
| 2006/0224997 A1 | 10/2006 | Wong et al. |
| 2006/0236266 A1 | 10/2006 | Majava |
| 2006/0238625 A1 | 10/2006 | Sasaki et al. |
| 2006/0242145 A1 | 10/2006 | Krishnamurthy et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0253771 A1 | 11/2006 | Baschy |
| 2006/0262116 A1 | 11/2006 | Moshiri et al. |
| 2006/0265643 A1 | 11/2006 | Saft et al. |
| 2006/0267966 A1 | 11/2006 | Grossman et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277486 A1 | 12/2006 | Skinner |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0004451 A1 | 1/2007 | C. Anderson |
| 2007/0013665 A1 | 1/2007 | Vetelainen et al. |
| 2007/0016958 A1 | 1/2007 | Bodepudi et al. |
| 2007/0022386 A1 | 1/2007 | Boss et al. |
| 2007/0024468 A1 | 2/2007 | Quandel et al. |
| 2007/0024646 A1 | 2/2007 | Saarinen et al. |
| 2007/0028269 A1 | 2/2007 | Nezu et al. |
| 2007/0030362 A1 | 2/2007 | Ota et al. |
| 2007/0038612 A1 | 2/2007 | Sull et al. |
| 2007/0044029 A1 | 2/2007 | Fisher et al. |
| 2007/0050432 A1 | 3/2007 | Yoshizawa |
| 2007/0050726 A1 | 3/2007 | Wakai et al. |
| 2007/0055947 A1 | 3/2007 | Ostojic et al. |
| 2007/0061745 A1 | 3/2007 | Anthony et al. |
| 2007/0067272 A1 | 3/2007 | Flynt et al. |
| 2007/0067738 A1 | 3/2007 | Flynt et al. |
| 2007/0070066 A1 | 3/2007 | Bakhash |
| 2007/0083827 A1 | 4/2007 | Scott et al. |
| 2007/0083911 A1 | 4/2007 | Madden et al. |
| 2007/0091068 A1 | 4/2007 | Liberty |
| 2007/0101292 A1 | 5/2007 | Kupka |
| 2007/0101297 A1 | 5/2007 | Forstall et al. |
| 2007/0106950 A1 | 5/2007 | Hutchinson et al. |
| 2007/0106952 A1 | 5/2007 | Matas et al. |
| 2007/0113207 A1 | 5/2007 | Gritton |
| 2007/0121869 A1 | 5/2007 | Gorti et al. |
| 2007/0123205 A1 | 5/2007 | Lee et al. |
| 2007/0124677 A1 | 5/2007 | de los Reyes et al. |
| 2007/0126696 A1 | 6/2007 | Boillot |
| 2007/0126732 A1 | 6/2007 | Robertson et al. |
| 2007/0132789 A1 | 6/2007 | Ording et al. |
| 2007/0136351 A1 | 6/2007 | Dames et al. |
| 2007/0146325 A1 | 6/2007 | Poston et al. |
| 2007/0150810 A1 | 6/2007 | Katz et al. |
| 2007/0150830 A1 | 6/2007 | Ording et al. |
| 2007/0150834 A1 | 6/2007 | Muller et al. |
| 2007/0150835 A1 | 6/2007 | Muller |
| 2007/0152958 A1 | 7/2007 | Ahn et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157089 A1 | 7/2007 | Van os et al. |
| 2007/0157097 A1 | 7/2007 | Peters |
| 2007/0157228 A1 | 7/2007 | Bayer et al. |
| 2007/0174785 A1 | 7/2007 | Perttula |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0188518 A1 | 8/2007 | Vale et al. |
| 2007/0189737 A1 | 8/2007 | Chaudhri et al. |
| 2007/0192741 A1 | 8/2007 | Yoritate et al. |
| 2007/0200713 A1 | 8/2007 | Weber et al. |
| 2007/0204218 A1 | 8/2007 | Weber et al. |
| 2007/0226652 A1 | 9/2007 | Kikuchi et al. |
| 2007/0233695 A1 | 10/2007 | Boudreau et al. |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0247425 A1 | 10/2007 | Liberty et al. |
| 2007/0250768 A1 | 10/2007 | Funakami et al. |
| 2007/0250793 A1 | 10/2007 | Miura et al. |
| 2007/0250794 A1 | 10/2007 | Miura et al. |
| 2007/0254722 A1 | 11/2007 | Kim et al. |
| 2007/0260999 A1 | 11/2007 | Amadio et al. |
| 2007/0263176 A1 | 11/2007 | Nozaki et al. |
| 2007/0266011 A1 | 11/2007 | Rohrs et al. |
| 2007/0266342 A1 | 11/2007 | Chang et al. |
| 2007/0271532 A1 | 11/2007 | Nguyen et al. |
| 2007/0288860 A1 | 12/2007 | Ording et al. |

(56) References Cited

U.S. PATENT DOCUMENTS

| | | |
|---|---|---|
| 2007/0288862 A1 | 12/2007 | Ording |
| 2007/0288868 A1 | 12/2007 | Rhee et al. |
| 2007/0294231 A1 | 12/2007 | Kaihotsu |
| 2007/0300160 A1 | 12/2007 | Ferrel et al. |
| 2008/0001924 A1 | 1/2008 | de los Reyes et al. |
| 2008/0005702 A1 | 1/2008 | Skourup et al. |
| 2008/0005703 A1 | 1/2008 | Radivojevic et al. |
| 2008/0006762 A1 | 1/2008 | Fadell et al. |
| 2008/0016468 A1 | 1/2008 | Chambers et al. |
| 2008/0016471 A1 | 1/2008 | Park |
| 2008/0024454 A1 | 1/2008 | Everest |
| 2008/0034013 A1 | 2/2008 | Cisler et al. |
| 2008/0034309 A1 | 2/2008 | Louch et al. |
| 2008/0034317 A1 | 2/2008 | Fard et al. |
| 2008/0040668 A1 | 2/2008 | Ala-rantala |
| 2008/0042984 A1 | 2/2008 | Lim et al. |
| 2008/0059906 A1 | 3/2008 | Toki |
| 2008/0059915 A1 | 3/2008 | Boillot |
| 2008/0062126 A1 | 3/2008 | Algreatly |
| 2008/0062137 A1 | 3/2008 | Brodersen et al. |
| 2008/0062141 A1 | 3/2008 | Chandhri |
| 2008/0062257 A1 | 3/2008 | Corson |
| 2008/0067626 A1 | 3/2008 | Hirler et al. |
| 2008/0082930 A1 | 4/2008 | Omernick et al. |
| 2008/0089587 A1 | 4/2008 | Kim et al. |
| 2008/0091763 A1 | 4/2008 | Devonshire et al. |
| 2008/0094369 A1 | 4/2008 | Ganatra et al. |
| 2008/0104515 A1 | 5/2008 | Dumitru et al. |
| 2008/0109408 A1 | 5/2008 | Choi et al. |
| 2008/0117461 A1 | 5/2008 | Mitsutake et al. |
| 2008/0120568 A1 | 5/2008 | Jian et al. |
| 2008/0122796 A1 | 5/2008 | Jobs et al. |
| 2008/0125180 A1 | 5/2008 | Hoffman et al. |
| 2008/0126971 A1 | 5/2008 | Kojima |
| 2008/0130421 A1 | 6/2008 | Akaiwa et al. |
| 2008/0132252 A1 | 6/2008 | Altman et al. |
| 2008/0136785 A1 | 6/2008 | Baudisch et al. |
| 2008/0139176 A1 | 6/2008 | Kim |
| 2008/0155453 A1 | 6/2008 | Othmer |
| 2008/0155617 A1 | 6/2008 | Angiolillo et al. |
| 2008/0158145 A1 | 7/2008 | Westerman |
| 2008/0158172 A1 | 7/2008 | Hotelling et al. |
| 2008/0161045 A1 | 7/2008 | Vuorenmaa |
| 2008/0164468 A1 | 7/2008 | Chen et al. |
| 2008/0165140 A1 | 7/2008 | Christie et al. |
| 2008/0168075 A1 | 7/2008 | Kamiyabu |
| 2008/0168365 A1 | 7/2008 | Chaudhri |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0168401 A1 | 7/2008 | Boule et al. |
| 2008/0168478 A1 | 7/2008 | Platzer et al. |
| 2008/0171555 A1 | 7/2008 | Oh et al. |
| 2008/0174562 A1 | 7/2008 | Kim |
| 2008/0180406 A1 | 7/2008 | Han et al. |
| 2008/0182598 A1 | 7/2008 | Bowman |
| 2008/0182628 A1 | 7/2008 | Lee et al. |
| 2008/0184052 A1 | 7/2008 | Itoh et al. |
| 2008/0184112 A1 | 7/2008 | Chiang et al. |
| 2008/0189108 A1 | 8/2008 | Atar |
| 2008/0201452 A1 | 8/2008 | Athas et al. |
| 2008/0204424 A1 | 8/2008 | Jin et al. |
| 2008/0216017 A1 | 9/2008 | Kurtenbach et al. |
| 2008/0222545 A1 | 9/2008 | Lemay et al. |
| 2008/0225007 A1 | 9/2008 | Nakadaira et al. |
| 2008/0229254 A1 | 9/2008 | Warner |
| 2008/0231610 A1 | 9/2008 | Hotelling et al. |
| 2008/0244119 A1 | 10/2008 | Tokuhara et al. |
| 2008/0259045 A1 | 10/2008 | Kim et al. |
| 2008/0259057 A1 | 10/2008 | Brons |
| 2008/0266407 A1 | 10/2008 | Battles et al. |
| 2008/0268882 A1 | 10/2008 | Moloney |
| 2008/0268948 A1* | 10/2008 | Boesen ............... G07F 17/3202 463/29 |
| 2008/0276201 A1 | 11/2008 | Risch et al. |
| 2008/0282202 A1 | 11/2008 | Sunday |
| 2008/0300055 A1 | 12/2008 | Lutnick et al. |
| 2008/0300572 A1 | 12/2008 | Rankers et al. |
| 2008/0307361 A1 | 12/2008 | Louch et al. |
| 2008/0307362 A1 | 12/2008 | Chaudhri et al. |
| 2008/0309632 A1 | 12/2008 | Westerman et al. |
| 2008/0310602 A1 | 12/2008 | Bhupati |
| 2008/0313110 A1 | 12/2008 | Kreamer et al. |
| 2008/0313596 A1 | 12/2008 | Kreamer et al. |
| 2009/0002324 A1 | 1/2009 | Harbeson et al. |
| 2009/0002335 A1 | 1/2009 | Chaudhri |
| 2009/0006991 A1 | 1/2009 | Lindberg et al. |
| 2009/0007017 A1 | 1/2009 | Anzures et al. |
| 2009/0019385 A1 | 1/2009 | Khatib et al. |
| 2009/0021488 A1 | 1/2009 | Kali et al. |
| 2009/0023433 A1 | 1/2009 | Walley et al. |
| 2009/0024946 A1 | 1/2009 | Gotz |
| 2009/0034805 A1 | 2/2009 | Perlmutter et al. |
| 2009/0058821 A1 | 3/2009 | Chaudhri et al. |
| 2009/0063971 A1 | 3/2009 | White et al. |
| 2009/0064055 A1 | 3/2009 | Chaudhri et al. |
| 2009/0070708 A1 | 3/2009 | Finkelstein |
| 2009/0077501 A1 | 3/2009 | Partridge et al. |
| 2009/0103780 A1 | 4/2009 | Nishihara et al. |
| 2009/0122018 A1 | 5/2009 | Vymenets et al. |
| 2009/0125842 A1 | 5/2009 | Nakayama |
| 2009/0128581 A1 | 5/2009 | Brid et al. |
| 2009/0132965 A1 | 5/2009 | Shimizu |
| 2009/0138194 A1 | 5/2009 | Geelen |
| 2009/0138827 A1 | 5/2009 | Van os et al. |
| 2009/0144653 A1 | 6/2009 | Ubillos |
| 2009/0150775 A1 | 6/2009 | Miyazaki et al. |
| 2009/0158200 A1 | 6/2009 | Palahnuk et al. |
| 2009/0163193 A1 | 6/2009 | Fyke et al. |
| 2009/0164936 A1 | 6/2009 | Kawaguchi |
| 2009/0178008 A1 | 7/2009 | Herz et al. |
| 2009/0183125 A1 | 7/2009 | Magal et al. |
| 2009/0184936 A1 | 7/2009 | Algreatly |
| 2009/0189911 A1 | 7/2009 | Ono |
| 2009/0199128 A1 | 8/2009 | Matthews et al. |
| 2009/0204920 A1 | 8/2009 | Beverley et al. |
| 2009/0204928 A1 | 8/2009 | Kallio et al. |
| 2009/0217187 A1 | 8/2009 | Kendall et al. |
| 2009/0217206 A1 | 8/2009 | Liu et al. |
| 2009/0217209 A1 | 8/2009 | Chen et al. |
| 2009/0222420 A1 | 9/2009 | Hirata |
| 2009/0222765 A1 | 9/2009 | Ekstrand |
| 2009/0228825 A1 | 9/2009 | Van os et al. |
| 2009/0237371 A1 | 9/2009 | Kim et al. |
| 2009/0237372 A1 | 9/2009 | Kim et al. |
| 2009/0249252 A1 | 10/2009 | Lundy et al. |
| 2009/0254799 A1 | 10/2009 | Unger |
| 2009/0254869 A1 | 10/2009 | Ludwig et al. |
| 2009/0265669 A1 | 10/2009 | Kida et al. |
| 2009/0278812 A1 | 11/2009 | Yasutake |
| 2009/0282369 A1 | 11/2009 | Jones |
| 2009/0288032 A1 | 11/2009 | Chang et al. |
| 2009/0295753 A1 | 12/2009 | King et al. |
| 2009/0303231 A1 | 12/2009 | Robinet et al. |
| 2009/0313584 A1 | 12/2009 | Kerr et al. |
| 2009/0313585 A1 | 12/2009 | Hellinger et al. |
| 2009/0315848 A1 | 12/2009 | Ku et al. |
| 2009/0319928 A1 | 12/2009 | Alphin et al. |
| 2009/0319935 A1 | 12/2009 | Figura |
| 2009/0322676 A1 | 12/2009 | Kerr et al. |
| 2009/0327969 A1 | 12/2009 | Estrada |
| 2010/0011304 A1 | 1/2010 | Van Os |
| 2010/0013780 A1 | 1/2010 | Ikeda et al. |
| 2010/0031203 A1 | 2/2010 | Morris et al. |
| 2010/0050133 A1 | 2/2010 | Nishihara et al. |
| 2010/0053151 A1 | 3/2010 | Marti et al. |
| 2010/0058182 A1 | 3/2010 | Jung |
| 2010/0063813 A1 | 3/2010 | Richter et al. |
| 2010/0082661 A1 | 4/2010 | Beaudreau |
| 2010/0083165 A1 | 4/2010 | Andrews et al. |
| 2010/0095206 A1 | 4/2010 | Kim |
| 2010/0095238 A1 | 4/2010 | Baudet |
| 2010/0095248 A1 | 4/2010 | Karstens |
| 2010/0105454 A1 | 4/2010 | Weber et al. |

(56) References Cited

U.S. PATENT DOCUMENTS

| | | |
|---|---|---|
| 2010/0107101 A1 | 4/2010 | Shaw et al. |
| 2010/0110025 A1 | 5/2010 | Lim |
| 2010/0115428 A1 | 5/2010 | Shuping et al. |
| 2010/0122195 A1 | 5/2010 | Hwang |
| 2010/0124152 A1 | 5/2010 | Lee |
| 2010/0153844 A1 | 6/2010 | Hwang et al. |
| 2010/0153878 A1 | 6/2010 | Lindgren et al. |
| 2010/0157742 A1 | 6/2010 | Relyea et al. |
| 2010/0159909 A1 | 6/2010 | Stifelman |
| 2010/0162170 A1 | 6/2010 | Johns et al. |
| 2010/0169357 A1 | 7/2010 | Ingrassia et al. |
| 2010/0179991 A1 | 7/2010 | Lorch et al. |
| 2010/0211872 A1 | 8/2010 | Rolston et al. |
| 2010/0223563 A1 | 9/2010 | Green |
| 2010/0223574 A1 | 9/2010 | Wang et al. |
| 2010/0229129 A1 | 9/2010 | Price et al. |
| 2010/0229130 A1 | 9/2010 | Edge et al. |
| 2010/0241955 A1 | 9/2010 | Price et al. |
| 2010/0241967 A1 | 9/2010 | Lee |
| 2010/0241999 A1 | 9/2010 | Russ et al. |
| 2010/0248788 A1 | 9/2010 | Yook et al. |
| 2010/0251085 A1 | 9/2010 | Zearing et al. |
| 2010/0257468 A1 | 10/2010 | Bernardo et al. |
| 2010/0283743 A1 | 11/2010 | Coddington |
| 2010/0315413 A1 | 12/2010 | Izadi et al. |
| 2010/0318709 A1 | 12/2010 | Bell et al. |
| 2010/0325529 A1 | 12/2010 | Sun |
| 2010/0332497 A1 | 12/2010 | Valliani et al. |
| 2010/0333017 A1 | 12/2010 | Ortiz |
| 2011/0004835 A1 | 1/2011 | Yanchar et al. |
| 2011/0007000 A1 | 1/2011 | Lim |
| 2011/0007009 A1 | 1/2011 | Ishihara et al. |
| 2011/0012921 A1 | 1/2011 | Cholewin et al. |
| 2011/0029934 A1 | 2/2011 | Locker et al. |
| 2011/0041098 A1 | 2/2011 | Kajiya et al. |
| 2011/0055722 A1 | 3/2011 | Ludwig |
| 2011/0059733 A1 * | 3/2011 | Kim .................... G06F 1/1626 455/418 |
| 2011/0061010 A1 | 3/2011 | Wasko |
| 2011/0078597 A1 | 3/2011 | Rapp et al. |
| 2011/0083104 A1 | 4/2011 | Minton |
| 2011/0093821 A1 | 4/2011 | Wigdor et al. |
| 2011/0119610 A1 | 5/2011 | Hackborn et al. |
| 2011/0119629 A1 | 5/2011 | Huotari et al. |
| 2011/0131534 A1 | 6/2011 | Subramanian et al. |
| 2011/0145758 A1 | 6/2011 | Rosales et al. |
| 2011/0148786 A1 | 6/2011 | Day et al. |
| 2011/0148798 A1 | 6/2011 | Dahl |
| 2011/0167058 A1 | 7/2011 | Van Os |
| 2011/0173556 A1 | 7/2011 | Czerwinski et al. |
| 2011/0179368 A1 | 7/2011 | King et al. |
| 2011/0225549 A1 | 9/2011 | Kim |
| 2011/0246918 A1 | 10/2011 | Henderson |
| 2011/0252346 A1 | 10/2011 | Chaudhri |
| 2011/0252349 A1 | 10/2011 | Chaudhri |
| 2011/0252372 A1 | 10/2011 | Chaudhri |
| 2011/0252373 A1 | 10/2011 | Chaudhri |
| 2011/0283334 A1 | 11/2011 | Choi et al. |
| 2011/0285659 A1 | 11/2011 | Kuwabara et al. |
| 2011/0298723 A1 | 12/2011 | Fleizach et al. |
| 2011/0302513 A1 | 12/2011 | Ademar et al. |
| 2011/0310005 A1 | 12/2011 | Chen et al. |
| 2011/0310058 A1 | 12/2011 | Yamada et al. |
| 2012/0023471 A1 | 1/2012 | Fischer et al. |
| 2012/0030623 A1 | 2/2012 | Hoellwarth |
| 2012/0066630 A1 | 3/2012 | Kim et al. |
| 2012/0084692 A1 | 4/2012 | Bae |
| 2012/0084694 A1 | 4/2012 | Sirpal et al. |
| 2012/0110031 A1 | 5/2012 | Lahcanski et al. |
| 2012/0151331 A1 | 6/2012 | Pallakoff et al. |
| 2012/0169617 A1 | 7/2012 | Maenpaa |
| 2012/0216146 A1 | 8/2012 | Korkonen |
| 2012/0324390 A1 | 12/2012 | Tao |
| 2013/0067411 A1 | 3/2013 | Kataoka et al. |
| 2013/0111400 A1 | 5/2013 | Miwa |
| 2013/0194066 A1 | 8/2013 | Rahman et al. |
| 2013/0205244 A1 | 8/2013 | Decker et al. |
| 2013/0234924 A1 | 9/2013 | Janefalkar et al. |
| 2013/0321340 A1 | 12/2013 | Seo et al. |
| 2013/0332886 A1 | 12/2013 | Cranfill et al. |
| 2014/0015786 A1 | 1/2014 | Honda |
| 2014/0068483 A1 | 3/2014 | Platzer et al. |
| 2014/0108978 A1 | 4/2014 | Yu et al. |
| 2014/0109024 A1 | 4/2014 | Miyazaki |
| 2014/0143784 A1 | 5/2014 | Mistry et al. |
| 2014/0165006 A1 | 6/2014 | Chaudhri et al. |
| 2014/0195972 A1 | 7/2014 | Lee et al. |
| 2014/0215457 A1 | 7/2014 | Gaya et al. |
| 2014/0237360 A1 | 8/2014 | Chaudhri et al. |
| 2014/0276244 A1 | 9/2014 | Kamyar |
| 2014/0293755 A1 | 10/2014 | Geiser et al. |
| 2014/0317555 A1 | 10/2014 | Choi et al. |
| 2014/0328151 A1 | 11/2014 | Serber |
| 2014/0365126 A1 | 12/2014 | Vulcano et al. |
| 2015/0012853 A1 | 1/2015 | Chaudhri et al. |
| 2015/0089407 A1 | 3/2015 | Suzuki |
| 2015/0105125 A1 | 4/2015 | Min et al. |
| 2015/0112752 A1 | 4/2015 | Wagner et al. |
| 2015/0117162 A1 | 4/2015 | Tsai |
| 2015/0160812 A1 | 6/2015 | Yuan et al. |
| 2015/0172438 A1 | 6/2015 | Yang |
| 2015/0242092 A1 | 8/2015 | Van Os et al. |
| 2015/0242989 A1 | 8/2015 | Mun et al. |
| 2015/0281945 A1 | 10/2015 | Seo et al. |
| 2015/0301506 A1 | 10/2015 | Koumaiha |
| 2015/0379476 A1 | 12/2015 | Chaudhri et al. |
| 2016/0034148 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0062572 A1 | 3/2016 | Yang et al. |
| 2016/0077495 A1 | 3/2016 | Brown et al. |
| 2016/0117141 A1 | 4/2016 | Ro et al. |
| 2016/0124626 A1 | 5/2016 | Lee et al. |
| 2016/0179310 A1 | 6/2016 | Chaudhri et al. |
| 2016/0182805 A1 | 6/2016 | Emmett et al. |
| 2016/0253065 A1 | 9/2016 | Platzer et al. |
| 2016/0269540 A1 | 9/2016 | Butcher et al. |
| 2017/0147198 A1 | 5/2017 | Herz et al. |
| 2017/0223176 A1 | 8/2017 | Anzures et al. |
| 2017/0255169 A1 | 9/2017 | Lee et al. |
| 2017/0357426 A1 | 12/2017 | Wilson et al. |
| 2017/0357427 A1 | 12/2017 | Wilson et al. |
| 2017/0357433 A1 | 12/2017 | Boule et al. |
| 2017/0374205 A1 | 12/2017 | Panda |
| 2018/0307388 A1 | 10/2018 | Chaudhri et al. |
| 2019/0173996 A1 | 6/2019 | Butcher et al. |
| 2019/0179514 A1 | 6/2019 | Van os et al. |
| 2019/0235724 A1 | 8/2019 | Platzer et al. |
| 2019/0320057 A1 | 10/2019 | Omernick et al. |
| 2020/0225843 A1 | 7/2020 | Herz et al. |

FOREIGN PATENT DOCUMENTS

| | | |
|---|---|---|
| AU | 2015100115 A4 | 3/2015 |
| CA | 2349649 A1 | 1/2002 |
| CH | 700242 A2 | 7/2010 |
| CN | 1257247 A | 6/2000 |
| CN | 1392977 A | 1/2003 |
| CN | 1464719 A | 12/2003 |
| CN | 1695105 A | 11/2005 |
| CN | 1773875 A | 5/2006 |
| CN | 1818843 A | 8/2006 |
| CN | 1940833 A | 4/2007 |
| CN | 1998150 A | 7/2007 |
| CN | 101072410 A | 11/2007 |
| CN | 101308443 A | 11/2008 |
| CN | 102244676 A | 11/2011 |
| CN | 102446059 A | 5/2012 |
| CN | 103210366 A | 7/2013 |
| EP | 163032 A2 | 12/1985 |
| EP | 322332 A2 | 6/1989 |
| EP | 404373 A1 | 12/1990 |
| EP | 476972 A2 | 3/1992 |

(56) References Cited

FOREIGN PATENT DOCUMENTS

| | | |
|---|---|---|
| EP | 626635 A2 | 11/1994 |
| EP | 651544 A2 | 5/1995 |
| EP | 689134 A1 | 12/1995 |
| EP | 701220 A1 | 3/1996 |
| EP | 844553 A1 | 5/1998 |
| EP | 880090 A2 | 11/1998 |
| EP | 1003098 A2 | 5/2000 |
| EP | 1049305 A1 | 11/2000 |
| EP | 1143334 A2 | 10/2001 |
| EP | 1186997 A2 | 3/2002 |
| EP | 1231763 A1 | 8/2002 |
| EP | 1517228 A2 | 3/2005 |
| EP | 1632874 A2 | 3/2006 |
| EP | 1674976 A2 | 6/2006 |
| EP | 1724996 A2 | 11/2006 |
| EP | 1744242 A2 | 1/2007 |
| EP | 1752880 A1 | 2/2007 |
| EP | 2150031 A1 | 2/2010 |
| EP | 1964022 B1 | 3/2010 |
| EP | 2911377 A1 | 8/2015 |
| FR | 2819675 A1 | 7/2002 |
| GB | 2301217 A | 11/1996 |
| GB | 2329813 A | 3/1999 |
| GB | 2407900 A | 5/2005 |
| JP | 5-225302 A | 9/1993 |
| JP | 6-51930 A | 2/1994 |
| JP | 6-208446 A | 7/1994 |
| JP | 7-225829 A | 8/1995 |
| JP | 8-221203 A | 8/1996 |
| JP | 9-73381 A | 3/1997 |
| JP | 9-97162 A | 4/1997 |
| JP | 9-101874 A | 4/1997 |
| JP | 9-138745 A | 5/1997 |
| JP | 9-258971 A | 10/1997 |
| JP | 9-292262 A | 11/1997 |
| JP | 9-297750 A | 11/1997 |
| JP | 10-40067 A | 2/1998 |
| JP | 10-96648 A | 4/1998 |
| JP | 10-214350 A | 8/1998 |
| JP | 11-143604 A | 5/1999 |
| JP | 11-508116 A | 7/1999 |
| JP | 11-242539 A | 9/1999 |
| JP | 11-327433 A | 11/1999 |
| JP | 2000-10702 A | 1/2000 |
| JP | 2000-20213 A | 1/2000 |
| JP | 2000-105772 A | 4/2000 |
| JP | 2000-163031 A | 6/2000 |
| JP | 2000-163193 A | 6/2000 |
| JP | 2000-163444 A | 6/2000 |
| JP | 2000-181436 A | 6/2000 |
| JP | 2000-242390 A | 9/2000 |
| JP | 2001-92430 A | 4/2001 |
| JP | 2001-92586 A | 4/2001 |
| JP | 2001-142604 A | 5/2001 |
| JP | 2001-175386 A | 6/2001 |
| JP | 2001-265481 A | 9/2001 |
| JP | 2001-312347 A | 11/2001 |
| JP | 2001-318751 A | 11/2001 |
| JP | 2002-41197 A | 2/2002 |
| JP | 2002-41206 A | 2/2002 |
| JP | 2002-62966 A | 2/2002 |
| JP | 2002-99370 A | 4/2002 |
| JP | 2002-132412 A | 5/2002 |
| JP | 2002-149312 A | 5/2002 |
| JP | 2002-149616 A | 5/2002 |
| JP | 2002-189567 A | 7/2002 |
| JP | 2002-244635 A | 8/2002 |
| JP | 2002-525705 A | 8/2002 |
| JP | 2002-297514 A | 10/2002 |
| JP | 2002-312105 A | 10/2002 |
| JP | 2002-323850 A | 11/2002 |
| JP | 2003-66941 A | 3/2003 |
| JP | 2003-139546 A | 5/2003 |
| JP | 2003-162356 A | 6/2003 |
| JP | 2003-198705 A | 7/2003 |
| JP | 2003-248538 A | 9/2003 |
| JP | 2003-256142 A | 9/2003 |
| JP | 2003-271310 A | 9/2003 |
| JP | 2003-295994 A | 10/2003 |
| JP | 2003-536125 A | 12/2003 |
| JP | 2004-38260 A | 2/2004 |
| JP | 2004-38310 A | 2/2004 |
| JP | 2004-62645 A | 2/2004 |
| JP | 2004-70492 A | 3/2004 |
| JP | 2004-118478 A | 4/2004 |
| JP | 2004-132741 A | 4/2004 |
| JP | 2004-152075 A | 5/2004 |
| JP | 2004-164242 A | 6/2004 |
| JP | 2004-206230 A | 7/2004 |
| JP | 2004-227393 A | 8/2004 |
| JP | 2004-288208 A | 10/2004 |
| JP | 2004-318505 A | 11/2004 |
| JP | 2004-341886 A | 12/2004 |
| JP | 2004-341892 A | 12/2004 |
| JP | 2004-343662 A | 12/2004 |
| JP | 2005-4396 A | 1/2005 |
| JP | 2005-4419 A | 1/2005 |
| JP | 2005-18229 A | 1/2005 |
| JP | 2005-115896 A | 4/2005 |
| JP | 2005-515530 A | 5/2005 |
| JP | 2005-198064 A | 7/2005 |
| JP | 2005-202703 A | 7/2005 |
| JP | 2005-227951 A | 8/2005 |
| JP | 2005-228088 A | 8/2005 |
| JP | 2005-228091 A | 8/2005 |
| JP | 2005-234291 A | 9/2005 |
| JP | 2005-242669 A | 9/2005 |
| JP | 2005-267049 A | 9/2005 |
| JP | 2005-309933 A | 11/2005 |
| JP | 2005-321915 A | 11/2005 |
| JP | 2005-327064 A | 11/2005 |
| JP | 2005-352924 A | 12/2005 |
| JP | 2005-352943 A | 12/2005 |
| JP | 2006-18645 A | 1/2006 |
| JP | 2006-99733 A | 4/2006 |
| JP | 2006-155232 A | 6/2006 |
| JP | 2006-259376 A | 9/2006 |
| JP | 2007-25998 A | 2/2007 |
| JP | 2007-124667 A | 5/2007 |
| JP | 2007-132676 A | 5/2007 |
| JP | 2007-512635 A | 5/2007 |
| JP | 2007-334984 A | 12/2007 |
| JP | 2008-15698 A | 1/2008 |
| JP | 2008-503007 A | 1/2008 |
| JP | 2008-102860 A | 5/2008 |
| JP | 2008-123553 A | 5/2008 |
| JP | 2008-518330 A | 5/2008 |
| JP | 2008-304959 A | 12/2008 |
| JP | 2008-306667 A | 12/2008 |
| JP | 2009-9350 A | 1/2009 |
| JP | 2009-508217 A | 2/2009 |
| JP | 2009-51921 A | 3/2009 |
| JP | 2009-136456 A | 6/2009 |
| JP | 2009-522666 A | 6/2009 |
| JP | 2009-151821 A | 7/2009 |
| JP | 2009-277192 A | 11/2009 |
| JP | 2010-61402 A | 3/2010 |
| JP | 2010-97552 A | 4/2010 |
| JP | 2010-187096 A | 8/2010 |
| JP | 2010-538394 A | 12/2010 |
| JP | 2012-208645 A | 10/2012 |
| JP | 2013-25357 A | 2/2013 |
| JP | 2013025409 A | 2/2013 |
| JP | 2013-120468 A | 6/2013 |
| JP | 2013-191234 A | 9/2013 |
| JP | 2013-206274 A | 10/2013 |
| JP | 2013-211055 A | 10/2013 |
| JP | 2014-503891 A | 2/2014 |
| KR | 10-2002-0010863 A | 2/2002 |
| KR | 10-0490373 B1 | 5/2005 |
| KR | 10-2006-0085850 A | 7/2006 |
| KR | 10-2009-0035499 A | 4/2009 |
| KR | 10-2009-0100320 A | 9/2009 |
| KR | 10-2010-0019887 A | 2/2010 |

(56) References Cited

FOREIGN PATENT DOCUMENTS

| | | |
|---|---|---|
| KR | 10-2011-0078008 A | 7/2011 |
| KR | 10-2011-0093729 A | 8/2011 |
| KR | 10-2012-0057800 A | 6/2012 |
| KR | 10-2013-0016329 A | 2/2013 |
| KR | 1020150022599 A | 3/2015 |
| WO | 96/6401 A1 | 2/1996 |
| WO | 98/44431 A2 | 10/1998 |
| WO | 99/28815 A1 | 6/1999 |
| WO | 99/38149 A1 | 7/1999 |
| WO | 99/54807 A1 | 10/1999 |
| WO | 00/8757 A1 | 2/2000 |
| WO | 01/6186 A2 | 3/2000 |
| WO | 01/16690 A2 | 3/2001 |
| WO | 01/57716 A2 | 8/2001 |
| WO | 02/8881 A2 | 1/2002 |
| WO | 02/13176 A2 | 2/2002 |
| WO | 02/32088 A2 | 4/2002 |
| WO | 02/46903 A1 | 6/2002 |
| WO | 02/82418 A2 | 10/2002 |
| WO | 02/93542 A1 | 11/2002 |
| WO | 03/52626 A1 | 6/2003 |
| WO | 03/60622 A2 | 7/2003 |
| WO | 03/107168 A1 | 12/2003 |
| WO | 2004/21166 A1 | 3/2004 |
| WO | 2004/40481 A1 | 5/2004 |
| WO | 2004/63862 A2 | 7/2004 |
| WO | 2005/36416 A2 | 4/2005 |
| WO | 2005/41020 A1 | 5/2005 |
| WO | 2005/055034 A1 | 6/2005 |
| WO | 2005/74268 A1 | 8/2005 |
| WO | 2005/106684 A1 | 11/2005 |
| WO | 2006/3591 A2 | 1/2006 |
| WO | 2006/012343 A2 | 2/2006 |
| WO | 2006/20304 A2 | 2/2006 |
| WO | 2006/20305 A2 | 2/2006 |
| WO | 2006019639 A2 | 2/2006 |
| WO | 2006/36069 A1 | 4/2006 |
| WO | 2006/37545 A2 | 4/2006 |
| WO | 2006/117438 A1 | 11/2006 |
| WO | 2006/119269 A2 | 11/2006 |
| WO | 2007/31816 A1 | 3/2007 |
| WO | 2007/032908 A1 | 3/2007 |
| WO | 2007/32972 A1 | 3/2007 |
| WO | 2006/020304 A3 | 5/2007 |
| WO | 2007/69835 A1 | 6/2007 |
| WO | 2007/80559 A2 | 7/2007 |
| WO | 2007/94894 A2 | 8/2007 |
| WO | 2007/142256 A1 | 12/2007 |
| WO | 2008/017936 A2 | 2/2008 |
| WO | 2008/30874 A1 | 3/2008 |
| WO | 2008/30976 A2 | 3/2008 |
| WO | 2008/86303 A1 | 7/2008 |
| WO | 2008/114491 A1 | 9/2008 |
| WO | 2009/32638 A2 | 3/2009 |
| WO | 2009/89222 A2 | 7/2009 |
| WO | 2011/126501 A1 | 10/2011 |
| WO | 2012/078079 A2 | 6/2012 |
| WO | 2013/017736 A1 | 2/2013 |
| WO | 2013/157330 A1 | 10/2013 |

OTHER PUBLICATIONS

Office Action received for Australian Patent Application No. 2017202587, dated Jul. 4, 2019, 4 pages.
Office Action received for Canadian Patent Application No. 2,983,178, dated Jul. 22, 2019, 6 pages.
Applicant-Initiated Interview Summary received for U.S. Appl. No. 15/418,537, dated Dec. 23, 2019, 6 pages.
Notice of Acceptance received for Australian Patent Application No. 2017277851, dated Dec. 9, 2019, 3 pages.
Notice of Allowance received for U.S. Appl. No. 15/426,836, dated Dec. 16, 2019, 16 pages.
Office Action received for Japanese Patent Application No. 2018-121118, dated Nov. 18, 2019, 10 pages (5 pages of English Translation and 5 pages of Official Copy).
Advisory Action received for U.S. Appl. No. 12/217,029, dated Dec. 14, 2016, 3 pages.
Advisory Action received for U.S. Appl. No. 14/710,125, dated Mar. 14, 2017, 3 pages.
"Asus Eee News, Mods, and Hacks: Asus Eee PC Easy Mode Internet Tab Options Tour", asuseeehacks.blogspot.com, Available online at <http://asuseeehacks.blogspot.com/2007/11/asus-eee-pc-user-interface-tour.html>, Nov. 10, 2007, 33 pages.
"Autocomplete Plugin", Emesene Forum, available at <http://emeseme.org/smf/index.olm?topic=1276.0>, Jun. 20, 2008, 5 pages.
Board Opinion received for Chinese Patent Application No. 200780041309.3, dated Apr. 1, 2016, 16 pages.
Decision of Board of Appeal received for European Patent Application No. 09170697.8 dated Oct. 24, 2016, 24 pages.
Decision to Grant received for European Patent Application No. 12177813.8, dated Nov. 24, 2016, 3 pages.
Decision to Grant Received for European Patent Application No. 12194315.3, dated Oct. 12, 2017, 2 pages.
Decision to refuse a European Patent application received for European Patent Application No. 06846840.4 , dated Mar. 4, 2010, 10 Pages.
"Desktop Icon Toy-History", Available online at <http://www.idesksoft.com/history.html>, retrieved on Jan. 2, 2010, retrieved on Jan. 2, 2010, 2 pages.
Examiner's Answer to Appeal Brief received for U.S. Appl. No. 14/710,125, dated Jan. 26, 2018, 6 pages.
Final Office Action received for U.S. Appl. No. 12/242,851, dated Jul. 1, 2016, 90 pages.
Final Office Action received for U.S. Appl. No. 14/261,112, dated Aug. 10, 2017, 35 pages.
Final Office Action received for U.S. Appl. No. 14/710,125, dated Oct. 27, 2016, 13 pages.
"ImageShack—Hosting", available at <http://img129.imageshack.us/mv.php?image=autocompleteemoticonprexw0.jpg>, Nov. 10, 2008, 1 page.
Intention to Grant received for European Patent Application No. 12177813.8, dated Jul. 6, 2016, 8 pages.
Intention to Grant received for European Patent Application No. 12194312.0, dated Aug. 3, 2017, 8 pages.
Intention to Grant received for European Patent Application No. 12194315.3, dated May 31, 2017, 8 pages.
"ISO 9241-10:1996 Ergonomic Requirements for Office Work with Visual Display Terminals (VDTs)—Part 10", Dialogue Principles, International Standard—ISO, Zuerich, CH, vol. 9241-10, May 1, 1996, 17 pages.
"ISO 9241-11:1998 Ergonomic requirements for office work with visual display terminals (VDTs)—Part 11", Guidance on usability, International Standard—ISO, Zuerich, CH, vol. 9241-11, Mar. 15, 1998, 27 pages.
"ISO 9241-12:1998 Ergonomic requirements for office work with visual display terminals (VDTs)—Part 12", Presentation of Information, International Standard ISO, Zuerich, CH, vol. 9241-12, Dec. 1, 1998, 52 pages.
"Launch'Em Version 3.1", Retrieved from the Internet: <http://www.fladnag.net/downloads/telephone/palm/APPS/lnchem31/Documentation/LaunchEm.pdf>, 2001, pp. 1-39.
"Macintosh Human Interface Guidelines (chapter 1)", 1995, pp. 3-14.
"N1 Quick Start Guide", Version 0.5, Available at <http://www.instructionsmanuals.com/download/telefonos_movil/Neonode-N1-en.pdf>, Jul. 29, 2004, pp. 1-24.
"Nokia 7710", https://www.nokia.com/en_int/phones/sites/default/files/user-guides/Nokia_7710_UG_en.pdf, 2005, pp. 1-153.
Non-Final Office Action received for U.S. Appl. No. 11/459,602, dated Sep. 4, 2008, 13 pages.
Non-Final Office Action received for U.S. Appl. No. 11/850,005, dated Apr. 12, 2017, 11 pages.
Non-Final Office Action received for U.S. Appl. No. 11/850,010, dated Jul. 24, 2017, 19 pages.
Non-Final Office Action received for U.S. Appl. No. 14/261,112, dated Nov. 29, 2016, 34 pages.

(56) References Cited

OTHER PUBLICATIONS

Notice of Acceptance received for Australian Patent Application No. 2014204422, dated Apr. 28, 2016, 2 pages.
Notice of Allowance received for Australian Patent Application No. 2015202076, dated Apr. 5, 2017, 3 Pages.
Notice of Allowance received for Canadian Patent Application No. 2,890,778, dated Apr. 24, 2017, 1 page.
Notice of Allowance received for Chinese Patent Application No. 200780041309.3, dated Jul. 31, 2017, 2 Pages.
Notice of Allowance received for Chinese Patent Application No. 201210399033.9, dated Jun. 20, 2016, 3 pages.
Notice of Allowance received for Japanese Patent Application No. 2013252338, dated Jun. 23, 2017, 3 pages.
Notice of Allowance received for Japanese Patent Application No. 2013-011209, dated Jun. 13, 2016, 2 pages.
Notice of Allowance received for U.S. Appl. No. 11/459,602, dated Jan. 9, 2009, 6 pages.
Notice of Allowance received for U.S. Appl. No. 12/217,029, dated Jan. 17, 2017, 10 pages.
Notice of Allowance received for U.S. Appl. No. 12/242,851, dated Dec. 27, 2016, 20 pages.
Notice of Allowance received for U.S. Appl. No. 12/364,470, dated Nov. 24, 2017, 9 pages.
Office Action received for European Patent Application No. 13174706.5, dated Oct. 16, 2017, 8 pages.
Office Action received for Australian Patent Application No. 2015202076, dated May 5, 2016, 3 pages.
Office Action received for Australian Patent Application No. 2015215876, dated Aug. 1, 2016, 4 pages.
Office Action received for Australian Patent Application No. 2015215876, dated Jun. 28, 2017, 4 pages.
Office Action received for Australian Patent Application No. 2015215876, dated May 24, 2017, 4 pages.
Office Action received for Australian Patent Application No. 2016213886, dated May 18, 2017, 2 pages.
Office Action received for Canadian Patent Application No. 2,890,778, dated May 19, 2016, 6 pages.
Office Action received for Chinese Patent Application No. 200780041309.3, dated Feb. 8, 2017, 4 pages.
Office Action received for Chinese Patent Application No. 201310724733.5, dated Apr. 12, 2016, 14 pages.
Office Action received for Chinese Patent Application No. 201310724733.5, dated Apr. 21, 2017, 18 pages.
Office Action received for Chinese Patent Application No. 201310724733.5, dated Dec. 30, 2016, 13 pages.
Office Action received for Chinese Patent Application No. 201410250648.4, dated Jun. 29, 2017, 13 pages.
Office Action received for Chinese Patent Application No. 201410250648.4, dated Oct. 9, 2016, 6 pages.
Office Action received for Chinese Patent Application No. 201410250688.9, dated Jun. 1, 2017, 12 pages.
Office Action received for Chinese Patent Application No. 201410250688.9, dated Sep. 28, 2016, 7 pages.
Office Action received for Chinese Patent Application No. 201410251370.2, dated May 12, 2017, 8 pages.
Office Action received for Chinese Patent Application No. 201410251370.2, dated Sep. 5, 2016, 7 pages.
Office Action Received for Chinese Patent Application No. 201410251400.X, dated Jul. 4, 2016, 8 Pages.
Office Action Received for Chinese Patent Application No. 201410251400.X, dated May 26, 2017, 11 pages.
Office Action received for European Patent Application No. 08829660.3, dated Jul. 5, 2016, 5 pages.
Office Action received for European Patent Application No. 09170697.8, dated Mar. 3, 2017, 8 pages.
Office Action received for Japanese Patent Application No. 2013-252338, dated Jan. 27, 2017, 10 pages.
Office Action received for Japanese Patent Application No. 2013-252338, dated Jun. 24, 2016, 4 pages.
Office Action received for Japanese Patent Application No. 2014-253365, dated Jul. 18, 2017, 9 pages.
Office Action received for Japanese Patent Application No. 2014-253365, dated Oct. 17, 2016, 11 pages.
Office Action received for Japanese Patent Application No. 2016-042767, dated Mar. 3, 2017, 10 pages.
Office Action received for Japanese Patent Application No. 2016-091460, dated Jun. 26, 2017, 6 pages.
Office Action received for Japanese Patent Application No. 2016-091460, dated Nov. 4, 2016, 6 pages.
Office Action received for Japanese Patent Application No. 2016-091460, dated Nov. 27, 2017, 7 pages.
"SilverScreen Theme Library", Online Available at <https://web.archive.org/web/20061113121041/http://www.pocketsensei.com/ss_themes.htm>, Nov. 13, 2006, 3 pages.
"SilverScreen User Guide", Online Available at <https://web.archive.org/web/20061113121032/http://www.pocketsensei.com/ss_guide.htm>, Nov. 13, 2006, 12 pages.
"Smiley Conversion Table", available at <http://surf-style.us/manual3.htm>, Dec. 5, 2008, 8 pages.
Summons to Attend oral proceedings received for European Application No. 09170697.8, mailed on Jul. 29, 2016, 9 pages.
Summons to Attend Oral Proceedings received for European Application No. 09170697.8, mailed on Oct. 19, 2017, 12 pages.
Summons to Oral Proceedings received for European Patent Application No. 12194312.0, mailed on Dec. 8, 2016, 9 pages.
Summons to Oral Proceedings received for European Patent Application No. 12194315.3, mailed on Dec. 8, 2016, 9 pages.
"TH8000 Series Programmable Thermostats", 2004, 44 pages.
Office Action received from European Patent Application No. 06846840.4, dated Oct. 13, 2008, 3 pages.
Summons to Attend Oral proceedings received for European Patent Application No. 06846840.4, mailed on May 18, 2009, 7 Pages.
Decision to Refuse Patent Application received for European Patent Application No. 07814689.1, dated May 11, 2012, 15 Pages.
Office Action received for European Patent Application No. 07814689.1, dated Mar. 4, 2011, 6 pages.
Summons to Attend Oral Proceedings received for European Patent Application No. 07814689.1, mailed on Dec. 1, 2011, 11 pages.
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, mailed on Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.
Office Action received for European Patent Application No. 07869929.5, dated Dec. 27, 2010, 6 pages.
Summons to Attend Oral Proceedings received for European Patent Application No. 07869929.5, Dec. 13, 2011, 6 pages.
Summons to Attend Oral Proceedings received for European Patent Application No. 07869929.5, mailed on Jan. 23, 2012, 1 page.
Communication received for European Patent Application No. 08798713.7, dated Apr. 28, 2010, 2 pages.
Office Action received for European Patent Application No. 08798713.7, dated Feb. 9, 2012, 7 pages.
Office Action received for European Patent Application No. 08798713.7, dated Jul. 29, 2014, 18 pages.
Office Action received for European Patent Application No. 08798713.7, dated Jun. 22, 2011, 10 pages.
Summons to Attend Oral Proceedings received for European Patent Application No. 08798713.7, mailed on Aug. 30, 2013, 15 pages.
Office Action received for European Patent Application No. 08829660.3, dated Aug. 2, 2013, 7 pages.
Office Action received for European Patent Application No. 08829660.3, dated Oct. 15, 2010, 8 pages.
Decision to Refuse Application received for European Patent Application No. 09170697.8, dated Oct. 23, 2013, 12 Pages.
Extended European Search Report received for European Patent Application No. 09170697.8, dated Apr. 28, 2010, 3 pages.

(56) References Cited

OTHER PUBLICATIONS

Office Action received for European Patent Application No. 09170697.8 dated Dec. 13, 2011, 4 pages.
Summons to attend oral proceedings received for European Application No. 09170697.8 mailed on Apr. 22, 2013, 6 pages.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.
Office Action received for European Patent Application No. 09171787.6, dated Jul. 12, 2011, 5 pages.
Decision to Grant received for European Patent Application No. 09700333.9, dated Nov. 7, 2013, 2 pages.
Intention to Grant received for European Patent Application No. 09700333.9, dated Jun. 20, 2013, 7 pages.
Office Action received for European Patent Application No. 09700333.9, dated Jun. 10, 2011, 5 pages.
Office Action received for European Patent Application No. 09700333.9, dated Nov. 26, 2010, 5 pages.
Summons to Attend Oral Proceedings received for European Patent Application No. 09700333.9, mailed on Sep. 21, 2012, 4 pages.
Office Action received for Taiwan Patent Application No. 097100075, dated Dec. 29, 2011, 5 pages.
Notice of Allowance received for Korean Patent Application No. 10-2009-7007064, dated Sep. 30, 2011, 2 pages.
Notice of Allowance received for Korean Patent Application No. 10-2009-7007067, dated Dec. 1, 2011, 2 pages.
Office Action received for Korean Patent Application No. 10-2009-7007067, dated Aug. 30, 2011, 2 pages.
Office Action received for Korean Patent Application No. 10-2009-7007067, dated Nov. 12, 2010, 3 pages.
Notice of Allowance received for Korean Patent Application No. 10-2010-7007258, dated Nov. 20, 2013, 2 pages.
Office Action received for Korean Patent Application No. 10-2010-7007258, dated Aug. 8, 2011, 2 pages.
Office Action received for Korean Patent Application No. 10-2010-7007258, dated Jan. 30, 2013, 8 pages.
Notice of Allowance received for Korean Patent Application No. 10-2011-7014104, dated Aug. 29, 2013, 2 pages.
Office Action received for Korean Patent Application No. 10-2011-7014104, dated Jan. 17, 2013, 4 pages.
Notice of Allowance received for Korean Patent Application No. 10-2011-7019633, dated May 18, 2012, 2 pages.
Notice of Allowance received for Korean Patent Application No. 10-2011-7026583, dated Apr. 29, 2015, 3 pages.
Office Action received for Korean Patent Application No. 10-2011-7026583, dated Aug. 14, 2014, 6 pages.
Notice of Allowance received for Korean Patent Application No. 10-2014-7011273, dated Apr. 28, 2015, 3 pages.
Office Action received for Korean Patent Application No. 10-2014-7011273, dated Aug. 14, 2014, 5 pages.
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647 dated Mar. 2, 2012, 8 pages.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Notice of Allowance received for U.S. Appl. No. 11/849,938, dated Nov. 27, 2013, 2 pages.
Notice of Allowance received for U.S. Appl. No. 11/849,938, dated Oct. 10, 2013, 28 pages.
Final Office Action received for U.S. Appl. No. 11/850,005, dated Jul. 8, 2011, 9 pages.
Final Office Action received for U.S. Appl. No. 11/850,005, dated May 22, 2014, 13 pages.
Final Office Action received for U.S. Appl. No. 11/850,005, dated Nov. 16, 2015, 13 pages.
Final Office Action received for U.S. Appl. No. 11/850,005, dated Sep. 14, 2012, 9 pages.
Non-Final Office Action received for U.S. Appl. No. 11/850,005, dated May 29, 2015, 12 pages.
Non-Final Office Action received for U.S. Appl. No. 11/850,005, dated Mar. 18, 2011 10 pages.
Non-Final Office Action received for U.S. Appl. No. 11/850,005, dated Nov. 10, 2011, 11 pages.
Non-Final Office Action received for U.S. Appl. No. 11/850,005, dated Oct. 24, 2013, 11 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.
Final Office Action received for U.S. Appl. No. 11/850,010 dated Oct. 17, 2011, 11 pages.
Final Office Action received for U.S. Appl. No. 11/850,010, dated Apr. 18, 2016, 16 pages.
Final Office Action received for U.S. Appl. No. 11/850,010, dated Feb. 15, 2013, 12 pages.
Final Office Action received for U.S. Appl. No. 11/850,010, dated May 8, 2014, 11 pages.
Non-Final Office Action received for U.S. Appl. No. 11/850,010, dated Dec. 17, 2014, 10 pages.
Non-Final Office Action received for U.S. Appl. No. 11/850,010, dated Oct. 24, 2013, 13 pages.
Non-Final Office Action received for U.S. Appl. No. 11/850,010 dated May 16, 2012, 12 pages.
Non-Final Office Action received for U.S. Appl. No. 11/850,010 dated May 2, 2011, 10 pages.
Non-Final Office Action received for U.S. Appl. No. 11/850,010, dated Jun. 25, 2015, 10 pages.
Final Office Action received for U.S. Appl. No. 11/850,011, dated Dec. 1, 2010, 15 pages.
Non-Final Office Action received for U.S. Appl. No. 11/850,011, dated Aug. 11, 2010, 19 pages.
Notice of Allowance received for U.S. Appl. No. 11/850,011, dated Feb. 11, 2011, 5 pages.
Notice of Allowance received for U.S. Appl. No. 11/850,011, dated Feb. 18, 2011, 4 pages.
Supplemental Notice of Allowance received for U.S. Appl. No. 11/850,011, dated Feb. 24, 2011, 6 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated Feb. 8, 2011, 14 pages.
Final Office Action received for U.S. Appl. No. 11/850,638, dated May 15, 2012, 16 pages.
Non-Final Office Action received for U.S. Appl. No. 11/850,638, dated Jan. 17, 2012, 15 pages.
Non-Final Office Action received for U.S. Appl. No. 11/850,638, dated Oct. 26, 2010, 17 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.

(56) References Cited

OTHER PUBLICATIONS

Non-Final Office Action received for U.S. Appl. No. 11/961,773, dated May 10, 2012, 14 pages.
Final Office Action received for U.S. Appl. No. 11/969,809, dated Jul. 14, 2011, 26 pages.
Non-Final Office Action received for U.S. Appl. No. 11/969,809, dated Mar. 14, 2011, 25 pages.
Notice of Allowance received for U.S. Appl. No. 11/969,809, dated Apr. 26, 2013, 17 pages.
Final Office Action received for U.S. Appl. No. 11/969,912, dated Oct. 31, 2011, 11 pages.
Non-Final Office Action received for U.S. Appl. No. 11/969,912, dated Apr. 13, 2011, dated Apr. 13, 2011, 9 pages.
Non-Final Office Action received for U.S. Appl. No. 11/969,912, dated Sep. 10, 2013, 12 pages.
Notice of Allowance received for U.S. Appl. No. 11/969,912, dated Jun. 11, 2014, 4 pages.
Notice of Allowance received for U.S. Appl. No. 11/969,912, dated Mar. 6, 2014, 12 pages.
Office Action received from German Patent Application No. 112006003600.9, dated Aug. 9, 2011, 4 pages.
Office Action received from German Patent Application No. 112006003600.9, dated Oct. 27, 2009, 9 pages.
Office Action received for German Patent Application No. 112007002107.1, dated Jun. 7, 2010, 3 pages.
Final Office Action received for U.S. Appl. No. 12/217,029, dated May 22, 2014, 12 pages.
Final Office Action received for U.S. Appl. No. 12/217,029, dated Oct. 5, 2012, 28 pages.
Non-Final Office Action received for U.S. Appl. No. 12/217,029, dated Apr. 18, 2011, 26 pages.
Non-Final Office Action received for U.S. Appl. No. 12/217,029, dated Aug. 19, 2013, 10 pages.
Non-Final Office Action received for U.S. Appl. No. 12/217,029, dated Jan. 25, 2012, 20 pages.
Non-Final Office Action received for U.S. Appl. No. 12/217,029, dated Oct. 28, 2015, 23 pages.
Advisory Action received for U.S. Appl. No. 12/242,851, dated Nov. 15, 2013, 4 pages.
Final Office Action received for U.S. Appl. No. 12/242,851, dated Dec. 12, 2011, 13 pages.
Final Office Action received for U.S. Appl. No. 12/242,851, dated May 10, 2013, 20 pages.
Non-Final Office Action received for U.S. Appl. No. 12/242,851, dated Apr. 15, 2011, 20 pages.
Non-Final Office Action received for U.S. Appl. No. 12/242,851, dated Jun. 26, 2015, 33 pages.
Non-Final Office Action received for U.S. Appl. No. 12/242,851, dated Oct. 6, 2014, 27 pages.
Non-Final Office Action received for U.S. Appl. No. 12/242,851, dated Sep. 20, 2012, 19 pages.
Final Office Action received for U.S. Appl. No. 12/274,346, dated Mar. 14, 2012, 39 pages.
Non-Final Office Action received for U.S. Appl. No. 12/274,346, dated Aug. 26, 2011, 26 pages.
Notice of Allowance received for U.S. Appl. No. 12/274,346, dated Jul. 17, 2013, 10 pages.
Notice of Allowance received for U.S. Appl. No. 12/274,346, dated Mar. 12, 2013, 18 pages.
Final Office Action received for U.S. Appl. No. 12/364,470, dated May 5, 2010, 16 pages.
Final Office Action received for U.S. Appl. No. 12/364,470, dated Oct. 19, 2011, 20 pages.
Non-Final Office Action received for U.S. Appl. No. 12/364,470, dated Mar. 4, 2011, 17 pages.
Non-Final Office Action received for U.S. Appl. No. 12/364,470, dated Nov. 13, 2009, 15 pages.
Non-Final Office Action received for U.S. Appl. No. 12/364,470, dated Sep. 2, 2010, 26 pages.

Final Office Action received for U.S. Appl. No. 12/365,887, dated Feb. 29, 2012, 15 pages.
Non-Final Office Action received for U.S. Appl. No. 12/365,887, dated Aug. 31, 2011, 22 pages.
Notice of Allowance received for U.S. Appl. No. 12/365,887, dated May 23, 2012, 5 pages.
Non-Final Office Action received for U.S. Appl. No. 12/365,888, dated Nov. 10, 2011, 8 pages.
Non-Final Office Action received for U.S. Appl. No. 12/981,433, dated Oct. 11, 2012, 29 pages.
Extended European Search Report (includes Partial European Search Report and European Search Opinion) received for European Patent Application No. 12169786.6, dated Jul. 11, 2012, 10 pages.
Extended European Search Report received for European Patent Application No. 12177813.8, dated Feb. 1, 2013, 6 pages.
Extended European Search Report received for European Patent Application No. 12189764.9, dated Jan. 4, 2013, 6 pages.
Office Action Received for European Patent Application No. 12189764.9, dated Mar. 1, 2016, 6 pages.
Extended European Search Report received for European Patent Application No. 12194312.0 dated Jan. 16, 2013, 7 pages.
Office Action received for European Patent Application No. 12194312.0, dated Jan. 13, 2014, 4 pages.
Office Action received for European Patent Application No. 12194312.0, dated Oct. 8, 2013, 5 pages.
Extended European Search Report received for European Patent Application No. 12194315.3, dated Jan. 16, 2013, 7 pages.
Office Action received for European Patent Application No. 12194315.3, dated Jan. 13, 2014, 4 pages.
Office Action received for European Patent Application No. 12194315.3, dated Oct. 8, 2013, 5 pages.
Non-Final Office Action received for U.S. Appl. No. 13/104,903, dated Nov. 13, 2012, 9 pages.
Notice of Allowance received for U.S. Appl. No. 13/104,903, dated Apr. 29, 2013, 6 pages.
Non-Final Office Action received for U.S. Appl. No. 13/104,911, dated Feb. 20, 2013, 11 pages.
Notice of Allowance received for U.S. Appl. No. 13/104,911, dated Jun. 10, 2013, 6 pages.
Non-Final Office Action received for U.S. Appl. No. 13/155,304, dated Sep. 5, 2012, 11 pages.
Extended European Search Report (includes Partial European Search Report and European Search Opinion) received for European Patent Application No. 13174706.5, dated Jan. 8, 2015, 8 pages.
Notice of Allowance received for U.S. Appl. No. 14/011,639, dated Sep. 29, 2015, 11 pages.
Notice of Allowance received for U.S. Appl. No. 14/011,639, dated Feb. 16, 2016, 5 pages.
Final Office Action received for U.S. Appl. No. 14/142,640, dated Mar. 8, 2016, 35 pages.
Non-Final Office Action received for U.S. Appl. No. 14/142,640, dated Jun. 5, 2015, 29 pages.
Advisory Action received for U.S. Appl. No. 14/261,112, dated Apr. 23, 2015, 3 pages.
Final Office Action received for U.S. Appl. No. 14/261,112, dated Mar. 3, 2016, 31 pages.
Final Office Action received for U.S. Appl. No. 14/261,112, dated Oct. 9, 2014, 29 pages.
Non-Final Office Action received for U.S. Appl. No. 14/261,112, dated Jul. 8, 2015, 29 pages.
Non-Final Office Action received for U.S. Appl. No. 14/261,112, dated Jun. 18, 2014, 25 pages.
Non-Final Office Action received for U.S. Appl. No. 14/710,125, dated Apr. 12, 2016, 12 pages.
Notice of Allowance received for Canadian Patent Application No. 2,633,759, dated Sep. 9, 2013, 1 page.
Office Action received for Canadian Patent Application No. 2,633,759, dated Aug. 12, 2010, 8 pages.
Office Action received from Canadian Patent Application No. 2,633,759, dated Apr. 18, 2013, 2 pages.
Notice of Allowance received for Canadian Patent Application No. 2,845,297, dated Nov. 10, 2014, 1 page.

(56) References Cited

OTHER PUBLICATIONS

Office Action received for Canadian Patent Application No. 2,845,297, dated Apr. 23, 2014, 2 pages.
Grant for Invention Patent Received in Chinese Patent Application No. 200680053441.1, dated Jan. 28, 2011, 1 page.
Office Action received for Chinese Patent Application No. 200680053441.1, dated Nov. 12, 2010, 4 pages.
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages.
Office Action received for Chinese Patent Application No. 200780001140.9, dated Jan. 15, 2010, 5 pages.
Office Action received for Chinese Patent Application No. 200780001140.9, dated Jun. 10, 2011, 7 pages.
Office Action received for Chinese Patent Application No. 200780041222.6, dated Feb. 29, 2012, 6 pages.
Office Action received for Chinese Patent Application No. 200780041222.6, dated Jul. 25, 2012, 3 pages.
Office Action received for Chinese Patent Application No. 200780041222.6, dated Oct. 13, 2010, 10 pages.
Office Action received for Chinese Patent Application No. 200780041309.3, dated Nov. 1, 2012, 5 pages.
Office Action received for Chinese Patent Application No. 200780041309.3, dated Jan. 18, 2012, 15 pages.
Office Action received from Chinese Patent Application No. 200780041309.3, dated Jul. 2, 2013, 12 pages.
Office Action received for Chinese Patent Application No. 200780052019.9, dated Feb. 29, 2012, 6 pages.
Notice of Acceptance received for Australian Patent Application No. 2008296445, dated Dec. 14, 2011, 4 pages.
Office Action received for Australian Patent Application No. 2008296445, dated Oct. 29, 2010, 2 pages.
Office Action received from Japanese Patent Application No. 2008-548858 dated May 30, 2011, 3 pages.
Office Action received from Japanese Patent Application No. 2008-548858, dated Jan. 20, 2012, 5 pages.
Patent Grant received for Japanese Patent Application No. 2008-548858, dated Sep. 24, 2012, 3 pages.
Decision to Grant received for Chinese Patent Application No. 200880110709.X, dated Aug. 6, 2012, 2 pages.
Office Action received for Chinese Patent Application No. 200880110709.X, dated Nov. 24, 2011, 10 pages.
Office Action received for Chinese Patent Application No. 200880112570.2, dated Aug. 24, 2011, 6 pages.
Office Action received from Chinese Patent Application No. 200880112570.2, dated Feb. 20, 2013, 7 pages.
Office Action received from Japanese Patent Application No. 2009-51921 dated Jan. 20, 2012, 5 pages.
Notice of Allowance received for Japanese Patent Application No. 2009-051921, dated Jan. 20, 2014, 2 pages.
Office Action received for Japanese Patent Application No. 2009-051921, dated May 31, 2013, 7 pages.
Office Action received from Japanese Patent Application No. 2009-051921, dated Jun. 27, 2011, 6 pages.
Office Action received from Japanese Patent Application No. 2009-051921, dated Sep. 24, 2012, 3 pages.
Office Action received for Australian Patent Application No. 2009100760, dated Sep. 28, 2009, 2 pages.
Office Action received for Australian Patent Application No. 2009100812, dated Sep. 14, 2009, 2 pages.
Office Action received for Australian Patent Application No. 2009100813, dated Sep. 14, 2009, 2 pages.
Intention to Grant received for Chinese Patent Application No. 200910173272.0, dated Oct. 23, 2012, 1 page.
Office Action received from Chinese Patent Application No. 200910173272.0, dated Nov. 30, 2011, 8 pages.
Office Action received for Chinese Patent Application No. 200910175852.3, dated Apr. 24, 2012, 10 pages.
Office Action received for Chinese Patent Application No. 200910175852.3, dated Jun. 2, 2011, 6 pages.
Notification of Acceptance received for Australian Patent Application No. 2009204252, dated Oct. 17, 2011, 3 pages.
Office Action received for Australian Patent Application No. 2009204252, dated Nov. 28, 2013, 2 pages.
Office Action received for Australian Patent Application No. 2009204252, dated Sep. 16, 2014, 6 pages.
Office Action received for Australian Patent Application No. 2009204252, dated Apr. 20, 2010, 3 pages.
Office Action received for Australian Patent Application No. 2009204252, dated May 18, 2011, 2 pages.
Response to Notice of Opposition filed for Australian Patent Application No. 2009204252, dated Apr. 28, 2014, 4 pages.
Office Action received for Japanese Patent Application No. 2009-527541, dated May 21, 2012, 3 pages.
Office Action received for Japanese Patent Application No. 2009-527541, dated Sep. 26, 2011, 3 pages.
Office Action received for Japanese Patent Application No. 2009-527566, dated Aug. 15, 2011, 3 pages.
Office Action received for Japanese Patent Application No. 2009-527566, dated Sep. 21, 2012, 3 pages.
Notice of Allowance received for Chinese Patent Application No. 200980000229.2, dated Oct. 24, 2014, 4 pages.
Office Action received for Chinese Patent Application No. 200980000229.2, dated Jan. 6, 2014, 6 pages.
Office Action received for Chinese Patent Application No. 200980000229.2, dated Jun. 27, 2014, 7 pages.
Office Action received for Chinese Patent Application No. 200980000229.2, dated Nov. 30, 2011, 24 pages.
Office Action received for Chinese Patent Application No. 200980000229.2, dated Oct. 26, 2012, 22 pages.
Office Action received from Chinese Patent Application No. 200980000229.2, dated Jul. 2, 2013, 4 pages.
Office Action received for Chinese Patent Application No. 200980152822.9, dated Dec. 5, 2012, 10 pages.
Office Action received for Chinese Patent Application No. 200980152822.9, dated Oct. 21, 2013, 2 pages.
Notice of Acceptance received for Australian Patent Application No. 2010200763, dated Aug. 21, 2012, 1 page.
Office Action received for Australian Patent Application No. 2010200763, dated Jul. 28, 2011, 2 pages.
Decision to Grant received for Japanese Patent Application No. 2010-524102, dated May 31, 2013, 3 pages.
Office Action received for Japanese Patent Application No. 2010-524102, dated Feb. 13, 2012, 2 pages.
Office Action received for Japanese Patent Application No. 2010-524102, dated Oct. 26, 2012, 4 pages.
Certificate of Examination received for Australian Patent Application No. 2011101190, dates Nov. 23, 2011, 1 page.
Certification of Grant received for Australian Patent Application No. 2011101194, dated Mar. 2, 2012, 2 pages.
Office Action received for Australian Patent Application No. 2011101194, dated Oct. 21, 2011, 2 pages.
Notice of Allowance received for Japanese Patent Application No. 2011-537452, dated Jun. 14, 2013, 3 pages.
Office Action received for Japanese Patent Application No. 2011-537452, dated Jan. 25, 2013, 7 pages.
Office Action received for Chinese Patent Application No. 201210399033.9, dated Nov. 27, 2014, 7 pages.
Office Action received for Chinese Patent Application No. 201210399033.9, dated Oct. 8, 2015, 8 pages.

(56) References Cited

OTHER PUBLICATIONS

Notice of Acceptance received for Australian Patent Application No. 2012200475, dated Aug. 24, 2015, 2 pages.
Office Action received for Australian Patent Application No. 2012200475, dated Aug. 4, 2015, 3 pages.
Office Action received for Australian Patent Application No. 2012200475, dated Jun. 29, 2015, 3 pages.
Office Action received for Australian Patent Application No. 2012200475, dated Nov. 19, 2013, 4 pages.
Notice of Acceptance received for Australian Patent Application No. 2012202140, dated May 28, 2014, 2 pages.
Office Action received for Australian Patent Application No. 2012202140, dated Aug. 12, 2013, 2 pages.
Notice of Acceptance received for Australia Patent Application No. 2012261534, dated Jan. 6, 2015, 2 pages.
Office Action received for Australian Patent Application No. 2012261534, dated Dec. 3, 2013, 3 pages.
Office Action received for Japanese Patent Application No. 2013-011209, dated Feb. 7, 2014, 3 pages.
Office Action received for Japanese Patent Application No. 2013-011209, dated Nov. 2, 2015, 9 pages.
Office Action received for Japanese Patent Application No. 2013-011209, dated Oct. 27, 2014, 3 pages.
Notice of Allowance received for Japanese Patent Application No. 2013-127963, dated Oct. 9, 2015, 3 pages.
Office Action received for Japanese Patent Application No. 2013-127963, dated Aug. 15, 2014, 8 pages.
Office Action received for Japanese Patent Application No. 2013-127963, dated Mar. 10, 2014, 7 pages.
Office Action received for Japanese Patent Application No. 2013-252338, dated Dec. 4, 2015, 4 pages.
Office Action received for Japanese Patent Application No. 2013-252338, dated Jan. 30, 2015, , 4 pages.
Office Action received for Australian Patent Application No. 2014204422, dated Aug. 7, 2015, 3 pages.
Office Action received for Japanese Patent Application No. 2014-253365, dated Dec. 14, 2015, 6 pages.
Agarawala, et al., "Database Compendex/EI", Engineering Information, Inc., Apr. 27, 2006, 1 page.
Agarawala, et al., "Keepin' It Real: Pushing the Desktop Metaphor with Physics, Piles and the Pen", CHI 2006 Proceedings of the SIGCHI Conference on Human Factors in Computing Systems, Montreal, Québec, Canada, Apr. 22-27, 2006, pp. 1283-1292.
Agarwal, Amit, "iTunesInlineVideo", Digital Inspiration—The Tech Guide, available online at <http://labnol.blogspot.com/2006_09_17_labnol_archive.html>, 2006, 27 pages.
Ahmad, et al., "Content-Based Image Retrieval on Mobile Devices", Proceedings of SPIE-IS& T Electronic Imaging, vol. 5684, 2005, pp. 255-264.
Alam, et al., "Web Document Manipulation for Small Screen Devices: A Review", BCL Technologies Inc., Proceedings of the 2nd International Workshop on Web Document Analysis, 2003, pp. 33-36.
Alejandre, Suzanne, "Graphing Linear Equations", Available at <http://mathforum.org/alejandre/palm/times.palm.html>, retrieved on Jun. 12, 2006, 3 pages.
Andrew's Widgets, "Developing Dashboard Widgets—A Brief Introduction to Building Widgets for Apple's Dashboard Environment", Available online at <http://andrew.hedges.name/widgets/dev/>, Retrieved on Mar. 13, 2015, 6 pages.
Apparao, et al., "Level 1 Document Object Model Specification (Version 1.0)", W3C Working Draft, Available online at <http://www.w3.org/TR/WD-DOM/>, Jul. 20, 1998, 3 pages.
Apple, "Iphone User Guide", iPhone first generation, Available at: <http://pocketpccentral.net/iphone/products/1 g_iphone.htm>, Jun. 29, 2007, 124 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.

Apple Computer, Inc., "Dashboard Tutorial", Apple Computer, Inc. © 2004, 2006, Jan. 10, 2006, 24 pages.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple iPhone School, "Customize 1.19 Update for the iPhone", 4:02 minutes video, available at <http://www.youtube.com/watch?v=5ogDzOM89oc>, uploaded on Dec. 8, 2007, 2 pages.
Apple iPhone School, "SummerBoard 3.0a9 for iPhone", 4:50 minutes video, available at <http://www.youtube.com/watch?v=s_P_9mrZTKs>, uploaded on Oct. 21, 2007, 2 pages.
apple.com, "Tiger Developer Overview Series—Developing Dashboard Widgets", Available online at <http://developer.apple.com/macosx/dashboard.html>, Jun. 26, 2006, 9 pages.
Barsch, Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Baudisch, Patrick, et al., "Collapse-to-Zoom: Viewing Web Pages on Small Screen Devices by Interactively Removing Irrelevant Content", Microsoft Research Available at <http://www.patrickbaudisch.com/publications/2004-Baudisch-UIST04-CollapseToZoom.pdf>, Oct. 27, 2004, 4 pages.
Berka, "iFuntastic 3 Opens Up New iPhone Functionality", ars technica, Availale at: <http://arstechnica.com/journals/apple.ars/2007/08/30/ifuntastic-3-opens-up-new-iphone-functionality>, Aug. 30, 2007, 2 pages.
Bitstream®, "ThunderHawk Pocket PC Edition for End Users", Available at <http://www.bitstream.com/wireless/products/pocketpc/faq_using.html>, retrieved on Jun. 12, 2006, 2006, 4 pages.
Blickenstorfer, Conrad H., "NeoNode N1 Can a Unique Interface Put this Compelling Smart Phone on the Map?", available at <http://pencomputing.com/WinCE/neonode-n1-review.html>, retrieved on Sep. 1, 2014, 5 pages.
Bos, et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten, et al., "Power Browser: Efficient Web Browsing for PDAs", Proceedings of the SIGCHI conference on Human Factors in Computing Systems, 2000, 8 pages.
Office Action received for Canadian Patent Application No. 2,633,759, dated Apr. 2, 2009, 5 pages.
Office Action received for Canadian Patent Application No. 2,633,759, dated Dec. 10, 2009, 6 pages.
Cerulean Studios, "Trillian Online User Manual", available at <http://www.ceruleanstudios.com/support/manuaLphp?hchap=4&hsub=1&hsect=5>, 2006, 11 pages.
Cha, Bonnie, "HTC Touch Diamond (Sprint)", Cnet Reviews, available at <http://www.cnet.com/products/htc-touch/>, updated on Sep. 12, 2008, 8 pages.
Chang, et al., "Animation: From Cartoons to the User Interface", UIST'93 Proceedings of the 6th Annual ACM Symposium on User Interface Software and Technology, Nov. 1993, pp. 45-55.
Chartier, David, "iPhone 1.1.3 Video Brings the Proof", ars TECHNICA, Available online at <http://arstechnica.com/journals/apple.are/2007/12/30/iphone-1-1-3-video-brings-the-proof>, Dec. 30, 2007, 3 pages.
Chen, et al., "A Novel Navigation and Transmission Technique for Mobile Handheld Devices", Technical Report CSE-2003-1, Department of Computer Science, University of California at Davis, 2003, 8 pages.
Chen, et al., "Detecting Web Pages Structure for Adaptive Viewing on Small Form Factor Devices", Proceedings of the 12th international conference on World Wide Web, 2003, 9 pages.
Chen, et al., "DRESS: A Slicing Tree Based Web Representation for Various Display Sizes", Microsoft Research, Technical Report, Nov. 16, 2002, 9 pages.
Office Action received from Chinese Patent Application No. 200680053441.1, dated Mar. 30, 2010, 5 pages.
CNET, "Bounding Box", available at <http://www.cnet.com/Resources/Info/Glossary/Terms/boundingbox.html>, retrieved on Dec. 29, 2008, 1 page.
CNET, "Fujitsu LifeBook B6110D", Reviews, Nov. 24, 2005, 2 pages.

(56) References Cited

OTHER PUBLICATIONS

CNET, "Video: Create Custom Widgets with Web Clip", CNET News, Available at <http://news.cnet.com/1606-2-6103525.html>, Aug. 8, 2006, 3 pages.
Cooper, Alan, "The Inmates Are Running the Asylum", Sams Publishing, Mar. 23, 1999, pp. 138-147.
Dearman, et al., "Rendezvousing with Location-Aware Devices: Enhancing Social Coordination", Interacting with Computers, vol. 17, Issue 5, available at <http://www.dgp.toronto.edu/~dearman/publications/dearman_IWC05.pdf>, Sep. 2005, pp. 542-566.
Delltech, "Working with Graphics", Windows XP: The Complete Reference, Chapter 18, Apr. 5, 2005, 4 pages.
Dodge, et al., "Microsoft Office Excel 2003 Office Manual", Microsoft Press, vol. 1, Unable to Locate English Translation, Jul. 12, 2004, 5 pages.
Domshlak, et al., "Preference-Based Configuration of Web Page Content", Proceedings of the 17th Int'l Joint Conf. on Artificial Intelligence (IJCAI), Seattle, WA, Aug. 4-10, 2001, pp. 1451-1456.
Edwards, "iPhone 1.1.3 Firmware Feature Gallery", Gear Live, Available at: <http://www.gearlive.com/news/article/q407-iphone-113-firmware-feature-gallery/>, Dec. 28, 2007, 7 pages.
Elo, "Touchscreen User Manual, Elo Projected Capacitance Driver Software Version 1.00 (Serial)", Elo TouchSystems, Inc., Dec. 30, 2005, 37 pages.
ExpansysTV, "HTC Touch Dual Demonstration by eXpansys", 5:26 minutes video, available at <http://www.youtube.com/watch?v=Tupk8MYLhMk>, uploaded on Oct. 1, 2007, 2 pages.
Eyemodule Springboard Compatible, "Turn Your Handspring™ Visor™ Handheld into a Digital Camera", User's Manual, 2000, 9 pages.
Fadhley, Mohd Nazley., "LauncherX", Online Available at <http://www.palmx.org/mambo/index2.php?option=com_content&task=view&id=65&1temid>, Nov. 21, 2002, 3 pages.
Farber, Dan, "Jobs: Today Apple is Going to Reinvent the Phone", ZDNet, available at <http://www.zdnet.com/blog/btl/jobs-today-apple-is-going-to-reinvent-the-phone/4249>, Jan. 9, 2007, 3 pages.
Fingerworks Forums, "Is the Multitouch Lemur?", Available at <http://64233.167.104/search?q=cache:sjVdtyFBvRMJ:forums.finger>, retrieved on Nov. 16, 2005, Dec. 24, 2004, 2 pages.
Fingerworks, Inc., "Installation and Operation Guide for the TouchStream and TouchStream LP", available at <http://www.fingerworks.com>, 2002, pp. 1-25.
Fingerworks, Inc., "Quick Reference Guide for iGesture Products", available at <http://www.fingerworks.com>, 1999-2002, 2 pages.
Fingerworks, Inc., "Quick Reference Guide for TouchStream ST/LP", available at <http://www.fingerworks.com>, 2001-2003, 4 pages.
Fingerworks, Inc., "TouchStream LP Silver", available at <http://www.fingerworks.com>, Apr. 27, 2005, 18 pages.
Fondantfancies, "Dash Clipping: Don't Wait for Mac OS X 10.5 Leopard", fondantfancies.com, Available online at <http://www.fondantfancies.com/blog/3001239/>, retrieved on Sep. 3, 2009, 9 pages.
Forsberg, et al., "Aperture Based Selection for Immersive Virtual Environments", Proceedings of the ACM Symposium on User Interface Software and Technology, 1996, 2 pages.
Foxit, "Foxit Reader v. 1.3 Feature Description", available at <http://www.foxitsoftware.com/pdf/reader 2/verhistory.htm>, 2008, 4 pages.
Gears, Leigh, "Orange SPV C600 Review", Available at <http://www.coolsmartphone.com/article569.html>, retrieved on Apr. 14, 2006, 57 pages.
Getgreg, "Jeff Han's Multiple Touch Point Display, the Stuff Dreams are Made of", Available at <http://www.theyshoulddothat.com/2006/08/jeff_hanns_multiple_touch_poin.html>, retrieved on Dec. 17, 2007, Aug. 16, 2006, 2 pages.
GSM, Arena, "Neonode N2 User Interface", 3:06 minutes video, available at <https://www.youtube.com/watch?v=MfDMHmIZRLc>, uploaded on Feb. 13, 2007, 2 pages.
GSMArena, Team, "HTC Touch Review: Smart to Touch the Spot", available at <http://www.gsmarena.com/htc_touch-review-189.php>, Nov. 28, 2007, 18 pages.
Guan, et al., "Zoom Selector: A Pen-based Interaction Technique for Small Target Selection", Transactions of the Information Processing Society of Japan, vol. 45, No. 8, Aug. 2004, pp. 2087-2097.
Han, Jeff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Hart, Kim, "Rewriting the Web for Mobile Phones", washingtonpost.com, available at: <http://www.washingtonpost.com/wp-dyn/content/article/2006/07/25/AR2006072501517_pf.html>, Jul. 26, 2006, 2 pages.
Hesseldahl, Arik, "An App the Mac can Brag About", Forbes.com, Available at <http://www.forbes.com/2003/12/15/cx_ah_1215tentech_print.html>, Dec. 15, 2003, 4 pages.
Hinckley, et al., "Input/Output Devices and Interaction Techniques", CRC Press, Nov. 2004, pp. 1-79.
Holmquist, Lars Erik, "The Zoom Browser Showing Simultaneous Detail and Overview in Large Documents", Available at<http://www.hb.se/bhs/ith/3-98/leh.htm> retrieved Dec. 17, 2007, Human IT, 1998, 12 pages.
Huang, et al., "Effects of Visual Vibratory Perception by Cross-Modali Matching with Tactile Sensation", Online Available at: <http://media.nuas.ac.jp/~robin/Research/ADC99.html>, 1999, pp. 1-7.
Infoworld Video, "Two Geeks and an iPhone: Part 3", available at <http://web.archive.org/web/20080124065641/http:/www.infoworld.com/video/interviews/Mobile-Tech-Apple-iPhone/Two-Geeks-and-an-iPhone-Part-3/video_1966.html>, Dec. 18, 2007, 2 pages.
IPhone Dev Wiki, "IPhone Customization", Available at: <http://iphone.fivefony.net/wiki/index.php/Iphone_Customization>, Dec. 13, 2007, 7 pages.
IPhone Hacks, "iPhone Firmware 1.1.1: Multi-Page SpringBoard Hack", Available at: <http://www.iphonehacks.com/2007/10/springboardhack.html>, Oct. 9, 2007, 4 pages.
IPhone Hacks, "SummerBoard for iPhone OS v1.1.1: iPhone Hack Enables Scrolling of iPhone's Home Screen", Available at: <http://www.iphonehacks.com/2007/10/summerboard-v3.html>, Dec. 2007, 3 pages.
IPhone Info, "Modifying the iPhone SpringBoard", Available at: <http://iphoneinfo.ca/modifying-the-iphone-springboard>, Dec. 2007, 6 pages.
Jazzmutant, "Jazzmutant Lemur", Available at <http://64.233.167.104/search?a=cache:3g4wFSaZiXIJ:www.nuloop.c>, Nov. 16, 2005, 3 pages.
Jazzmutant, "The Lemur: Multitouch Control Surface", Available at <http://64233.167.104/search?q=cache:j0_nFbNVzOcJ:www.cycling7>, retrieved on Nov. 16, 2005, 3 Pages.
Joire, Myriam, "Neonode N1m Review", available at <http://www.youtube.com/watch?v=Tj-KS2kflr0>, Jun. 29, 2007, 3 pages.
Karlson, et al., "AppLens and LaunchTile: Two Designs for One-Handed Thumb Use on Small Devices", CHI 2005, Papers: Small Devices 1, Apr. 2-7, 2005, pp. 201-210.
Karlson, et al., "AppLens and LaunchTile: Two Designs for One-Handed Thumb Use on Small Devices", Powerpoint Presentation, CHI 2005, pp. 1-17.
Khella, Amir, et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, 2 pages.
Kinoma, "Kinoma Player 4 EX Documentation", Available at <http://replay.waybackmachine.org/20061101175306/http://www.kinoma.com/index/pd-player-4>, Nov. 1, 2006, 28 pages.
Kondo, Daisuke, "Windows XP Tablet PC Edition Quick Review Challenging by Microsoft", PCfan No. 9, No. 28, Japan, Mainichi Communication., Oct. 15, 2002, pp. 12-17.
Laakko, et al., "Adapting Web Content to Mobile User Agents", IEEE Internet Computing, vol. 9, No. 2, Mar./Apr. 2005, pp. 46-53.

(56) References Cited

OTHER PUBLICATIONS

Landragin, Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie, Hakon Wium., "Cascading Style Sheets (Chpt 8 CSS for small screens)", Online Available at <http://people.opera.com/howcome/2006/phd/css.pdf> University of Osloensis, MDCCCXI, 2005, pp. 243-247.
Macworld, "First Look: Leopard first looks: Dashboard", Available at: <http://www.macworld.com/article/52297/2005/08/leodash.html>, Aug. 9, 2006, 3 pages.
Macworld, "Whip up a widget", Available at: <http://www.macworld.com/article/46622/2005/09/octgeekfactor.html>, Sep. 23, 2005, 6 pages.
Mello, Jr, J., "Tiger's Dashboard Brings Widgets to New Dimension", MacNewsWorld, Available at: <http://www.macnewsworld.com/story/42630.html>, Retrieved on Jun. 23, 2006, 3 pages.
Microsoft, "Working screenshot of Microsoft Office 2003", Aug 19, 2003, 14 Pages.
Microsoft Word, "Example of Scrolling Page in Word 2003", 2003, 3 pages.
microsoft.com, "Right-Clicking with a Pen", Microsoft, Available at: http://www.microsoft.com/windowsxp/using/tabletpc/learnmore/rightclick.mspx, Nov. 7, 2002, 3 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Retrieved on Dec. 17, 2007, Nov. 15, 2002, 10 pages.
Milic-Frayling, Natasa, et al., "SmartView: Flexible Viewing of Web Page Contents", Proceedings of the Eleventh International World Wide Web Conference, available at <http://www2002.org/CDROM/poster/172/> Retrieved on May 5, 2008, May 11, 2002, 4 pages.
Miller, Matthew, "HTC Touch and TouchFLO Interface", 7:53 minutes video, available at <http://www.youtube.com/watch?v=6oUp4wOcUc4>, uploaded on Jun. 6, 2007, 2 pages.
Mountfocus Information Systems, "An Onscreen Virtual Keyboard: touchscreen, kiosk and Windows compatible", Available at: http://www.virtual-kevboard.com, Dec. 19, 2007, 3 pages.
Nakata, Atsushi, "Tablet PC Aiming at Spread Pen Input by Changing Target User", Nikkei Windows for IT Professionals, Nikkei Business Publications, Inc. No. 69, Dec. 1, 2002, pp. 14-16.
Neonode Inc., "Welcome to the N1 Guide", available at <http://www.ebookspdf.com/gadget/2818/neonode-n1m-manual/>, Jul. 2004, pp. 1-42.
NTT DOCOMO, "i-mode Compatible Pictograms", available at <http://www.nttdocomo.co.jp/english/service/imode/make/content/pictograph/index.html>, 2008, 2 pages.
O'Hara, "Absolute Beginner's Guide to Microsoft Window XP", Que Publishing, 2003, 1 page.
Oliver, Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.
Opera Software, "Download the Opera Mobile™ Browser", Available at <http://www.opera.com/products/mobile/products/>, retrieved on Oct. 19, 2006, 5 pages.
Opera Software, "Opera 7.60 for Series 60 Mobile", Available at <http://jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones-Get the Full Internet Experience on Your Mobile Phone", Available at <http://www.symbian-freak.com/news/1105/opera.htm>,, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
Opera Software, "Welcome to Widgetize", Copyright © 2006 Opera Software ASA, Available at: <http://widgets.opera.com/widgetize>, 2006, 1 page.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
Park, Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
Park, Will, "Neonode N2 Unboxing Pics!", available at <http://www.intomobile.com/2007/07/18/neonode-n2-unboxing-pics/>, Jul. 18, 2007, 7 pages.
PCFAN, "Boot Camp Introduction/Data Transition/Operability/Ability Truth Derived from Gap Mac& Win Dual Boot Hard Verification", Daily Communications, vol. 13, No. 14, Jun. 15, 2006, p. 57.
International Preliminary Report on Patentability received for PCT Patent Application No. PCT/US2006/062685, dated Jul. 1, 2008, 6 pages.
International Search Report and Written Opinion received for PCT Patent Application No. PCT/US2007/077638, dated Feb. 19, 2008, 9 pages.
International Preliminary Report on Patentability received for PCT Patent Application No. PCT/US2007/077639, dated Mar. 10, 2009, 6 pages.
International Search Report and Written Opinion received for PCT Patent Application No. PCT/US2007/077639, dated Jul. 8, 2008, 7 pages.
International Preliminary Report on Patentability received for PCT Patent Application No. PCT/US2007/077643, dated Mar. 10, 2009, 7 pages.
International Search Report and Written Opinion received for PCT Patent Application No. PCT/US2007/077643, dated May 8, 2008, 9 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, dated Jan. 23, 2008, 10 pages.
International Search Report and Written Opinion received for PCT Patent Application No. PCT/US2007/077773, dated Jan. 15, 2008, 8 pages.
International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Preliminary Report on Patentability received for PCT Patent Application No. PCT/US2008/050430, dated Jul. 7, 2009, 10 pages.
International Search Report and Written Opinion received for PCT Patent Application No. PCT/US2008/050430, dated Sep. 1, 2008, 13 pages.
Invitation to Pay Additional Fees Received for PCT Patent Application No. PCT/US2008/050430, dated Jun. 27, 2008, 7 pages.
International Preliminary Report on Patentability received for PCT Patent Application No. PCT/US2008/050431, dated Jul. 7, 2009, 8 pages.

(56) References Cited

OTHER PUBLICATIONS

International Search Report and Written Opinion received for PCT Patent Application No. PCT/US2008/050431, dated Jun. 17, 2008, 10 pages.
International Preliminary Report on Patentability received for PCT Patent Application No. PCT/US2008/074341, dated Mar. 9, 2010, 8 pages.
International Search Report and Written Opinion received for PCT Patent Application No. PCT/US2008/074341, dated Nov. 27, 2009, 12 pages.
International Preliminary Report on Patentability received for PCT Patent Application No. PCT/US2008/074625, dated Mar. 9, 2010, 6 pages.
International Search Report and Written Opinion received for PCT Patent Application No. PCT/US2008/074625, dated Jan. 8, 2009, 8 pages.
International Preliminary Report on Patentability received for PCT Patent Application No. PCT/US2009/030225, dated Jul. 6, 2010, 10 pages.
International Search Report and Written Opinion received for PCT Patent Application No. PCT/US2009/030225, dated Feb. 25, 2010, 15 pages.
Invitation to Pay Additional Fees Received for PCT Patent Application No. PCT/US2009/030225, dated Nov. 16, 2009, 4 pages.
pocketgear.com, "Software Keyboards: Efzy-Japanese (Eng/Jp) 4.0", TimeSpacesystem Co. Ltd, available at <http://classic.pocketgear.com/softwaredetail.asp?id=9115>, updated on Sep. 23, 2008.
Potter, "Graffiti Smilies", PalmInfocenter Forums, available at <http://www.palminfocentercom/forum/viewtopic.php?t=11307>, Feb. 9, 2003, 5 pages.
Raman, et al., "Application-Specific Workload Shaping in Multimedia-Enabled Personal Mobile Devices", CODES+ISSS, Oct. 22-25, 2006, pp. 4-9.
RealNetworks, "Transition Effects", RealNetworks Production Guide, Available at: <http://service.real.com/help/library/guides/productionguidepreview/HTML/htmflles/transit.htm>, 2001, 21 pages.
Robie, Jonathan, "What is the Document Object Model?", Texcel Research, available at <http://www.w3.org/TR-DOM/introduction.html>, 2006, 5 pages.
Rohrer, Tim, "Metaphors We Compute by: Bringing Magic into Interface Design", Available online at <http://www.uoregon.edu/-uophil/metaphor/gui4web.htm>, retrieved on Jun. 13, 2006, 7 pages.
Roto, et al., "Minimap—A Web Page Visualization Method for Mobile Phones", Proceedings of the SIGCHI Conference on Human Factors in Computing Systems, Apr. 22-27, 2006, pp. 35-44.
Sadun, Erica, "1.1.1 iPhone Multipage Springboard Hack", Available at: <http://www.tuaw.com/2007/10/09/1-1-1-iphone-multipage-springboard-hack/>, on Oct. 9, 2007, Oct. 9, 2007, 3 pages.
Sadun, "Erica's Documentation: Applications and Utilities for the iPhone and iPod Touch", Copyright 2007, Available at: <http://ericasadun.com/ftp/Deprecated/Documentation/Manual-0.04.pdf>, 2007, 22 pages.
Sadun, Erica, "Found Footage: Scrolling iPhone Dock Smashes Through 16-icon Home Screen Limit", The Unofficial Apple Weblog, available at <http://www.tuaw.com/2007/08/30/found-footage-scrolling-iphone-dock-smashes-through-16-icon-hom/>, Aug. 30, 2007, 3 pages.
Salmre, I., "Characteristics of Mobile Applications", Chapter 2, Salmre_02.fm, Dec. 20, 2004, pp. 19-36.
Schreiner, Tony, "High DPI in IE: Tip & Mystery Solved", Tony Schreiner's Blog, available at <http://blogs.msdn.com/tonyschr/archive/2004/05/05/126305.aspx>, May 2004, 2 pages.
SharewareConnection, "Handy Animated Emoticons", available at <http://www.sharewareconnection.com/handy-animated-emoticons.htm>, Jul. 2007, 3 pages.
Shima, Korekazu, et al., "Android Application-Development", From basics of development to mashup/hardware interaction, a road to "takumi" of Android application-development, Section I, difference from prior platforms, things which can be done with Android, Mar. 18, 2009, pp. 58-65.
Shiota, Shinji, "Special Developer's Story", DOS / V magazine, vol. 13, No. 10., Jun. 1, 2004, pp. 156-161.
snapfiles.com, "Dexpot", Snapfiles, Oct. 10, 2007, 3 pages.
Stampfli, Tracy, "Exploring Full-Screen Mode in Flash Player 9", Available online at <http://www.adobe.com/devnet/flashplayer/articles/full_screen_mode.html>, Nov. 14, 2006, 2 pages.
Stanek, et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Surfin'Safari, "XUL", Available online at <http://weblogs.mozillazine.org/hyatt.archives/2003_10.html>, Oct. 2003, 7 pages.
Takahashi, Masaaki, "Inside Macintosh, Mystery of File V, Mystery of Drag & Drop", NikkeiMAC, Nikkei Business Publications Inc., vol. 17, Aug. 15, 1994, pp. 212-217.
Thomas, et al., "Applying Cartoon Animation Techniques to Graphical User Interfaces", ACM Transactions on Computer-Human Interaction, vol. 8, No. 3, Sep. 2001, pp. 198-222.
Tidwell, Jenifer, "Animated Transition", Designing Interfaces, Patterns for effective Interaction Design, First Edition, Nov. 2005, 4 pages.
Tidwell, Jenifer, "Designing Interfaces, Animated Transition", Archieved by Internet Wayback Machine, Available at <https://web.archive.org/web/20060205040223/http://designinginterfaces.com:80/Animated_ Transition>, Retrieved on Mar. 20, 2018, 2005, 2 pages.
TooEasyToForget, "iPhone—Demo of SummerBoard Its Features", 5:05 minutes video, available at <http://www.youtube.com/watch?v=CJOb3ftQLac>, uploaded on Sep. 24, 2007, 2 pages.
tuaw.com, "1.1.1 iPhone Multi page Springboard Hack", Available at <http://www.tuaw.com/2007I10/09/I-1-I-iohone-multioaoe-sorinQ"board-hack/>, Oct. 9, 2007, 5 pages.
tuaw.com, "Springboard Scrolling", new page dot feature, Available at: <http://www.tuaw.com/gallerv/soringboard-scrolling/431347/>, Oct. 9, 2007, 3 pages.
tuaw.com, "Springboard Scrolling", mid-scroll, Available at: <http://www.tuaw.com/photos/springboard-scrolling/431348/>, Oct. 9, 2007, 3 pages.
tuaw.com, "Springboard Scrolling", mostly unpopulated page, Available at: <http://www.tuaw.com/photos/springboard-scrolling/431349/>, Oct. 9, 2007, 3 pages.
tuaw.com, "Tuaw Hack: Mess with Your iPhone Settings", Available at: <http://www/tuaw.com/tag/SpringBoard/, Dec. 18, 2007, 1 page.
Vrba, J., "iPhone Customizations and Applications", Ezine Articles, Availabe at: <http://ezinearticles.com/?iPhone-Customizations-and-Applications&id=815807opt=print>, Nov. 2007, 2 pages.
w3schools.com, "Playing Videos on the Web", Available online at <http://www.w3schools.com/media/media_browservideos.asp?out=print>, 2006, 3 pages.
w3schools.com, "Multimedia Video Formats", Available online at <http://www.w3sschools.com/media/media_videoformats.asp?output=print>, 2006, 2 pages.
w3schools.com, "Playing QuickTime Movies", Available online at <http://www.3schools.com/media/media_guicktime.asp?output=print>, 2006, 2 pages.
Warabino, et al., "Video Transcoding Proxy for 3Gwireless Mobile Internet Access", IEEE Communications Magazine, vol. 38, No. 10, Oct. 2000, pp. 66-71.
Wave Technologies, International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http:/lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Widgipedia, "I Need a Blog and a Forum Please?", available at: <http://www.widgipedia.com/widgets/details/adni18/hyalo-weather_27.html>, retrieved on Oct. 19, 2006, 2 pages.

(56) References Cited

OTHER PUBLICATIONS

Wikipedia, "Comparison of Layout Engines", The free encyclopedia, available at <http://en.wikipedia.org/wiki/Comparison_of_layout_engines>, 2006, 3 pages.
Wikipedia, "History of YouTube", The Free Encyclopedia, available at <http://en.wikipedia.org/wiki/History_of_YouTube>, retrieved on Mar. 15, 2011, 4 pages.
Wikipedia, "KDE", The free encyclopedia, available at <http://en.wikipedia.org/wiki/KDE>, 2006, 9 pages.
Wikipedia, "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Wildarya, "iDesksoft Desktop Icon Toy v2.9", Available at: <http://www.dl4all.com/2007/10/16/idesksoft_desktoo_icon_toy_v2.9.html>, Oct. 16, 2007, 4 pages.
Williams, Martyn, "LG's Cell Phone Can Pause Live TV ", PC World, Oct. 11, 2005, 2 pages.
Wobbrock, et al., "WebThumb: Interaction Techniques for Small-Screen Browsers", UIST'02, Paris France, Oct. 27-30, 2002, pp. 205-208.
Wright, Ben, "Palm OS PDA Application Mini-Reviews", Online Available at <http://library.indstate.edu/newsletter/feb04/palmmini.htm>, Feb. 3, 2015, 11 pages.
Xiao, et al., "Slicing*-Tree Based Web Page Transformation for Small Displays", International Conference on Information and Knowledge Management, Oct. 31-Nov. 5, 2005, 2 pages.
Xie, et al., "Efficient Browsing of Web Search Results on Mobile Devices Based on Block Importance Model", Microsoft Research Asia, 2005, 10 pages.
Yin, et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
Youtube, "Broadcast Yourself", Available at <http://www.youtube.com>, Nov. 1, 2005, 2 pages.
Youtube, "Broadcasting Ourselves", The Official Youtube blog Available at <http://youtube-global.blogspot.in/2005_11_01_archive.html>, Nov. 15, 2005, 5 pages.
Zhang, et al., "An Ergonomics Study of Menu-Operation on Mobile Phone Interface", In Proceedings of the workshop on Intelligent Information Technology Application., 2007, pp. 247-251.
Zytronic, "Touchscreen User Manual Zytronic X-Y Controller (Serial and USB)", XP007916436, Nov. 17, 2006, pp. 1-51.
Extended European Search Report received for European Patent Application No. 17813879.8, dated Jan. 8, 2020, 8 pages.
Extended European Search Report received for European Patent Application No. 19176224.4, dated Dec. 13, 2019, 7 pages.
Office Action received for Australian Patent Application No. 2019200692, dated Dec. 24, 2019, 2 pages.
Office Action received for European Patent Application No. 08829660.3, dated Jan. 3, 2020, 6 pages.
Advisory Action Received for U.S. Appl. No. 12/689,834, dated Aug. 19, 2015, 3 Pages.
Advisory Action received for U.S. Appl. No. 12/888,362, dated May 7, 2013, 3 pages.
Advisory Action received for U.S. Appl. No. 14/261,112, dated Nov. 30, 2017, 3 pages.
Advisory Action received for U.S. Appl. No. 11/960,669, dated Nov. 3, 2011, 3 pages.
Corrected Notice of Allowance received for U.S. Appl. No. 12/689,834, dated Feb. 8, 2018, 4 pages.
Corrected Notice of Allowance received for U.S. Appl. No. 12/689,834, dated May 17, 2018, 2 pages.
Corrected Notice of Allowance received for U.S. Appl. No. 12/888,362, dated Jun. 6, 2018, 3 pages.
Corrected Notice of Allowance received for U.S. Appl. No. 12/888,362, dated Apr. 25, 2018, 3 pages.
Decision to Grant received for European Patent Application No. 10762813.3, dated May 11, 2018, 3 pages.
Decision to Grant received for European Patent Application No. 12194312.0, dated Feb. 1, 2018, 2 pages.
Decision to Refuse received for European Patent Application No. 09170697.8, dated Jul. 10, 2018, 31 pages.
Examiner's Answer to Appeal Brief received for U.S. Appl. No. 14/142,648, dated Apr. 10, 2018, 15 pages.
Examiner's Pre-review report received for Japanese Patent Application No. 2014-253365, dated Dec. 12 , 2017, 7 pages (3 pages of English Translation and 4 pages of Official Copy).
Extended European Search Report received for European Patent Application No. 17198398.4, dated Feb. 8, 2018, 8 pages.
Extended European Search Report received for European Patent Application No. 17210062.0, dated Feb. 20, 2018, 12 pages.
Final Office Action received for U.S. Appl. No. 11/960,669, dated Aug. 18, 2011, 13 pages.
Final Office Action received for U.S. Appl. No. 11/620,686, dated Aug. 3, 2009, 11 pages.
Final Office Action received for U.S. Appl. No. 11/620,686, dated Jul. 12, 2010, 10 pages.
Final Office Action received for U.S. Appl. No. 11/850,010, dated Aug. 14, 2018, 21 pages.
Final Office Action received for U.S. Appl. No. 11/850,010, dated May 11, 2018, 24 pages.
Final Office Action received for U.S. Appl. No. 12/689,834, dated Mar. 26, 2015, 30 pages.
Final Office Action received for U.S. Appl. No. 12/689,834, dated May 4, 2017, 41 pages.
Final Office Action received for U.S. Appl. No. 12/689,834, dated Oct. 15, 2012, 22 pages.
Final Office Action received for U.S. Appl. No. 14/142,648, dated Dec. 7, 2016, 12 pages.
Final Office Action received for U.S. Appl. No. 14/261,112, dated Nov. 7, 2018, 34 pages.
Intention to Grant received for European Patent Application No. 10762813.3, dated Dec. 18, 2017, 11 pages.
Intention to Grant received for European Patent Application No. 17198398.4, dated Jan. 28, 2019, 8 pages.
International Preliminary Report on Patentability for PCT Patent Application No. PCT/US2008/050047, dated Sep. 15, 2009, 11 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/035331, dated Dec. 20, 2018, 13 pages.
International Preliminary Report on Patentability received for PCT Patent Application No. PCT/US2017/037057, dated Dec. 27, 2018, 24 pages.
International Search Report and Written Opinion received for PCT Patent Application No. PCT/US2008/050047, dated Sep. 3, 2009, 15 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2017/037057, dated Aug. 29, 2017, 26 pages.
Invitation to Pay Additional Fee received for PCT Patent Application No. PCT/US2017/035331, dated Aug. 7, 2017, 4 Pages.
Minutes of Meeting received for European Patent Application No. 09170697.8, dated Jul. 10, 2018, 6 pages.
Non-Final Office Action received for U.S. Appl. No. 12/689,834, dated Aug. 26, 2016, 26 pages.
Non-Final Office Action received for U.S. Appl. No. 12/689,834, dated May 24, 2012, 21 pages.
Non-Final Office Action received for U.S. Appl. No. 15/033,551, dated May 24, 2018, 26 pages.

(56) References Cited

OTHER PUBLICATIONS

Non-Final Office Action received for U.S. Appl. No. 11/960,669, dated Mar. 17, 2011, 23 pages.
Non-Final Office Action received for U.S. Appl. No. 11/620,686, dated Dec. 22, 2009, 10 pages.
Non-Final Office Action received for U.S. Appl. No. 11/620,686, dated Dec. 31, 2008, 17 pages.
Non-Final Office Action received for U.S. Appl. No. 12/689,834, dated Jun. 10, 2014, 25 pages.
Non-Final Office Action received for U.S. Appl. No. 14/261,112, dated Apr. 5, 2018, 40 pages.
Non-Final Office Action received for U.S. Appl. No. 15/153,617, dated Apr. 2, 2018, 12 pages.
Non-Final Office Action received for U.S. Appl. No. 15/411,110, dated Dec. 13, 2018, 23 pages.
Non-Final Office Action received for U.S. Appl. No. 15/418,537, dated Dec. 13, 2018, 53 pages.
Non-Final Office Action received for U.S. Appl. No. 15/426,836, dated Oct. 18, 2018, 40 pages.
Notice of Acceptance received for Australian Patent Application No. 2013404001, dated Nov. 21, 2017, 3 pages.
Notice of Acceptance received for Australian Patent Application No. 2014274556, dated Jul. 27, 2016, 2 Pages.
Notice of Acceptance received for Australian Patent Application No. 2016203168, dated Feb. 14, 2018, 3 pages.
Notice of Acceptance received for Australian Patent Application No. 2016203309, dated Feb. 14, 2018, 3 pages.
Notice of Acceptance received for Australian Patent Application No. 2016213886, dated Feb. 9, 2018, 3 pages.
Notice of Acceptance received for Australian Patent Application No. 2017201768, dated Nov. 21, 2018, 3 pages.
Notice of Acceptance received for Australian Patent Application No. 2017276153, dated Feb. 19, 2018, 4 pages.
Notice of Acceptance received for Australian Patent Application No. 2017276153, dated Jan. 17, 2018, 3 pages.
Notice of Allowance received for Chinese Patent Application No. 201310724733.5, dated Dec. 27, 2018, 2 pages (1 page of English translation and 1 page of Official Copy).
Notice of Allowance received for Chinese Patent Application No. 201410250648.4, dated Aug. 20, 2018, 2 pages (1 page of English Translation and 1 page of Official Copy).
Notice of Allowance received for Chinese Patent Application No. 201410250688.9, dated May 21, 2018, 3 pages (1 page of English Translation and 2 pages of Official Copy).
Notice of Allowance received for Chinese Patent Application No. 201410251370.2, dated Jul. 31, 2018, 2 pages (1 page of English Translation and 1 page of Official Copy).
Notice of Allowance received for Chinese Patent Application No. 201410251400.X, dated Aug. 20, 2018, 3 pages (1 page of English Translation and 2 pages of Official Copy).
Notice of Allowance received for Japanese Patent Application No. 2014-139095, dated Apr. 1, 2016, 3 pages (Official Copy only). {See Communication under 37 CFR § 1.98(a) (3)}.
Notice of Allowance received for Japanese Patent Application No. 2014-253365, dated Nov. 26, 2018, 3 pages (1 page of English Translation and 2 pages of Official Copy).
Notice of Allowance received for Japanese Patent Application No. 2015-532193, dated Jan. 23, 2017, 3 pages (Official Copy Only). {See Communication under 37 CFR § 1.98(a) (3)}.
Notice of Allowance received for Japanese Patent Application No. 2016-091460, dated Oct. 9, 2018, 3 pages (1 page of English Translation and 2 pages of Official Copy).
Notice of Allowance received for Japanese Patent Application No. 2016-092789, dated Feb. 3, 2017, 3 pages. (Official Copy Only) {See Communication under 37 CFR § 1.98(a) (3)}.
Notice of Allowance received for Japanese Patent Application No. 2016-527367, dated Jul. 30, 2018, 4 pages (1 page of English Translation and 3 pages of Official Copy).
Notice of Allowance received for Japanese Patent Application No. 2017-042050, dated Apr. 24, 2017, 3 pages. (Official Copy Only) {See Communication under 37 CFR § 1.98(a) (3)}.
Notice of Allowance received for Japanese Patent Application No. 2017-102031, dated Jun. 23, 2017, 3 pages (Official Copy Only). {See Communication under 37 CFR § 1.98(a) (3)}.
Notice of Allowance Received for Korean Patent Application No. 10-2014-7036624, dated Sep. 26, 2016, 3 pages (1 page of English Translation and 2 pages of Official Copy).
Notice of Allowance received for Korean Patent Application No. 10-2016-7014051, dated Nov. 27, 2018, 4 pages (1 page of English Translation and 3 pages of Official Copy).
Notice of Allowance received for U.S. Appl. No. 12/689,834, dated Jan. 17, 2018, 9 pages.
Notice of Allowance received for U.S. Appl. No. 12/888,362, dated Apr. 11, 2018, 7 pages.
Notice of Allowance received for U.S. Appl. No. 15/033,551, dated Nov. 14, 2018, 10 pages.
Notice of Allowance received for U.S. Appl. No. 15/056,913, dated May 24, 2017, 19 pages.
Notice of Allowance received for U.S. Appl. No. 15/153,617, dated Nov. 23, 2018, 10 pages.
Notice of Allowance received for U.S. Appl. No. 11/850,010, dated Feb. 6, 2019, 25 pages.
Office Action received for Danish Patent Application No. PA201670595, dated Nov. 25, 2016, 9 pages.
Office Action received for European Patent Application No. 13795330.3, dated Oct. 9, 2017, 8 pages.
Office Action Received for Australian Patent Application No. 2013404001, dated Aug. 3, 2017, 5 pages.
Office Action Received for Australian Patent Application No. 2013404001, dated Nov. 26, 2016, 3 pages.
Office Action received for Australian Patent Application No. 2014274537, dated Jul. 25, 2016, 3 pages.
Office Action received for Australian Patent Application No. 2015215876, dated Jul. 26, 2017, 6 pages.
Office Action received for Australian Patent Application No. 2016203168, dated Feb. 8, 2017, 2 pages.
Office Action received for Australian Patent Application No. 2016203309, dated Feb. 8, 2017, 11 pages.
Office Action received for Australian Patent Application No. 2017201768, dated Feb. 28, 2018, 4 pages.
Office Action received for Australian Patent Application No. 2017202587, dated Jul. 4, 2018, 4 pages.
Office Action received for Australian Patent Application No. 2018200272, dated Jan. 17, 2019, 2 pages.
Office Action received for Canadian Patent Application No. 2,983,178, dated Aug. 16, 2018, 5 pages.
Office Action received for Chinese Patent Application No. 201310724733.5, dated Apr. 9, 2018, 11 pages (2 pages of English Translation and 9 pages of Official copy).
Office Action received for Chinese Patent Application No. 201310724733.5, dated Aug. 15, 2018, 2 pages (1 page of English Translation and 1 page of Official copy).
Office Action received for Chinese Patent Application No. 201310724733.5, dated Aug. 28, 2018, 6 pages (3 pages of English Translation and 3 pages of Official copy).
Office Action received for Chinese Patent Application No. 201310724733.5, dated Oct. 30, 2017, 14 pages (3 pages of English Translation and 11 pages of Official Copy).
Office Action received for Chinese Patent Application No. 201380080659.6, dated Apr. 4, 2018, 15 pages (5 pages of English Translation and 10 pages of Official Copy).
Office Action received for Chinese Patent Application No. 201380080659.6, dated Oct. 26, 2018, 11 pages (3 pages of English Translation and 8 pages of Official Copy).
Office action received for Chinese Patent Application No. 201410250648.4, dated Feb. 14, 2018, 6 pages (3 pages of English Translation and 3 pages of Official Copy).
Office Action received for Chinese Patent Application No. 201410250688.9, dated Nov. 16, 2017, 6 pages (3 pages of English Translation and 3 pages of Official Copy).

(56) References Cited

OTHER PUBLICATIONS

Office Action received for Chinese Patent Application No. 201410251370.2, dated Feb. 11, 2018, 14 pages (5 pages of English Translation and 9 pages of Official Copy).
Office Action received for Chinese Patent Application No. 201410251400.X, dated Feb. 8, 2018, 6 pages (3 pages of English Translation and 3 pages of Official Copy).
Office Action received for Chinese Patent Application No. 201480001676.0, dated Mar. 20, 2018, 12 pages (3 pages of English Translation and 9 pages of Official Copy).
Office Action received for Chinese Patent Application No. 201480001676.0, dated May 12, 2017, 15 pages (5 pages of English Translation and 10 pages of Official Copy).
Office Action received for Chinese Patent Application No. 201480001676.0, dated Nov. 27, 2018, 8 pages (1 page of English Translation and 7 pages of Official Copy).
Office Action received for Danish Patent Application No. PA201670595, dated Aug. 23, 2018, 5 pages.
Office Action received for Danish Patent Application No. PA201670595, dated May 31, 2017, 3 Pages.
Office Action received for Danish Patent Application No. PA201670595, dated Nov. 30, 2017, 4 pages.
Office Action received for European Patent Application No. 08829660.3, dated Jan. 11, 2019, 7 pages.
Office Action Received for European Patent Application No. 12189764.9, dated Jan. 21, 2019, 7 pages.
Office Action received for European Patent Application No. 14734674.6, dated Oct. 5, 2017, 6 pages.
Office Action received for European Patent Application No. 17210062.0, dated Jan. 3, 2019, 6 pages.
Office Action received for Japanese Patent Application No. 2014-253365, dated Aug. 31, 2018, 6 pages (3 pages of English Translation and 3 pages of Official Copy).
Office Action received for Japanese Patent Application No. 2016-091460, dated Jun. 1, 2018, 3 pages (1 page of English Translation and 2 pages of Official Copy).
Office Action received for Japanese Patent Application No. 2016-527367, dated Feb. 26, 2018, 15 pages (8 pages of English Translation and 7 pages of Official Copy).
Office Action received for Japanese Patent Application No. 2016-527367, dated Jul. 7, 2017, 16 pages (8 pages of English Translation and 8 pages of Official Copy).
Office Action received for Japanese Patent Application No. 2017-142812, dated Nov. 2, 2018, 6 pages (3 pages of English Translation and 3 pages of Official Copy).
Office Action received for Japanese Patent Application No. 2017-204561, dated Aug. 6, 2018, 7 pages (4 pages of English Translation and 3 pages of Official copy).
Office Action received for Japanese Patent Application No. 2017-204561, dated Nov. 6, 2018, 8 pages (4 pages of English Translation and 4 pages of Official copy).
Office Action received for Japanese Patent Application No. 2017-223021, dated Jul. 30, 2018, 12 pages (6 pages of English Translation and 6 pages of Official copy).
Office Action received for Korean Patent Application No. 10-2016-7014051, dated Apr. 30, 2018, 14 pages (7 pages of English Translation and 7 pages of Official Copy).
Office Action received for Korean Patent Application No. 10-2016-7014051, dated Jun. 20, 2017, 16 pages (8 pages of English Translation and 8 pages of Official Copy).
Summons to Attend Oral Proceedings Received for European Patent Application No. 10762813.3, mailed on Nov. 9, 2016, 9 pages.
Summons to Attend Oral Proceedings received for European Patent Application No. 13795330.3, mailed on Oct. 19, 2018, 13 pages.
Office Action received for European Patent Application No. 08705639.6, dated Dec. 19, 2013, 7 pages.
Notice of Allowance received for Korean Patent Application No. 10-2012-7029270, dated Sep. 23, 2014, 2 pages (Official Copy only). {See Communication under 37 CFR § 1.98(a) (3)}.

Office Action Received for Korean Patent Application No. 10-2012-7029270, dated Dec. 4, 2013, 4 pages (Official Copy only). {See Communication under 37 CFR § 1.98(a) (3)}.
Office Action received for Korean Patent Application No. 10-2014-7036624, dated Jan. 29, 2016, 10 pages (5 pages of English Translation and 5 pages of Official Copy).
Office Action received for European Patent Application No. 10762813.3, dated Mar. 21, 2016, 6 pages.
Final Office Action received for U.S. Appl. No. 11/620,687, dated Aug. 18, 2009, 7 pages.
Non-Final Office Action received for U.S. Appl. No. 11/620,687, dated Dec. 22, 2008, 9 pages.
Non-Final Office Action received for U.S. Appl. No. 11/620,687, dated Jan. 11, 2010, 9 pages.
Non-Final Office Action received for U.S. Appl. No. 12/788,278, dated Oct. 16, 2012, 19 pages.
Notice of Allowance received for U.S. Appl. No. 12/788,278, dated May 1, 2013, 8 pages.
Advisory Action Received for U.S. Appl. No. 12/888,362, dated Sep. 4, 2015, 3 Pages.
Final Office Action received for U.S. Appl. No. 12/888,362, dated Apr. 29, 2015, 12 pages.
Final Office Action Received for U.S. Appl. No. 12/888,362, dated Jan. 3, 2013, 13 pages.
Non-Final Office Action received for U.S. Appl. No. 12/888,362, dated Sep. 4, 2014, 10 pages.
Non-Final Office Action Received for U.S. Appl. No. 12/888,362, dated Jul. 20, 2012, 15 pages.
Non-Final Office Action received for U.S. Appl. No. 12/888,366, dated Jul. 31, 2012, 10 pages.
Notice of Allowance received for U.S. Appl. No. 12/888,366, dated Dec. 14, 2012, 11 pages.
Non-Final Office Action Received for U.S. Appl. No. 12/888,370, dated Aug. 22, 2012, 13 pages.
Notice of Allowance received for U.S. Appl. No. 12/888,370, dated Feb. 12, 2013, 10 pages.
Notice of Allowance received for U.S. Appl. No. 12/888,370, dated Jul. 1, 2014, 8 pages.
Non-Final Office Action Received for U.S. Appl. No. 12/888,373, dated Sep. 10, 2012, 12 pages.
Notice of Allowance received for U.S. Appl. No. 12/888,373, dated Jul. 1, 2014, 8 pages.
Notice of Allowance received for U.S. Appl. No. 12/888,373, dated Feb. 22, 2013, 12 pages.
Final Office Action Received for U.S. Appl. No. 12/888,375, dated Nov. 7, 2012, 14 pages.
Non-Final Office Action Received for U.S. Appl. No. 12/888,375, dated Jun. 7, 2012, 11 pages.
Non-Final Office Action received for U.S. Appl. No. 12/888,375, dated Sep. 30, 2013, 10 pages.
Final Office Action Received for U.S. Appl. No. 12/888,376, dated Feb. 8, 2013, 11 pages.
Non-Final Office Action received for U.S. Appl. No. 12/888,376, dated Aug. 29, 2014, 12 pages.
Non-Final Office Action Received for U.S. Appl. No. 12/888,376, dated Oct. 2, 2012, 12 pages.
Notice of Allowance received for U.S. Appl. No. 12/888,376, dated May 29, 2015, 14 pages.
Non-Final Office Action Received for U.S. Appl. No. 12/888,377, dated Sep. 13, 2012, 13 pages.
Notice of Allowance received for U.S. Appl. No. 12/888,377, dated Jan. 30, 2013, 12 pages.
Non-Final Office Action received for U.S. Appl. No. 14/142,648, dated Apr. 12, 2016, 11 pages.
Notice of Allowance received for Chinese Patent Application No. 201010592864.9, dated Jan. 30, 2015, 4 pages (Official Copy Only). {See Communication under 37 CFR § 1.98(a) (3)}.
Notice of Allowance received for Australian Patent Application No. 2010350739, dated Sep. 8, 2014, 2 pages.
Office Action received for Japanese Patent Application No. 2013-503721, dated Feb. 14, 2014, 8 pages (5 pages of English Translation and 3 pages of Official Copy).

(56) References Cited

OTHER PUBLICATIONS

Office Action Received for Japanese Patent Application No. 2013-503721, dated Jun. 6, 2014, 3 pages (Official Copy only). {See Communication under 37 CFR § 1.98(a) (3)}.
Office Action received for Australian Patent Application No. 2014100582, dated Aug. 7, 2014, 5 pages.
Office Action received for Australian Patent Application No. 2014100582, dated Feb. 4, 2015, 3 pages.
Office Action Received for Japanese Patent Application No. 2014-139095, dated Aug. 17, 2015, 6 pages (3 pages of English Translation and 3 pages of Official Copy).
Office Action Received for Australian Patent Application No. 2014274537, dated Aug. 14, 2015, 3 pages.
Office Action received for Australian Patent Application No. 2014274556, dated Aug. 28, 2015, 2 pages.
Office Action received for Japanese Patent Application No. 2015-532193, dated Mar. 22, 2016, 7 pages (3 pages of English Translation and 4 pages of Official Copy).
Apple, "Keynote'08 User's Guide", © Apple Inc., 2008, 204 pages.
Bott et al., "Table of Contents/Chapter 20: Putting Pictures on Folder Icons", Microsoft Windows XP Inside Out Deluxe, Second Edition, Online Available at: <http://proquest.safaribooksonline.com/book/operating-systems/9780735642171>, Oct. 6, 2004, pp. 1-8 and 669.
Clifton, Marc, "Detect if Another Process is Running and Bring it to the Foreground", Online Available at : <https://www.codeproject.com/Articles/2976/Detect-if-another-process-is-running-andbring-it>, Sep. 30, 2002, 6 pages.
cocoabuilder.com, "Single Instance of a Cocoa Application", Online Available at: <http://www.cocoabuilder.com/archive/cocoa/167892-single-instance-of-cocoa-application.html>, Jul. 19, 2006, 4 pages.
Collomb et al., "Improving Drag-and-Drop on Wall-Size Displays", proceedings of Graphics Intertace, May 9, 2005, pp. 25-32.
Deanhill, "Run a Program or Switch to an Already Running Instance", Available Online at: <https://autohotkey.com/board/topic/7129-run-a-program-or-switch-to-an-already-running-instance/>, Feb. 1, 2006, 16 pages.
Fujitsu Ltd, "SX/G Manual of Icons on Desktop, Edition 14/14A V14", 1st Edition, Mar. 27, 1998, 4 pages (Official Copy only). {See Communication under 37 CFR § 1.98(a) (3)}.
Gsmarena Team, "HTC Touch review", Online Available at: <twww.gsmarena.com/htc_touch-review-189p3.php>, Nov. 28, 2007, 18 Pages.
Hayama et al., "To Change Images of Scaled-Down Representation", Windows Xp SP3 & SP2, Dec. 1, 2008, pp. 294-295. (2 pages of English Translation and 4 pages of official Copy).
Higuchi, Tadahiro, "Try API!, Making a cool application with Visual Basic 6.0", 1st edition, Japan, AI Publishing, AI Mook 221, Jul. 16, 1999, 23 pages (Official Copy Only). {See Communication under 37 CFR § 1.98(a) (3)}.
Jobs, Steve, "iPhone Introduction in 2007 (Complete)", Online Available at <https://www.youtube.com/watch?v=9hUlxyE2Ns8>, Jan. 10, 2013, 3 pages.
Mac People, "Useful Technique for Web Browser", Ascii Media Works Inc., vol. 15, No. 6, Jun. 1, 2009, pp. 36-47.
Mcguffin et al., "Acquisition of Expanding Targets", ACM, Apr. 20-25, 2002, 8 pages.
Microsoft Help and Support, "How to Arrange or Move Icons on the Desktop", Online Available at: <http://support.microsoft.com/kb/289587>, Mar. 29, 2007, 2 pages.
MOBILISSIMO.RO, "HTC Touch—Touch FLO Demo", Online Available at: <https://www.youtube.com/watch?v=YQ8TQ9Rr_7E>, Jun. 5, 2007, 1 page.
Naver Blog, "iPhone iOS 4 Folder Management", Jun. 27, 2010, 2 pages. (Official Copy Only) {See Communication under 37 CFR § 1.98(a) (3)}.
Nishida et al., "Drag-and-Guess: Drag-and-Drop with Prediction", INTERACT'07 Proceedings of the 11th IFIP TC 13 International Conference on Human-Computer interaction, Sep. 10, 2007, pp. 461-474.

International Preliminary Report on Patentability received for PCT Patent Application No. PCT/US2010/050056, dated Oct. 18, 2012, 21 pages.
International Search Report and Written Opinion received for PCT Patent Application No. PCT/US2010/050056, dated May 13, 2011, 26 pages.
Invitation to Pay Additional Fees received for PCT Patent Application No. PCT/US2010/050056, dated Jan. 5, 2011, 5 pages.
International Preliminary Report on Patentability received for PCT Patent Application No. PCT/US2013/067634, dated May 12, 2016, 9 pages.
International Search Report and Written Opinion received for PCT Patent Application No. PCT/US2013/067634, dated Apr. 16, 2014, 11 pages.
International Preliminary Report on Patentability received for PCT Patent Application No. PCT/US2014/040414, dated Dec. 23, 2015, 10 pages.
International Search Report and Written Opinion received for PCT Patent Application No. PCT/US2014/040414, dated Sep. 16, 2014, 12 pages.
Ren, X., et al., "The Adaptive Hybrid Cursor: A Pressure-Based Target Selection Technique for Pen-Based User interfaces", INTERACT'07, Proceedings of the 11th IFIP TC 13 International Conference on Human-Computer Interaction, Sep. 10, 2007, 14 pages.
Stinson, Craig, "WINDOWS 95 Official Manual, ASCII Ltd.", ver.1, Mar. 1, 1996, pp. 128-129.
Turetta, Jonathan, "Steve Jobs iPhone 2007 Presentation (HD)", Online Available at: <https://www.youtube.com/watch?v=vN4U5FgrOdQ&feature=youtube>, May 13, 2013, 2 pages.
Windows XP, "Enable or Disable AutoArrange Desktop Icons in Windows XP", Windows Tutorials, Online Available at: <http://www.freemailtutorials.com/microsoftWindows/autoArrangeIconsOnTheDesktop.php>, Nov. 19, 2009, 3 pages.
Decision on Acceptance received for Australian Patent Application No. 2017202587, dated Oct. 8, 2019, 19 pages.
Decision on Appeal received for U.S. Appl. No. 14/142,640, mailed on Oct. 7, 2019, 9 pages.
Final Office Action received for U.S. Appl. No. 15/418,537, dated Sep. 23, 2019, 53 pages.
Notice of Allowance received for U.S. Appl. No. 14/710,125, dated Apr. 19, 2019, 8 pages.
Office Action received for Chinese Patent Application No. 201380080659.6, dated Mar. 4, 2019, 9 pages (5 pages of English Translation and 4 pages of Official Copy).
Office Action received for Japanese Patent Application No. 2017-223021, dated Apr. 8, 2019, 7 pages (3 pages of English Translation and 4 pages of Official Copy).
Office Action received for Korean Patent Application No. 10-2019-7005262, dated May 3, 2019, 5 pages (2 pages of English Translation and 3 pages of Official Copy).
Decision on Appeal received for U.S. Appl. No. 14/710,125, mailed on Mar. 11, 2019, 7 pages.
Extended European Search Report received for European Patent Application No. 17810739.7, dated Mar. 22, 2019, 9 pages.
Final Office Action received for U.S. Appl. No. 15/426,836, dated Mar. 29, 2019, 49 pages.
Non-Final Office Action received for U.S. Appl. No. 15/421,865, dated Mar. 21, 2019, 18 pages.
Notice of Allowance received for Japanese Patent Application No. 2017-204561, dated Mar. 12, 2019, 4 pages (1 page of English Translation and 3 pages of Official Copy).
Feist,Jonathan, "Android customization—how to create a custom clock widget using Zooper Widget", Available Online at: https://www.androidauthority.com/zooper-widget-clock-366476/, May 15, 2014, 10 pages.
Getting Started, "Qualcomm Toq—smartwatch—User Manual", Available Online at: https://toq.qualcomm.com/sites/defaultlfiles/qualcomm_toq_user_manual.pdf Nov. 27, 2013, pp. 1-38.
Final Office Action received for U.S. Appl. No. 15/421,865, dated Dec. 2, 2019, 19 pages.
Notice of Allowance received for U.S. Appl. No. 14/142,640, dated Dec. 11, 2019, 7 pages.

(56) References Cited

OTHER PUBLICATIONS

Office Action received for Korean Patent Application No. 10-2011-7026583, dated Oct. 25, 2013, 4 pages (1 page of English Translation and 3 pages of Official Copy).
Record of Oral Hearing received for U.S. Appl. No. 14/142,640, mailed on Nov. 20, 2019, 15 pages.
Notice of Acceptance received for Australian Patent Application No. 2018200272, dated Apr. 23, 2019, 3 pages.
Notice of Allowance received for U.S. Appl. No. 14/710,125, dated May 7, 2019, 9 pages.
Office Action received for Australian Patent Application No. 2017202587, dated Apr. 26, 2019, 4 pages.
Office Action received for Australian Patent Application No. 2018203512, dated Apr. 15, 2019, 4 pages.
Non-Final Office Action received for U.S. Appl. No. 15/411,110, dated Jul. 22, 2019, 29 pages.
Office Action received for Australian Patent Application No. 2017277851, dated Jul. 5, 2019, 3 pages.
Applicant Initiated Interview Summary received for U.S. Appl. No. 15/411,110, dated Oct. 28, 2019, 6 pages.
Board Opinion received for Chinese Patent Application No. 201480001676.0, dated Oct. 21, 2019, 10 pages (1 page of English Translation and 9 pages of Official Copy).
Examiner's Answer to Appeal Brief received for U.S. Appl. No. 14/261,112, mailed on Oct. 29, 2019, 10 pages.
Extended European Search Report received for European Patent Application No. 17810723.1, dated Nov. 12, 2019, 9 pages.
Non-Final Office Action received for U.S. Appl. No. 16/020,804, dated Nov. 20, 2019, 13 pages.
Notice of Acceptance received for Australian Patent Application No. 2017202587, dated Nov. 6, 2019, 3 pages.
Office Action received for Japanese Patent Application No. 2017-223021, dated Sep. 24, 2019, 6 pages (3 pages of English Translation and 3 pages of Official Copy).
Office Action received for Japanese Patent Application No. 2018-201088, dated Oct. 11, 2019, 9 pages (5 pages of English Translation and 4 pages of Official Copy).
Summons to Attend Oral Proceedings received for European Patent Application No. 17210062.0, mailed on Oct. 30, 2019, 7 pages.
Office Action received for European Patent Application No. 14734674.6, dated Aug. 30, 2019, 6 pages.
Decision to Grant received for European Patent Application No. 17198398.4, dated Jun. 14, 2019, 3 pages.
Office Action received for Australian Patent Application No. 2017277813, dated Jun. 11, 2019, 3 pages.
Office Action received for Japanese Patent Application No. 2018-121118, dated May 14, 2019, 10 pages (5 pages of English Translation and 5 pages of Official Copy).
Intention to Grant received for European Patent Application No. 13795330.3, dated Aug. 9, 2019, 13 pages.
Minutes of the Oral Proceedings received for European Patent Application No. 13795330.3, mailed on Aug. 2, 2019, 7 pages.
Notice of Allowance received for Japanese Patent Application No. 2017-142812, dated Jul. 19, 2019, 4 pages (1 page of English Translation and 3 pages of Official copy).
Notice of Allowance received for Chinese Patent Application No. 201380080659.6, dated Jul. 29, 2019, 2 page (1 page of English Translation and 1 pages of Official Copy).
Applicant Initiated Interview Summary received for U.S. Appl. No. 16/270,902, dated Mar. 11, 2020, 3 pages.
Decision on Appeal received for U.S. Appl. No. 14/142,648, mailed on Feb. 28, 2020, 6 pages.
Final Office Action received for U.S. Appl. No. 15/411,110, dated Mar. 5, 2020, 30 pages.
Notice of Allowance received for U.S. Appl. No. 14/142,648, dated Mar. 13, 2020, 5 pages.
Record of Oral Hearing received for U.S. Appl. No. 14/142,648, mailed on Mar. 2, 2020, 13 pages.
Summons to Attend Oral Proceedings received for European Patent Application No. 12189764.9, mailed on Mar. 12, 2020, 11 pages.
Applicant-Initiated Interview Summary received for U.S. Appl. No. 15/421,865, dated Feb. 3, 2020, 5 pages.
Corrected Notice of Allowance received for U.S. Appl. No. 14/142,640, dated Feb. 5, 2020, 4 pages.
Decision to Grant received for European Patent Application No. 13795330.3, dated Jan. 16, 2020, 2 pages.
Pre-interview First Office Action received for U.S. Appl. No. 16/270,902, dated Feb. 10, 2020, 5 pages.
Intention to Grant received for European Patent Application No. 17210062.0, dated Jun. 23, 2020, 8 pages.
Minutes of Oral Proceedings received for European Patent Application No. 17210062.0, mailed on Jun. 17, 2020, 5 pages.
Non-Final Office Action received for U.S. Appl. No. 15/411,110, dated Jun. 26, 2020, 32 pages.
Notice of Allowance received for U.S. Appl. No. 16/020,804, dated May 28, 2020, 18 pages.
Office Action received for Japanese Patent Application No. 2019-024663, dated Apr. 27, 2020, 8 pages (4 pages of English Translation and 4 pages of Official Copy).
Office Action received for Australian Patent Application No. 2019210673, dated Jul. 28, 2020, 4 pages.
Applicant-Initiated Interview Summary received for U.S. Appl. No. 16/267,817, dated Jul. 14, 2020, 5 pages.
Examiner's Pre-Review Report received for Japanese Patent Application No. 2018-121118, dated Jun. 2, 2020, 4 pages (2 pages of English Translation and 2 pages of Official Copy).
Corrected Notice of Allowance received for U.S. Appl. No. 14/142,648, dated May 20, 2020, 2 pages.
Notice of Allowance received for U.S. Appl. No. 16/428,634, dated May 8, 2020, 16 pages.
Summons to Attend Oral Proceedings received for European Patent Application No. 12189764.9, mailed on May 20, 2020, 11 pages.
Final Office Action received for U.S. Appl. No. 16/267,817, dated Aug. 24, 2020, 23 pages.
Third Party Proceedings received for European Patent Application No. 17210062.0, mailed on Apr. 23, 2020, 6 pages.
Notice of Acceptance received for Australian Patent Application No. 2017277813, dated Jun. 16, 2020, 3 pages.
Notice of Allowance received for U.S. Appl. No. 14/142,648, dated Jul. 15, 2020, 6 pages.
Non-Final Office Action received for U.S. Appl. No. 16/270,902, dated Mar. 27, 2020, 11 pages.
Notice of Allowance received for Korean Patent Application No. 10-2019-7005262, dated Mar. 25, 2020, 5 pages (2 pages of English Translation and 3 pages of Official Copy).
Notice of Allowance received for U.S. Appl. No. 15/418,537, dated Apr. 6, 2020, 9 pages.
Notice of Allowance received for U.S. Appl. No. 16/378,291, dated Mar. 25, 2020, 11 pages.
Office Action received for Australian Patent Application No. 2017277813, dated Mar. 20, 2020, 4 pages.
Advisory Action received for U.S. Appl. No. 15/421,865, dated Apr. 16, 2020, 7 pages.
Applicant-Initiated Interview Summary received for U.S. Appl. No. 15/411,110, dated Apr. 21, 2020, 5 pages.
Applicant-Initiated Interview Summary received for U.S. Appl. No. 16/020,804, dated Apr. 13, 2020, 3 pages.
Non-Final Office Action received for U.S. Appl. No. 16/267,817, dated Apr. 15, 2020, 25 pages.
Notice of Acceptance received for Australian Patent Application No. 2019200692, dated Apr. 7, 2020, 3 pages.
Office Action received for Australian Patent Application No. 2019219816, dated Apr. 17, 2020, 3 pages.
Result of Consultation received for European Patent Application No. 17210062.0, dated Apr. 20, 2020, 2 pages.
Notice of Allowance received for Japanese Patent Application No. 2018-201088, dated Sep. 18, 2020, 4 pages. (1 page of English Translation and 3 pages of Official Copy).
Notice of Allowance received for Canadian Patent Application No. 2,983,178, dated Oct. 20, 2020, 1 page.

(56) References Cited

OTHER PUBLICATIONS

Office Action received for Japanese Patent Application No. 2019-024663, dated Oct. 5, 2020, 7 pages (4 pages of English Translation and 3 pages of Official Copy).

\* cited by examiner

PORTABLE ELECTRONIC DEVICE WITH INTERFACE RECONFIGURATION MODE

RELATED APPLICATIONS

This application is a continuation of U.S. patent application Ser. No. 14/710,125, "Portable Electronic Device with Interface Reconfiguration Mode," filed May 12, 2015, which is a continuation of U.S. patent application Ser. No. 12/364,470, "Portable Electronic Device with Interface Reconfiguration Mode," filed Feb. 2, 2009, which is a continuation of U.S. patent application Ser. No. 11/459,602, "Portable Electronic Device with Interface Reconfiguration Mode," filed Jul. 24, 2006, now U.S. Pat. No. 7,509,588, which claims priority to U.S. Provisional Patent Application No. 60/755,368, filed Dec. 30, 2005, entitled "Portable Electronic Device with Interface Reconfiguration Mode," each of which is hereby incorporated by reference in its entirety.

TECHNICAL FIELD

The disclosed embodiments relate to user interfaces, and in particular, to user interfaces that use touch-sensitive displays and include an interface reconfiguration mode.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more pushbuttons, overloading the functions of pushbuttons, or using complex menu systems to allow a user to access, store and Manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and/or menu hierarchies, such inflexibility is frustrating to many users.

Some conventional user interfaces can be configured by users, thereby allowing at least partial customization. Unfortunately, the process of modifying such conventional user interfaces is often as cumbersome and complicated as the use of the conventional user interface itself. In particular, the required behaviors during configuration of such conventional user interfaces are often counter intuitive and the corresponding indicators guiding user actions are often difficult to understand. These challenges are often a source of additional frustration for users.

Accordingly, there is a need for a more transparent and intuitive user interfaces for portable devices that enable a user to configure the user interface.

SUMMARY OF EMBODIMENTS

The above deficiencies and other problems associated with user interfaces for portable devices are reduced or eliminated by the disclosed portable electronic device, which includes an interface reconfiguration mode that intuitively allows a user to reposition displayed graphical objects.

One aspect of the invention is a method in which a portable electronic device displays a first plurality of icons (e.g., graphical objects) in a first region in a touch-sensitive display; detects a first predefined user action, with respect to the touch-sensitive display, for initiating a predefined user interface reconfiguration process; and varies positions of one or more icons in the first plurality of icons in response to detecting the first predefined user action. The varying includes varying the positions of the one or more icons about respective average positions.

The varying may include animating the one or more icons to simulate floating of the one or more icons on a surface corresponding to a surface of the touch-sensitive display.

The varying position of a respective icon in the one or more icons may correspond to an equation of motion in a plane substantially coincident with the touch-sensitive display. The equation of motion may have a coefficient of friction less than a threshold, a non-zero initial velocity for the respective icon, a non-zero angular velocity, and/or a restoring force about the respective average position of the respective icon such that the position of the respective icon oscillates in a region substantially centered on the respective average position of the respective icon. In some embodiments, the respective icon rotates about the respective average position of the respective icon while maintaining a fixed orientation with respect to the touch-sensitive display.

In some embodiments, the method further includes: detecting a user making a point of contact with the touch-sensitive display at a first position corresponding to a first icon in the one or more icons and detecting movement of the point of contact to a second position of the touch-sensitive display; and responding to detecting the point of contact and detecting movement of the point of contact by displaying movement of the first icon to the second position of the touch-sensitive display, and displaying the first icon at the second position.

A second icon in the one or more icons may be moved from a respective initial position to a respective new position when the second position of the first icon at least partially overlaps with the respective initial position of the second icon. The position of the first icon may be fixed at the second position in response to detecting a second predefined user action, with respect to the touch-sensitive display, for terminating the predefined user interface reconfiguration process.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
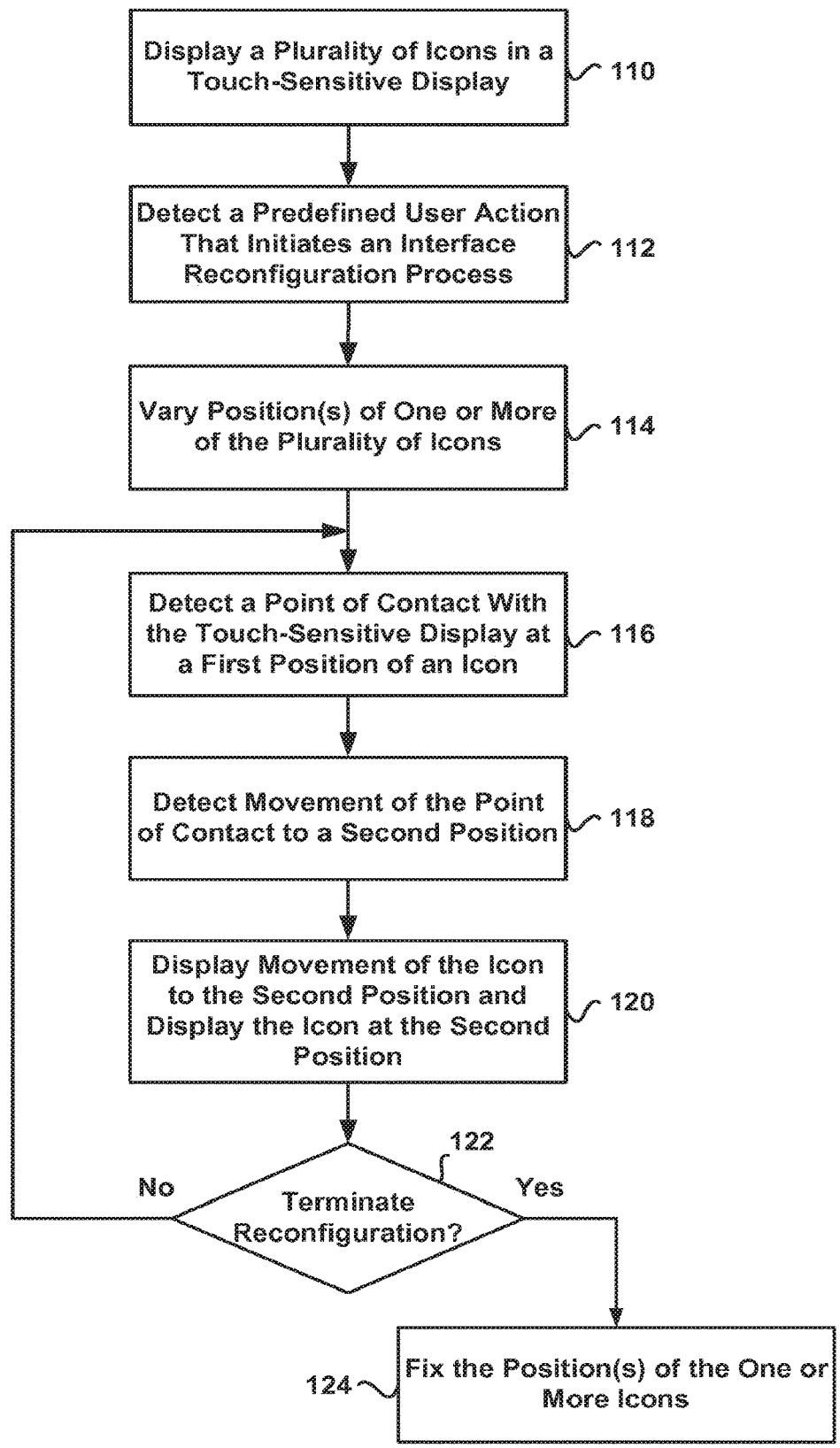
FIG. 1 is a flow diagram of one embodiment of a position adjustment process for a portable electronic device.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Overview of the Interface Reconfiguration Mode

Attention is directed towards embodiments of portable electronic devices, including portable communications devices, that have graphical user interfaces (GUIs). The portable devices include an interface reconfiguration mode. In response to a user initiating the interface reconfiguration mode, positions of one or more icons displayed on the portable device may be varied about respective average positions. The varying of the positions of the one or more icons may include animating the one or more icons to simulate floating of the one or more icons on a surface corresponding to a surface of a display in the portable device. The display may be a touch-sensitive display, which responds to physical contact by a stylus or one or more fingers at one or more contact points. While the following embodiments may be equally applied to other types of displays, a touch-sensitive display is used as an illustrative example.

The varying of the positions of the one or more icons may intuitively indicate to the user that the positions of the one or more icons may be reconfigured by the user. The user may modify, adapt and/or reconfigure the positions of the one or more icons. In embodiments where the portable device includes a touch-sensitive display, the user may make contact with the touch-sensitive display proximate to a respective icon at a first position. Upon making contact with the touch-sensitive display, the respective icon may cease varying its position. The user may drag the respective icon to a second position. Upon breaking contact with the touch-sensitive display, the respective icon may resume varying its position. In some embodiments, the respective icon can be "thrown," so that the final position of the respective icon is different from the point at which the icon is released. In this embodiment, the final position can depend on a variety of factors, such as the speed of the "throw," the parameters used in a simulated equation of motion for the "throw" (e.g., coefficient of friction), and/or the presence of a lay out grid with simulated attractive forces. In some embodiments, the display may include two regions. During the interface reconfiguration mode, positions of one or more icons displayed in the first region may be varied while positions of one or more icons displayed in the second region may be stationary.

The user may similarly modify, adapt and/or reconfigure the positions of additional icons during the interface reconfiguration Mode. When the user has completed these changes (at least for the time being), he or she may terminate the interface reconfiguration mode. In response to this user action, the portable device may return to a normal mode of operation and the varying of the displayed positions of the one or more icons will cease.

The user may initiate or terminate the interface reconfiguration process by selecting one or more appropriate physical buttons on the portable device, by a gesture (such as making contact and swiping one or More fingers across the touch-sensitive display or making contact and holding for more than a predefined time period) and/or by selecting one or more soft buttons (such as one or more icons that are displayed on the touch-sensitive display). As used herein, a gesture is a motion of the object/appendage making contact with the touch screen display surface. In some embodiments, the interface reconfiguration process terminates a pre-defined time after the interface reconfiguration process is initiated, i.e., there is a time out.

The one or more icons displayed on the portable device may be graphical objects. In some embodiments, the one or more icons may be widgets, which are combinations of states and procedures that constitute on-screen representations of controls that may be manipulated by the user, such as bars, buttons and text boxes. In an exemplary embodiment, the one or more icons correspond to application programs (email, browser, address book, etc.) that may be selected by the user by contacting the touch-sensitive display proximate to an icon of interest.

FIG. 1 is a flow diagram of one embodiment of a position adjustment process 100 for a portable electronic device. While the position adjustment process 100 described below includes a number of operations that appear to occur in a specific order, it should be apparent that the process 100 can include more or fewer operations, which can be executed serially or in parallel (e.g., using parallel processors or a multi-threading environment), an order of two or more operations may be changed and/or two or more operations may be combined into a single operation.

In the position adjustment process 100, a plurality of icons are displayed in a GUI in a touch-sensitive display (110). A first predefined user action that initiates an interface reconfiguration process is detected (112). Exemplary predefined user actions include selecting a physical button on the portable device, making a predefined gesture on the touch screen display surface, or selecting a soft button. Position(s) of one or more of the plurality of displayed icons are varied (114). A point of contact with the touch-sensitive display at a first position of a respective icon is detected (116). Movement of the point of contact to a second position is detected (118). Movement of the respective icon to the second position is displayed and the respective icon is displayed at the second position (120).

If a second predefined user action that terminates the interface reconfiguration process is detected (122—yes), the position(s) of the one or more icons is fixed (124) Exemplary predefined user actions include selecting or deselecting a physical button on the portable device, making another predefined gesture on the touch screen display surface, or selecting or deselecting a soft button. The fixed position(s) may correspond to a respective average position(s) for the one or more icons. If a second pre-defined user action that terminates the interface reconfiguration process is not detected (122—no), the process may continue when a point of contact proximate to the same or another icon is detected (116).

Figure 2A:
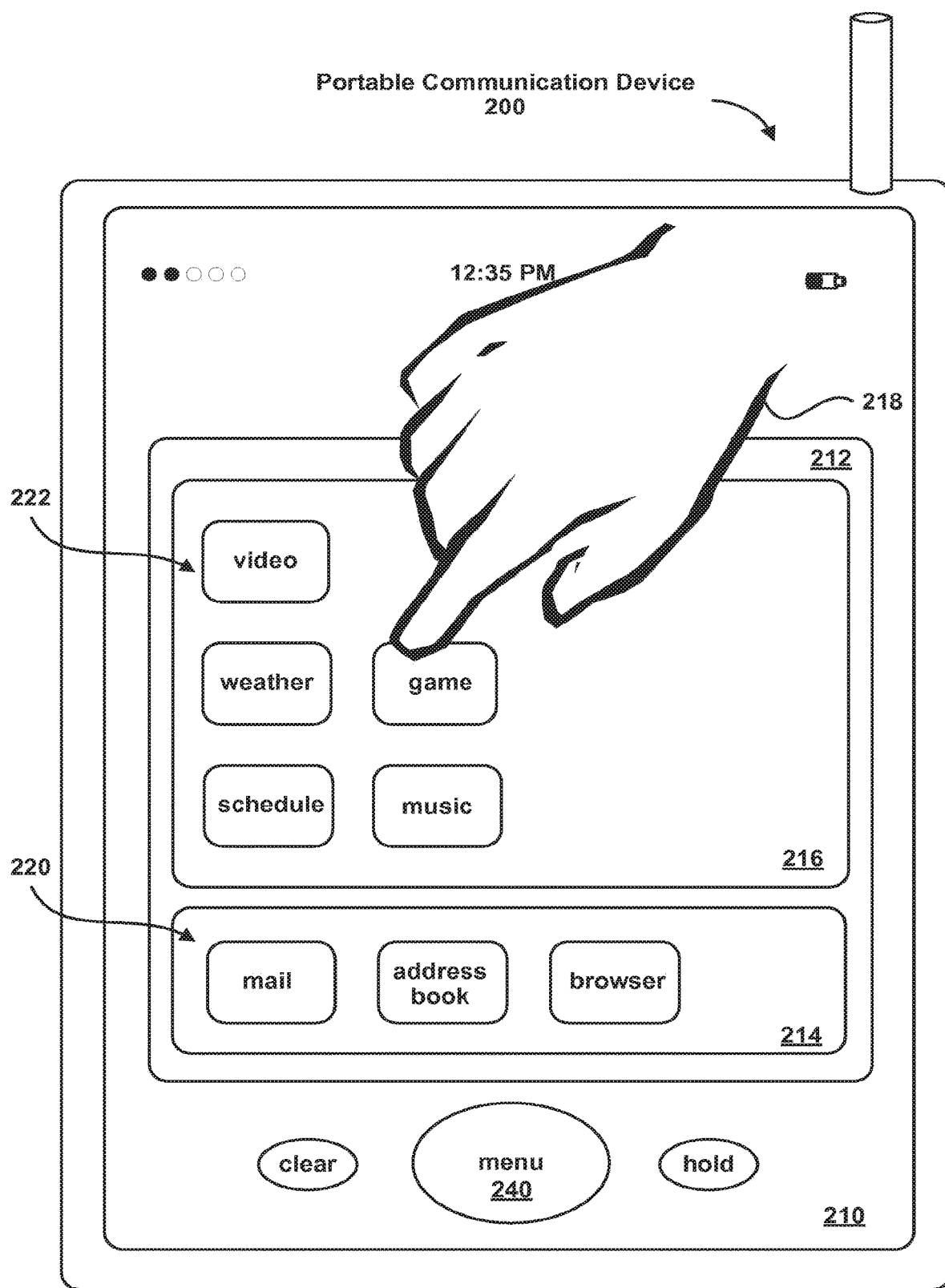
FIG. 2A is an illustration of one embodiment of a portable electronic device responsive to touch input for adjustment of the position of one or more icons.

FIG. 2A is an illustration of one embodiment of a portable electronic device 200 responsive to touch input for adjustment of the position of one or more icons. The portable electronic device 200 includes a touch-sensitive display with a GUI 210. The display surface is transparent to allow various graphical objects to be displayed to the user (e.g., widgets). In some embodiments, the GUI 210 is divided into multiple sections or windows. For example, a region 212 of GUI 210 may include a tray 216 for holding icons or graphical objects 222 representing functions that are frequently used by the user (e.g., video, weather, schedule, game, music, etc.) and a tray 214 for holding icons or graphical objects 220 representing functions that are used less frequently by the user (e.g., mail, address book, browser, etc.). The GUI 210 may also include graphical objects corresponding to high-level functions of the portable electronic device 200. For example, various objects and/or images may be presented and changed in GUI 210 by pressing a menu button 240. In embodiments that include a mobile phone, dedicated graphical objects can be presented in GUI 210 representing traditional voice and data service operations (e.g., hold, clear, etc.).

The user may interact with the portable communications device 200 by making contact with the display surface with GUI 210 using a stylus, a finger 218 (not drawn to scale in FIG. 2) or more than one finger. For example, the user may make contact with the display surface at a position of one of the icons 222 (direct contact), thereby activating the function or application program corresponding to that icon. In some embodiments, the icon 222 is activated when the user makes contact at the position of the icon and then breaks contact (for example, a tapping gesture). In some embodiments, the contact with the display surface used to activate the icon may not be at the position of the icon 222. Instead, contact may be proximate to the icon 222 (indirect contact). The latter technique is similar to "hot spots" used with Web pages and other computer user interfaces.

Figure 2B:
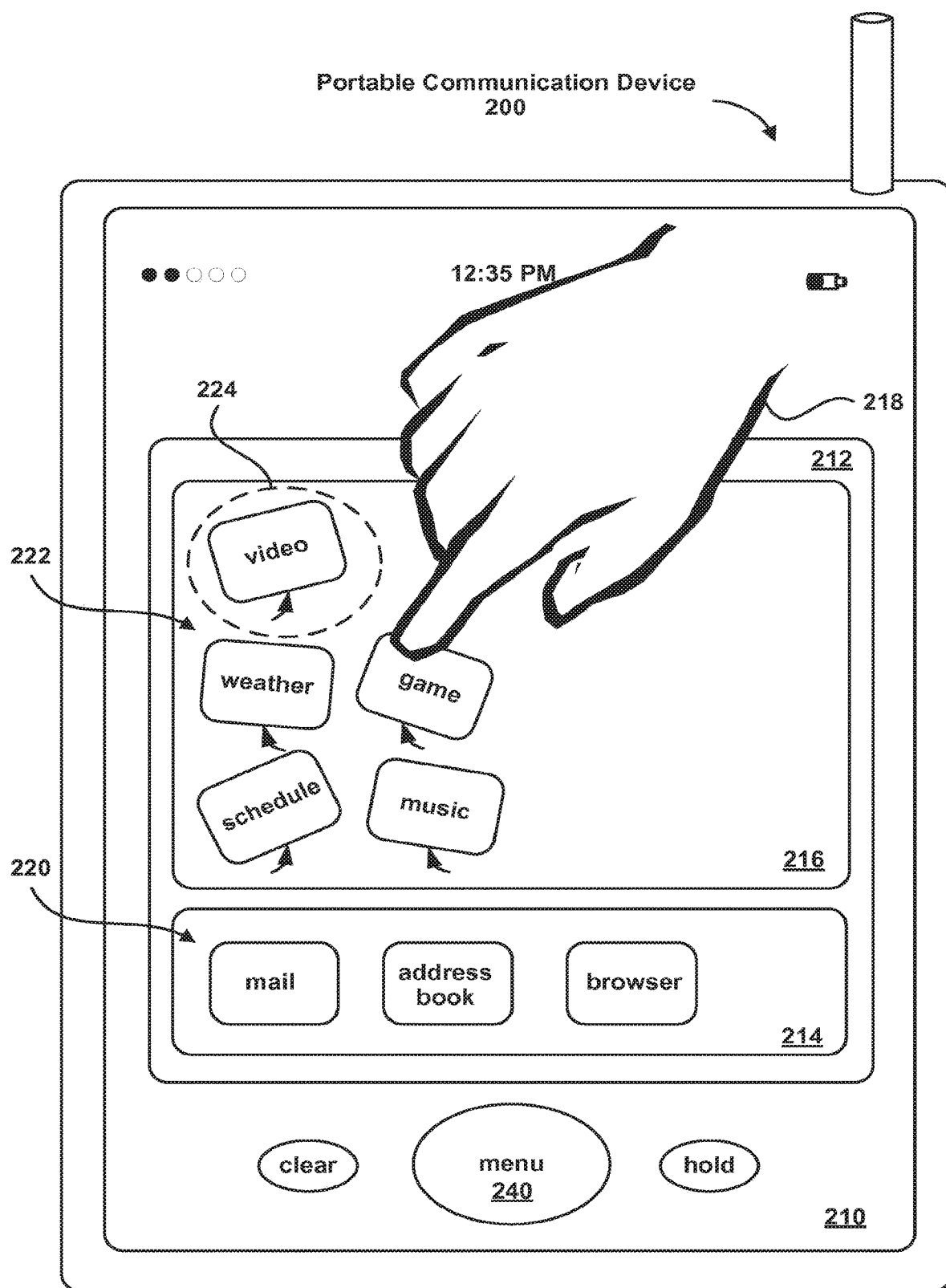
FIG. 2B is an illustration of one embodiment of a portable electronic device responsive to touch input for adjustment of the position of one or more icons.
Figure 2C:
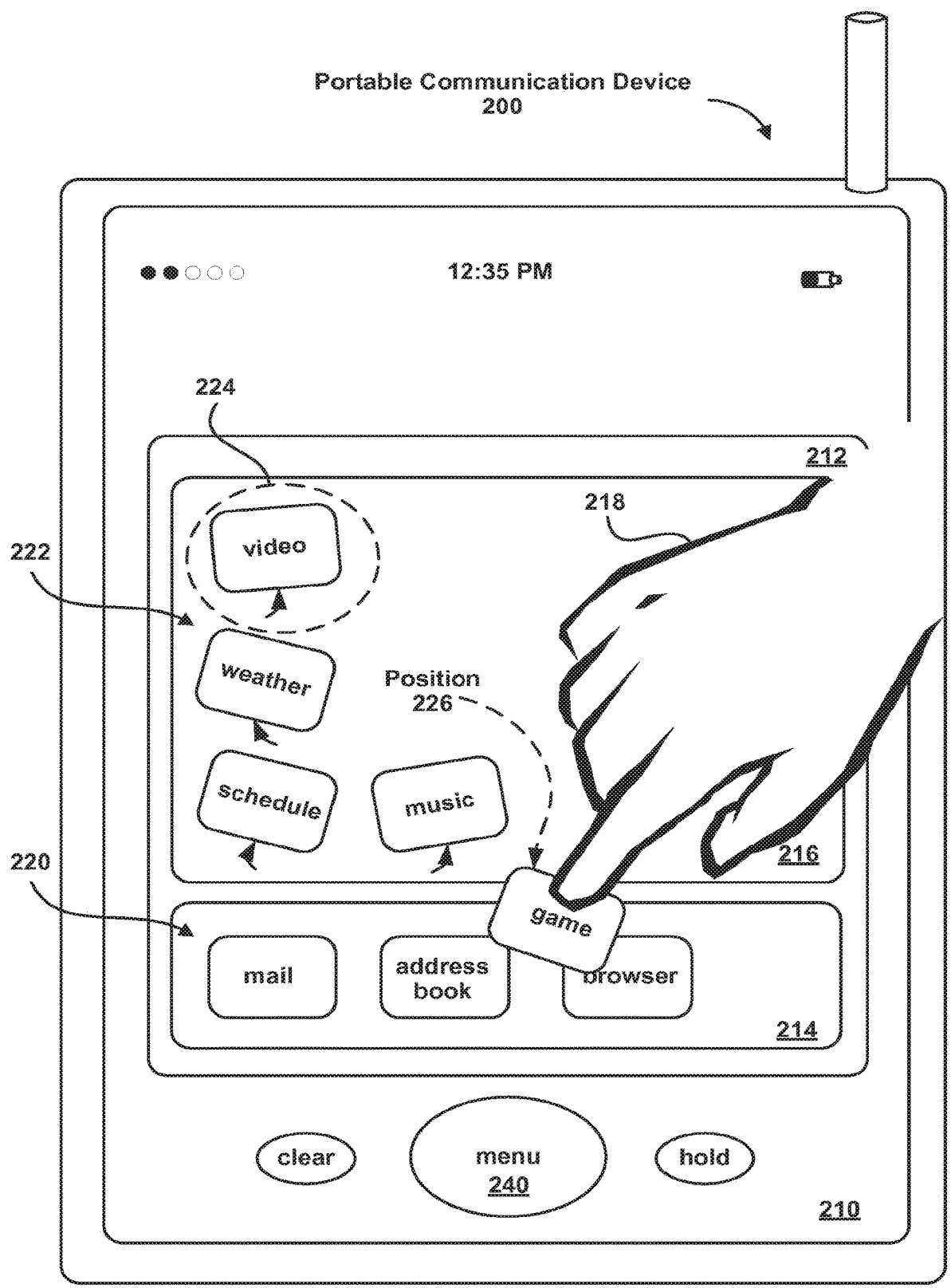
FIG. 2C is an illustration of one embodiment of a portable electronic device responsive to touch input for adjustment of the position of one or more icons.
Figure 2D:
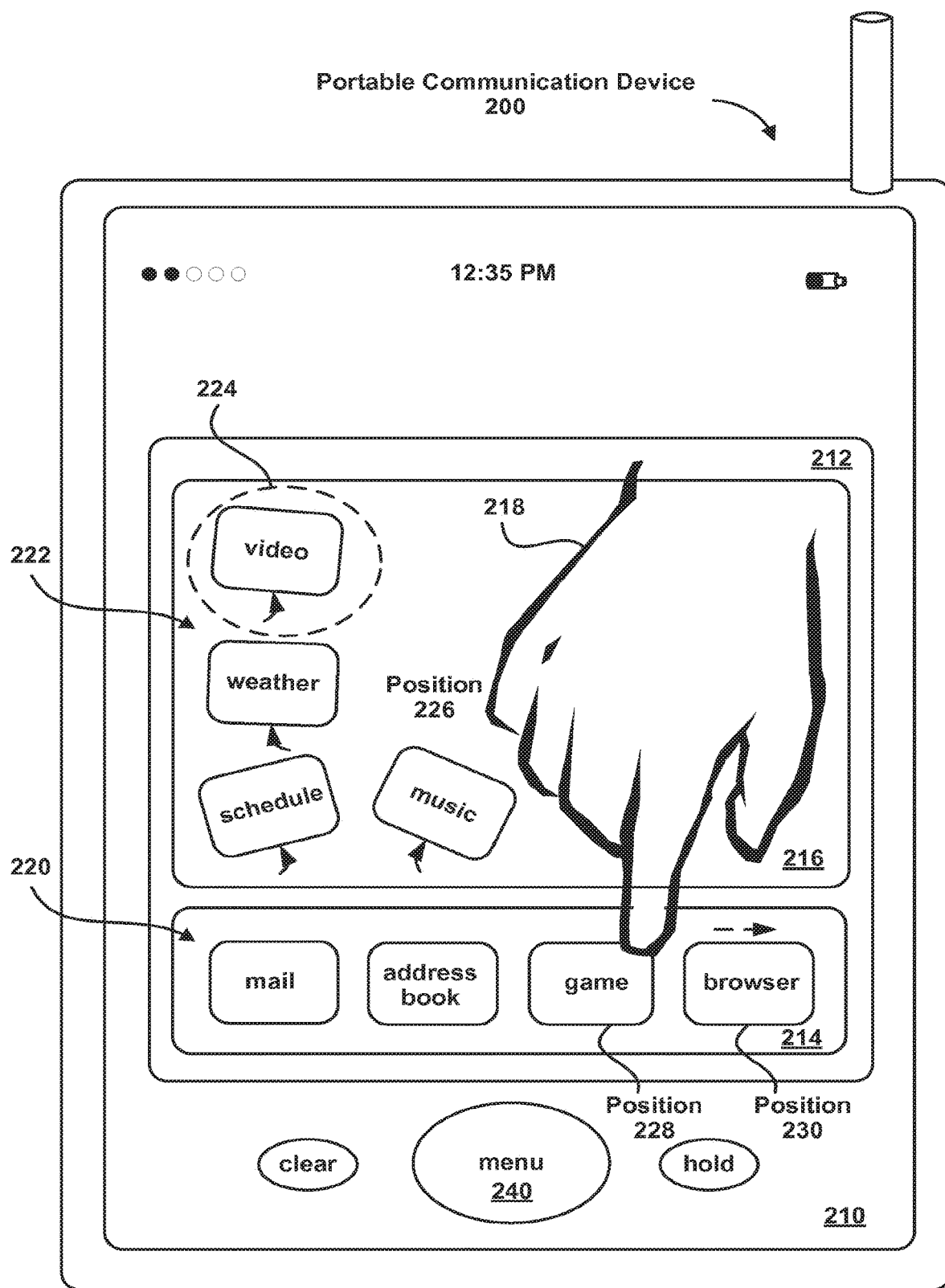
FIG. 2D is an illustration of one embodiment of a portable electronic device responsive to touch input for adjustment of the position of one or more icons.

FIGS. 2B-D show the portable electronic device 200 during the interface reconfiguration mode. After the interface reconfiguration mode is initiated, the display of one or more of the icons 222 in the tray 216 is modified from the previous stationary positions to time-varying positions. As noted previously, the display may include animating one or more of the icons 222 to simulate floating of one or more of the icons 222 on a surface corresponding to the display surface. For example, the animated varying of the positions of one or more of the icons 222 during the interface reconfiguration mode may resemble that of a hockey puck in an air hockey game. The displayed position(s) of a respective icon in the icons 222 may be varied in a region 224 centered on the average position of the respective icon.

While FIG. 2B-2D illustrates movement of one or more of the icons 222 in the tray 216, in other embodiments positions of one or more of the icons 220 in another region of GUI 210, such as tray 214, may be varied separately or in addition to those of one or more of the icons 222 in tray 216.

The time-varying position(s) of one or more of the icons 222 intuitively indicate to the user that the positions of one or more of the icons 222 may be modified. This is illustrated in FIGS. 2C-D, which show the portable electronic device 200 during the interface reconfiguration mode. The user makes contact, either direct or indirect, with one of the icons that is moving at a position 226 and moves the point of contact across the display surface with GUI 210. The contact and the motion are detected by the portable electronic device 200. As a consequence, the displayed icon, in this example corresponding to a game, is moved accordingly.

As shown in FIG. 2D, the user moves the game icon to position 228 and breaks contact with the display surface. The game icon is now displayed at the position 228. While the displayed position of the game icon is shown as stationary in FIG. 2D, in some embodiments the position of the game icon may be varied once the user breaks contact with the display surface. In some embodiments, only icons displayed in one or more subsections of the GUI 210 are displayed with a varying position during the interface reconfiguration mode. Thus, if the game icon had been dragged to another position in the tray 216, it may be displayed with a varying position after the user breaks contact with the display. In some embodiments, the device may provide audio and/or tactile feedback when an icon is moved to a new position, such as an audible chime and/or a vibration.

FIG. 2D also illustrates the optional displacement of the browser icon to position 230. The browser icon was displaced from its initial position 228 to its new position 230 due to at least partial overlap with the game icon, i.e., when the portable electronic device 200 determined that the user positioned the game icon over the browser icon, the displayed position of the browser icon was changed.

In other embodiments, an icon may be evicted or removed from the tray 214 when an additional icon, such as the music icon, is added to the tray 214. For example, the tray 214 may be configured to accommodate a finite number of icons, such as 4 icons. If an additional icon is added to the tray 214, a nearest icon to the additional icon or an icon that at least partially overlaps the additional icon may be evicted or removed from the tray 214. In some embodiments, the evicted icon floats or zooms from its position in tray 214 to a new position in tray 216, where it may join a sorted list of icons. In some embodiments, if the eviction process is not completed (e.g., the additional icon is not added to tray 214), the evicted icon may halt its progress towards its new position in tray 216 and return to its position in tray 214.

Figure 2E:
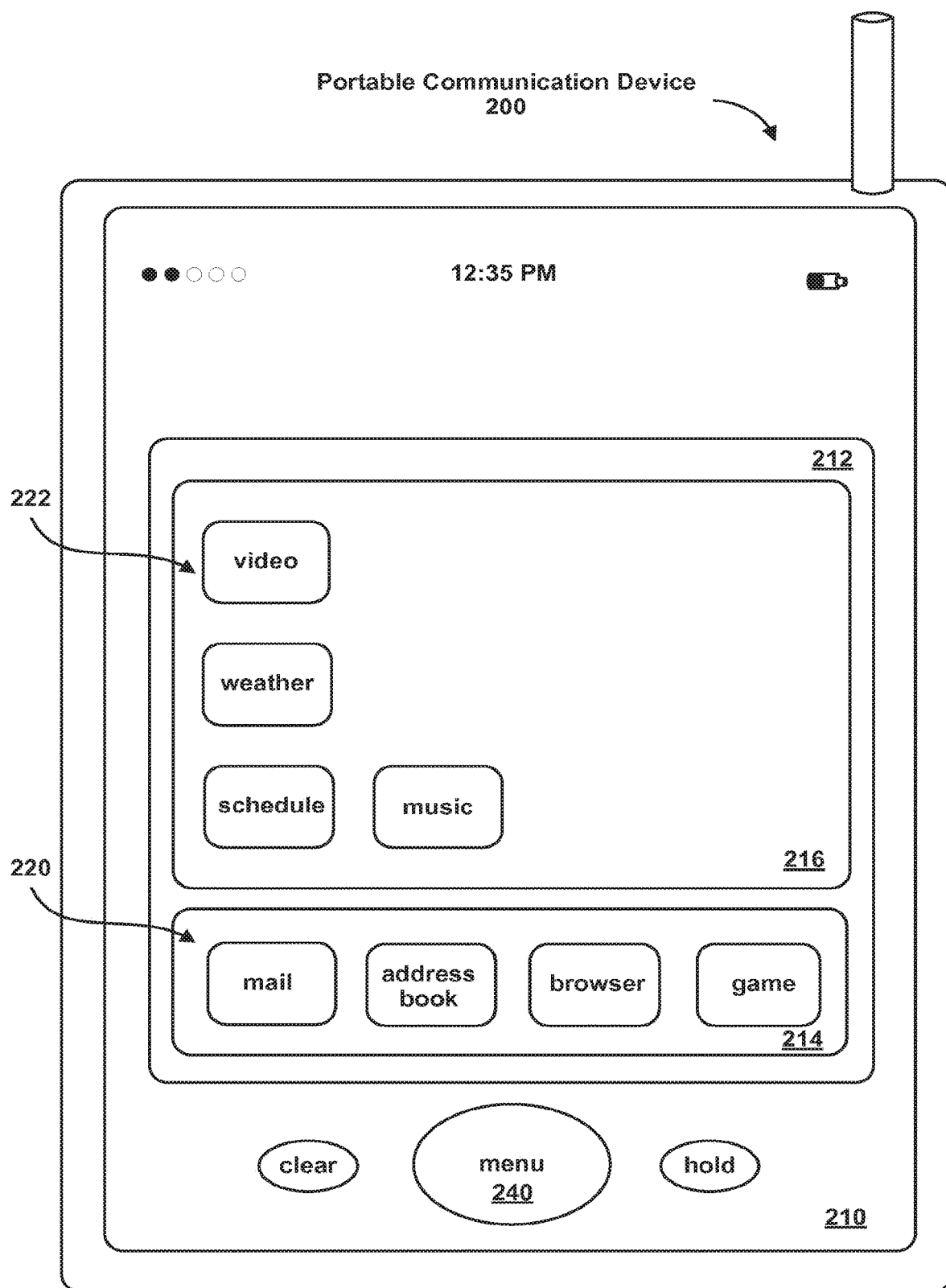
FIG. 2E is an illustration of one embodiment of a portable electronic device responsive to touch input for adjustment of the position of one or more icons.

FIG. 2E illustrates the portable electronic device 200 after the interface reconfiguration mode has been terminated or has terminated (due to a time out). The icons in GUI 210 have stationary positions. The game icon and the browser icon are displayed in their new positions in the tray 214.

The animated effects during the interface reconfiguration mode, such as the varying position(s) of one or more of the icons 222, may be in accordance with corresponding equations of motion for one or more of the icons in a plane substantially coincident with the display surface with GUI 210. The equations of motion may have a coefficient of friction less than a threshold allowing the simulation and/or animation of floating or sliding of one or more of the icons.

The equation of motion for the respective icon may have a non-zero initial velocity, a non-zero angular velocity, and/or a restoring force about the respective average position of the respective icon such that the position of the respective icon oscillates in the region 224 (FIG. 2D) substantially centered on the respective average position of the respective icon.

Figure 3A:
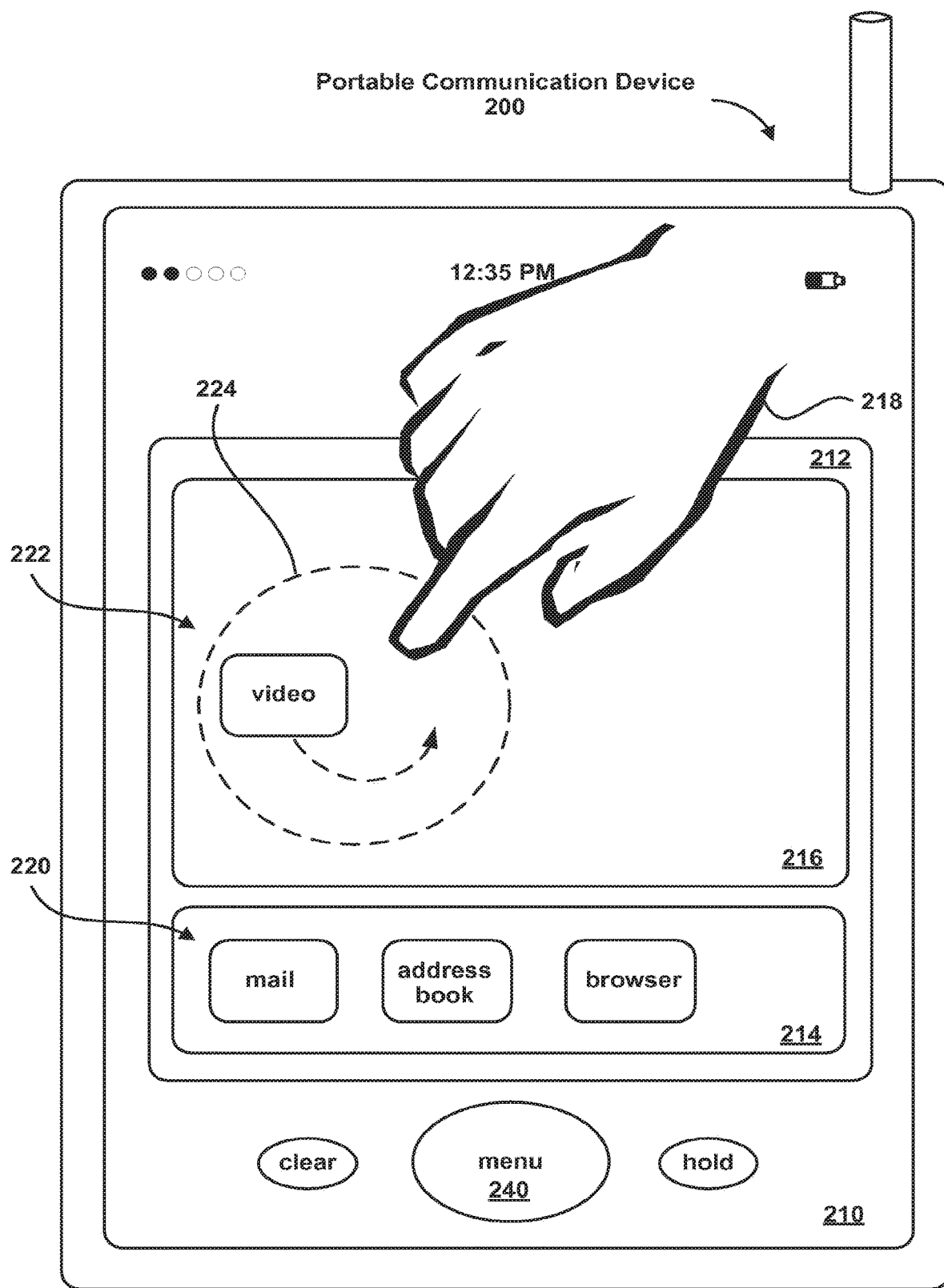
FIG. 3A is an illustration of one embodiment of a portable electronic device responsive to touch input for adjustment of the position of one or more icons.
Figure 3B:
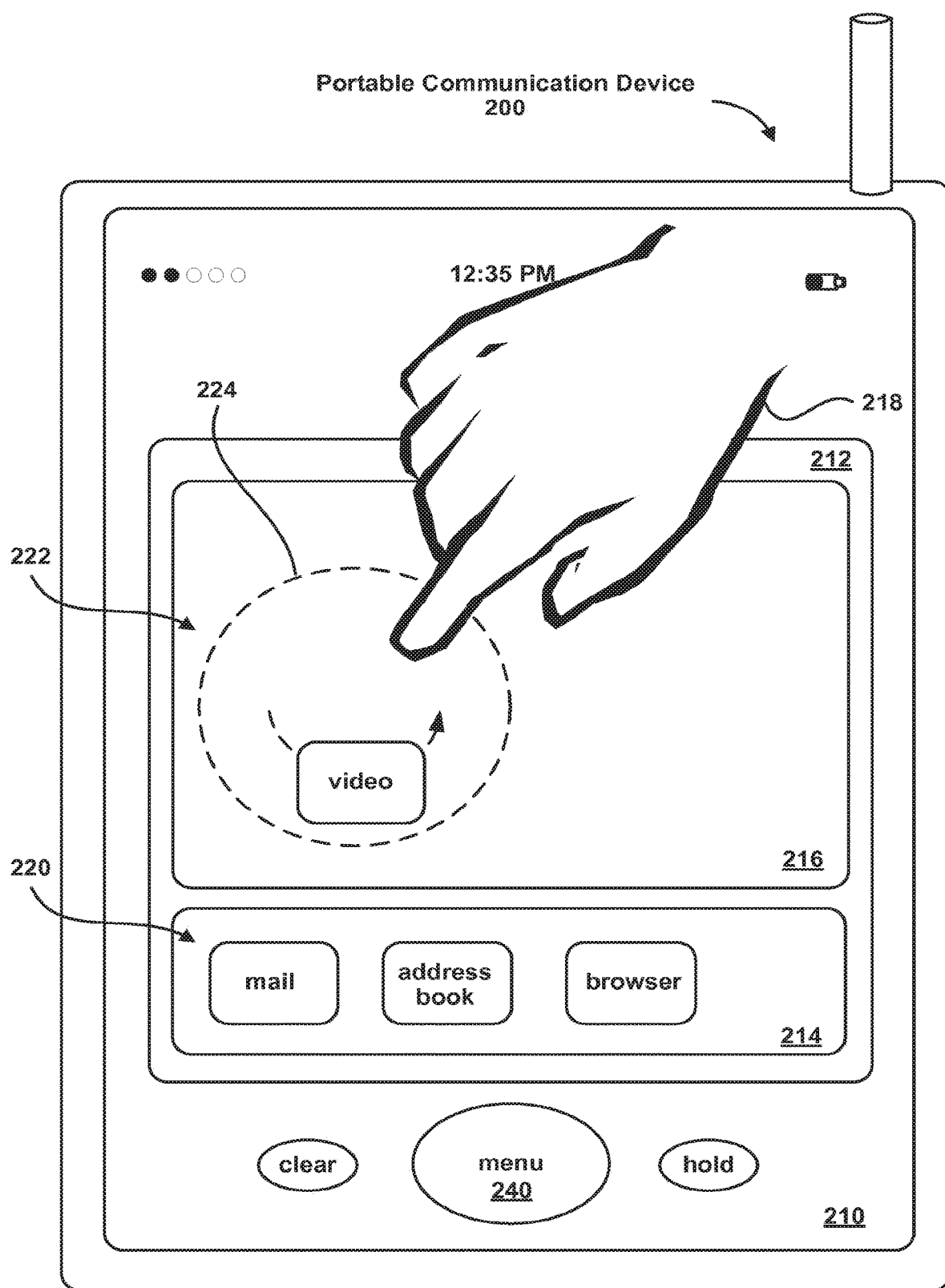
FIG. 3B is an illustration of one embodiment of a portable electronic device responsive to touch input for adjustment of the position of one or more icons.

In some embodiments, the position of the respective icon may be varied during the interface reconfiguration mode in such a way that the respective icon rotates about the respective average position of the respective icon while maintaining a fixed orientation with respect to the GUI 210 and the portable electronic device 200. This is illustrated in FIGS. 3A and 3B, which show the portable electronic device 200 during the interface reconfiguration mode. In this example, the position of the video icon 222 in tray 216 is varied in such a way that it maintains a fixed orientation in region 224. This may make it easier for the user to determine the function of the respective icon during the interface reconfiguration mode.

Portable Electronic Device Architecture

Figure 4:
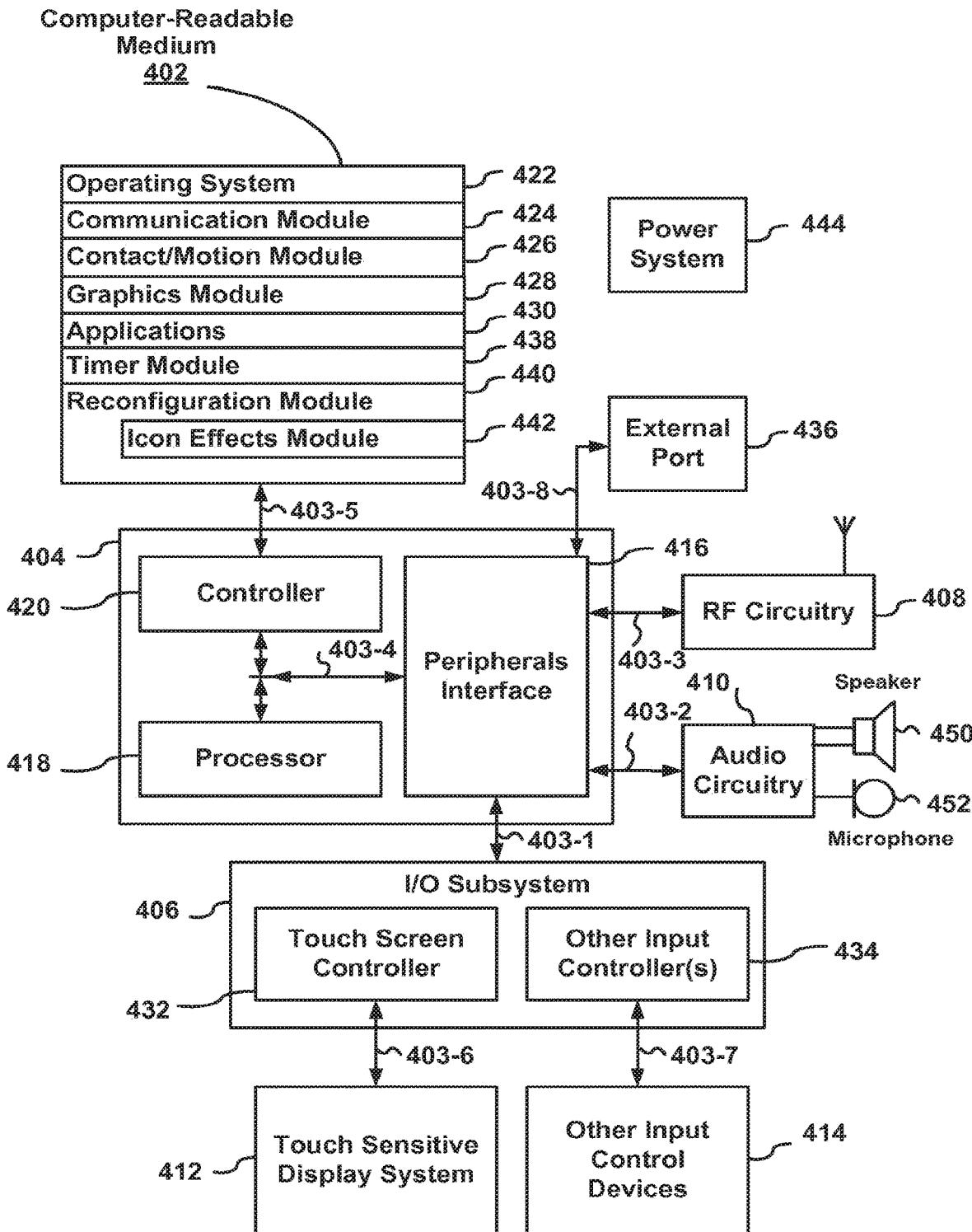
FIG. 4 is a block diagram of one embodiment of a portable electronic device.

Attention is now directed towards embodiments of the portable electronic device architecture. FIG. 4 is a block diagram of one embodiment of portable electronic device. A portable electronic device 400 generally includes one or more computer-readable mediums 402, a processing system 404, an Input/Output (I/O) subsystem 406, radio frequency (RF) circuitry 408 and audio circuitry 410. These components may be coupled by one or more communication buses or signal lines 403. The device 400 can be any portable electronic device, including but not limited to a handheld computer, a tablet computer, a mobile phone, a media player, personal digital assistant (PDA) and the like, including a combination of two or more of these items.

It should be apparent that the architecture shown in FIG. 4 is only one example of an architecture for the portable electronic device 400, and that the device 400 could have more or fewer components than shown, or a different configuration of components. The various components shown in FIG. 4 can be implemented in hardware, software, or a combination of both hardware and software, including one or more signal processing and/or application specific integrated circuits. The RF circuitry 408 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 408 is capable of establishing and maintaining communications with Other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), Wi-Fi (such as IEEE 802.11a, IEEE 802.11b, IEEE 802.11g and/or IEEE 802.11n), Bluetooth, Wi-MAX, voice over Internet Protocol (VoIP), a protocol for email, instant messaging, and/or a short message service (SMS), or any other suitable communication protocol, including communication protocols not yet developed as of the filing date of this document.

The RF circuitry 408 and the audio circuitry 410 are coupled to the processing system 404 via the peripherals interface 416. The interface 416 includes various known components for establishing and maintaining communication between peripherals and the processing system 404. The audio circuitry 410 is coupled to an audio speaker 450 and a microphone 452 and includes known circuitry for processing voice signals received from interface 416 to enable a user to communicate in real-time with other users. In some embodiments, the audio circuitry 410 includes a headphone jack (not shown). Voice and data information received by the RF circuitry 408 and the audio circuitry 410 (e.g., in speech recognition or voice command applications) is sent to one or more processors 418 via the peripherals interface 416. The one or more processors 418 are configurable to process various data formats for one or more applications programs 430 stored on the medium 402.

Note that the term "data" includes but is not limited to text, graphics, Web pages, JAVA applets, widgets, emails, instant messages, voice, digital images or video, widgets, MP3s, etc., which can be used by one or more applications programs 430 stored on the medium 402 (e.g. Web browser, email, etc.). In some embodiments, the device 400 is capable of uploading and downloading various data from the Internet over a wireless network or an external port 436, such as files, songs, digital images, videos, entails, widgets, instant messages and the like.

The peripherals interface 416 couples the input and output peripherals of the device to the processor 418 and the computer-readable medium 402. The one or more processors 418 communicate with the one or more computer-readable mediums 402 via a controller 420. The computer-readable medium 402 can be any device or medium that can store code and/or data for use by the one or more processors 418. The medium 402 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 402 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANS), Metropolitan Area Networks (MAN) and the like.

The one or more processors 418 run various software components stored in the medium 402 to perform various functions for the device 400. In some embodiments, the software components include an operating system 422, a communication module (or set of instructions) 424, a contact motion module (or set of instructions) 426, a graphics module (or set of instructions) 428, one or more applications (or set of instructions) 430, a timer module (Or set of instructions) 438 and a reconfiguration module (or set of instructions) 440.

The operating system 422 (e.g., Darwin, RTXC, LINUX, UNIX, OS X, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 424 facilitates communication with other devices over one or more external ports 436 or via RF circuitry 408 and includes various software components for handling data received from the RF circuitry 408 and/or the external port 436. The external port 436 (e.g., USB, FireWire™, etc.) is adapted for coupling directly to other devices or indirectly over a network (e.g., the Internet, wireless LAN, etc.).

The graphics module 428 includes various known software components for rendering, animating and displaying graphical objects on a display surface of a touch-sensitive display system 412. Note that the term "graphical object" includes any object that can be displayed to a user, including without limitation text, web pages, icons, digital images, animations and the like.

The one or more applications 430 can include any applications installed on the device 400, including without limitation, a browser, address hook, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 400 may include the functionality of an MP3 player, such as an iPod (trademark of Apple Computer, Inc.). The device 400 may, therefore, include a 36-pin connector that is compatible with the iPod. In some embodiments, the device 400 may include one or more optional optical sensors (not shown), such as CMOS or CCD image sensors, for use in imaging applications.

The contact motion module 426 includes various software components for performing various tasks associated with the touch-sensitive display system 412, as previously described with respect to the embodiments in FIGS. 1-3.

The timer module 438 is a software timer used with the interface reconfiguration process 100 (FIG. 1). The timer module 438 can also be implemented in hardware.

The reconfiguration module 440 may include an icon effects module (or a set of instructions) 442. The icon effects module 442 may include animation for the icons during the interface reconfiguration mode. In some embodiments, the icon effects module 442 may be included in the graphics module 428.

The I/O subsystem 406 is coupled to the touch-sensitive display system 412 and one or more other physical control devices 414 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. The touch-sensitive display 412 communicates with the processing system 404 via the touch sensitive screen controller 432, which includes various components for processing user input (e.g., scanning hardware). The one or more other input controllers 434 receives/sends electrical signals from/to the other input or control devices 414. The Other input/control devices 414 may include physical buttons (e.g., push buttons, rocker buttons, etc.), dials, slider switches, sticks, and so forth.

The touch-sensitive display 412 displays visual output to the user in a GUI. The visual output may include text, graphics, video, and any combination thereof. Some or all of the visual output may correspond to user-interface objects. The touch-sensitive display 412 may also accept input from the user based on haptic and/or tactile contact. The touch-sensitive display 412 forms a touch-sensitive surface that accepts user input. The touch-sensitive display 412 and the touch screen controller 432 (along with any associated modules and/or sets of instructions in the medium 402) detects contact (and any movement or release of the contact) on the touch-sensitive display 412 and converts the detected contact into interaction with user-interface objects, such as one or more soft keys, that are displayed on the touch screen when the contact occurs. In an exemplary embodiment, a point of contact between the touch-sensitive display 412 and the user corresponds to one or more digits of the user. The touch-sensitive display 412 may use LCD (liquid crystal display) technology, or LPD (light emitting polymer display) technology, although other display technologies may be used in other embodiments. The touch-sensitive display 412 and touch screen controller 432 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 412.

The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch-sensitive display 412 may have a resolution in excess of 100 dpi. In an exemplary embodiment, the touch-sensitive display 412 may have a resolution of approximately 168 dpi. The user may make contact with the touch-sensitive display 412 using any suitable object or appendage, such as a stylus, pen, finger, and so forth.

In some embodiments, in addition to the touch screen, the device 400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 412 or an extension of the touch-sensitive surface formed by the touch-sensitive display 412.

The device 400 also includes a power system 444 for powering the various hardware components. The power system 444 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In some embodiments, the peripherals interface 416, the one or more processors 418, and the memory controller 420 may be implemented on a single chip, such as the processing system 404. In some other embodiments, they may be implemented on separate chips.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch-sensitive display;
one or more processors; and
memory storing one or more programs configured to be executed by the one or more processors, the one or more programs including instructions for:
displaying a plurality of application icons on the touch-sensitive display in a normal mode of operation, the plurality of application icons including a first application icon at a first location on the touch sensitive display;
while in the normal mode of operation and displaying the plurality of application icons:
detecting a first user input that includes detecting a finger contact on the first application icon;
in response to detecting the first user input on the first application icon:
in accordance with a determination that the first user input includes breaking of the finger contact from the touch-sensitive display before a first amount of time has elapsed, initiating an application that corresponds to the first application icon; and
in accordance with a determination that the first user input includes a finger contact held on the first application icon without detecting breaking of the contact from the touch-sensitive display for at least a second amount of time that is greater than the first amount of time, entering a user interface reconfiguration mode, distinct from the normal mode of operation;
while in the user interface reconfiguration mode:
displaying the first application icon in a manner different from that in the normal mode of operation;
detecting a second user input that includes movement of the finger contact from the first location on the touch-sensitive display to a second location on the touch sensitive display; and
in response to detecting the second user input that includes movement of the finger contact from the first location on the touch-sensitive display to the second location on the touch-sensitive display, moving the first application icon to the second location on the touch-sensitive display.

2. The electronic device of claim 1, wherein the one or more programs further include instructions for:
while in the user interface reconfiguration mode:
displaying at least one application icon other than the first application icon in a manner different from that in the normal mode of operation.

3. The electronic device of claim 1, wherein each application icon in the plurality of application icons is capable of being repositioned on the touch-sensitive display while in the user interface reconfiguration mode.

4. The electronic device of claim 1, wherein moving the first application icon to the second location on the touch-sensitive display includes animating the first application icon to simulate floating of the first application icon on a surface corresponding to a surface of the touch-sensitive display.

5. The electronic device of claim 1, wherein the one or more programs further include instructions for:
providing at least one of audible and tactile feedback when the first application icon has been moved.

6. The electronic device of claim 1, wherein the one or more programs further include instructions for:
in response to detecting the second user input that includes movement of the finger contact from the first location on the touch-sensitive display to the second location on the touch-sensitive display, repositioning a second application icon from the second location to a third location on the touch-sensitive display to make room for the first application icon at the second location.

7. The electronic device of claim 1, wherein the one or more programs further include instructions for:
upon moving the first application icon to the second location on the touch-sensitive display, removing one or more application icons from the plurality of application icons to prevent overlapping of the moved first application icon with any of the application icons in the plurality of application icons on the touch-sensitive display.

8. A method comprising:
at an electronic device with a touch-sensitive display:
displaying a plurality of application icons on the touch-sensitive display in a normal mode of operation, the plurality of application icons including a first application icon at a first location on the touch sensitive display;
while in the normal mode of operation and displaying the plurality of application icons:
detecting a first user input that includes detecting a finger contact on the first application icon;
in response to detecting the first user input on the first application icon:
in accordance with a determination that the first user input includes breaking of the finger contact from the touch-sensitive display before a first amount of time has elapsed, initiating an application that corresponds to the first application icon; and
in accordance with a determination that the first user input includes a finger contact held on the first application icon without detecting breaking of the contact from the touch-sensitive display for at least a second amount of time that is greater than the first amount of time, entering a user interface reconfiguration mode, distinct from the normal mode of operation;
while in the user interface reconfiguration mode:
displaying the first application icon in a manner different from that in the normal mode of operation;
detecting a second user input that includes movement of the finger contact from the first location on the touch-sensitive display to a second location on the touch sensitive display; and
in response to detecting the second user input that includes movement of the finger contact from the first location on the touch-sensitive display to the second location on the touch-sensitive display, moving the first application icon to the second location on the touch-sensitive display.

9. A non-transitory computer-readable storage medium storing one or more programs configured to be executed by one or more processors of an electronic device with a touch-sensitive display, the one or more programs including instructions for:
displaying a plurality of application icons on the touch-sensitive display in a normal mode of operation, the plurality of application icons including a first application icon at a first location on the touch sensitive display;
while in the normal mode of operation and displaying the plurality of application icons:
  detecting a first user input that includes detecting a finger contact on the first application icon;
  in response to detecting the first user input on the first application icon:
    in accordance with a determination that the first user input includes breaking of the finger contact from the touch-sensitive display before a first amount of time has elapsed, initiating an application that corresponds to the first application icon; and
    in accordance with a determination that the first user input includes a finger contact held on the first application icon without detecting breaking of the contact from the touch-sensitive display for at least a second amount of time that is greater than the first amount of time, entering a user interface reconfiguration mode, distinct from the normal mode of operation;
while in the user interface reconfiguration mode:
  displaying the first application icon in a manner different from that in the normal mode of operation;
  detecting a second user input that includes movement of the finger contact from the first location on the touch-sensitive display to a second location on the touch sensitive display; and
  in response to detecting the second user input that includes movement of the finger contact from the first location on the touch-sensitive display to the second location on the touch-sensitive display, moving the first application icon to the second location on the touch-sensitive display.

10. The method of claim 8, further comprising:
while in the user interface reconfiguration mode:
  displaying at least one application icon other than the first application icon in a manner different from that in the normal mode of operation.

11. The method of claim 8, wherein each application icon in the plurality of application icons is capable of being repositioned on the touch-sensitive display while in the user interface reconfiguration mode.

12. The method of claim 8, wherein moving the first application icon to the second location on the touch-sensitive display includes animating the first application icon to simulate floating of the first application icon on a surface corresponding to a surface of the touch-sensitive display.

13. The method of claim 8, further comprising:
providing at least one of audible and tactile feedback when the first application icon has been moved.

14. The method of claim 8, further comprising:
in response to detecting the second user input that includes movement of the finger contact from the first location on the touch-sensitive display to the second location on the touch-sensitive display, repositioning a second application icon from the second location to a third location on the touch-sensitive display to make room for the first application icon at the second location.

15. The method of claim 8, further comprising:
upon moving the first application icon to the second location on the touch-sensitive display, removing one or more application icons from the plurality of application icons to prevent overlapping of the moved first application icon with any of the application icons in the plurality of application icons on the touch-sensitive display.

16. The non-transitory computer-readable storage medium of claim 9, wherein the one or more programs further include instructions for:
while in the user interface reconfiguration mode:
  displaying at least one application icon other than the first application icon in a manner different from that in the normal mode of operation.

17. The non-transitory computer-readable storage medium of claim 9, wherein each application icon in the plurality of application icons is capable of being repositioned on the touch-sensitive display while in the user interface reconfiguration mode.

18. The non-transitory computer-readable storage medium of claim 9, wherein moving the first application icon to the second location on the touch-sensitive display includes animating the first application icon to simulate floating of the first application icon on a surface corresponding to a surface of the touch-sensitive display.

19. The non-transitory computer-readable storage medium of claim 9, wherein the one or more programs further include instructions for:
providing at least one of audible and tactile feedback when the first application icon has been moved.

20. The non-transitory computer-readable storage medium of claim 9, wherein the one or more programs further include instructions for:
in response to detecting the second user input that includes movement of the finger contact from the first location on the touch-sensitive display to the second location on the touch-sensitive display, repositioning a second application icon from the second location to a third location on the touch-sensitive display to make room for the first application icon at the second location.

21. The non-transitory computer-readable storage medium of claim 9, wherein the one or more programs further include instructions for:
upon moving the first application icon to the second location on the touch-sensitive display, removing one or more application icons from the plurality of application icons to prevent overlapping of the moved first application icon with any of the application icons in the plurality of application icons on the touch-sensitive display.

* * * * *